United States Patent
Conrad

(10) Patent No.: US 10,016,105 B2
(45) Date of Patent: Jul. 10, 2018

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 10 days.

(21) Appl. No.: 15/095,832

(22) Filed: Apr. 11, 2016

(65) Prior Publication Data

US 2017/0290479 A1   Oct. 12, 2017

(51) Int. Cl.
| | |
|---|---|
| *A47L 5/24* | (2006.01) |
| *A47L 9/32* | (2006.01) |
| *A47L 9/00* | (2006.01) |
| *A47L 9/16* | (2006.01) |
| *B25G 1/10* | (2006.01) |
| *B01D 45/16* | (2006.01) |

(52) U.S. Cl.
CPC ............... *A47L 5/24* (2013.01); *A47L 9/0072* (2013.01); *A47L 9/1608* (2013.01); *A47L 9/322* (2013.01); *B01D 45/16* (2013.01); *B25G 1/102* (2013.01)

(58) Field of Classification Search
CPC ........ A47L 5/24; A47L 9/0072; A47L 9/1608; A47L 9/322; B01D 45/16; B25G 1/102
See application file for complete search history.

(56) References Cited

U.S. PATENT DOCUMENTS

| | | |
|---|---|---|
| 5,267,371 A | 12/1993 | Soler et al. |
| 5,467,835 A | 11/1995 | Obermeier et al. |
| 6,434,785 B1 | 8/2002 | Vandenbelt et al. |
| 6,484,350 B2 | 11/2002 | Yung |
| 6,502,278 B2 | 1/2003 | Oh et al. |
| 6,514,131 B1 | 2/2003 | Reich et al. |
| 6,810,558 B2 | 11/2004 | Lee |
| 7,247,181 B2 | 7/2007 | Hansen et al. |
| 7,370,387 B2 | 5/2008 | Walker et al. |
| 7,640,624 B2 | 1/2010 | Crouch et al. |
| 7,686,861 B2 | 3/2010 | Oh |
| 7,691,161 B2 | 4/2010 | Oh et al. |
| 7,708,789 B2 | 5/2010 | Fester |
| 7,717,973 B2 | 5/2010 | Oh et al. |
| 7,780,753 B2 | 8/2010 | Lang |
| 7,882,593 B2 | 2/2011 | Beskow et al. |
| 7,922,794 B2 | 4/2011 | Morphey |

(Continued)

FOREIGN PATENT DOCUMENTS

| | | |
|---|---|---|
| AU | 2008200579 A1 | 8/2008 |
| AU | 2008201597 A1 | 11/2008 |

(Continued)

OTHER PUBLICATIONS

English machine translation of DE112010001135, as published on Aug. 2, 2012.

(Continued)

*Primary Examiner* — Dung Van Nguyen
(74) *Attorney, Agent, or Firm* — Philip C. Mendes da Costa; Bereskin & Parr LLP/S.E.N.C.R.L., s.r.l.

(57) ABSTRACT

A hand vacuum cleaner comprises a main body and a removably mounted air treatment member. The air treatment member has an air flow passage which comprises a handle for the air treatment member.

20 Claims, 33 Drawing Sheets

(56) References Cited

U.S. PATENT DOCUMENTS

| | | |
|---|---|---|
| 7,958,598 B2 | 6/2011 | Yun et al. |
| 7,996,956 B2 | 8/2011 | Wood et al. |
| 8,028,373 B2 | 10/2011 | Rowntree |
| 8,048,180 B2 | 11/2011 | Oh et al. |
| 8,100,999 B2 | 1/2012 | Ashbee et al. |
| 8,101,001 B2 | 1/2012 | Qian |
| 8,117,712 B2 | 2/2012 | Dyson et al. |
| 8,146,201 B2 | 4/2012 | Conrad |
| 8,150,907 B2 | 4/2012 | Otsuka et al. |
| 8,151,407 B2 | 4/2012 | Conrad |
| 8,156,609 B2 | 4/2012 | Milne et al. |
| 8,347,455 B2 | 1/2013 | Dyson et al. |
| 8,444,731 B2 | 5/2013 | Gomiciaga-Pereda et al. |
| 8,549,703 B2 | 10/2013 | Smith |
| 8,578,555 B2 | 11/2013 | Conrad |
| 8,595,895 B2 | 12/2013 | Smith |
| 8,657,904 B2 | 2/2014 | Smith |
| 8,713,751 B2 | 5/2014 | Conrad |
| 8,813,305 B2 | 8/2014 | Conrad |
| 8,869,345 B2 | 10/2014 | Conrad |
| 8,875,342 B2 | 11/2014 | Conrad |
| 8,918,952 B2 | 12/2014 | Rowntree |
| 8,945,258 B2 | 2/2015 | Smith |
| 8,979,960 B2 | 3/2015 | Smith |
| 9,005,324 B2 | 4/2015 | Smith |
| 9,144,358 B2 | 9/2015 | Smith |
| 9,204,773 B2 | 12/2015 | Conrad |
| 9,211,046 B2 * | 12/2015 | Peace .................... A47L 9/1633 |
| 9,516,979 B2 * | 12/2016 | Gidwell ................. A47L 5/225 |
| 9,675,218 B2 * | 6/2017 | Kim ....................... A47L 5/225 |
| 9,711,986 B2 | 7/2017 | Sunderland |
| 2002/0134238 A1 | 9/2002 | Conrad et al. |
| 2004/0134022 A1 | 7/2004 | Murphy et al. |
| 2006/0090290 A1 | 5/2006 | Lau |
| 2006/0156508 A1 | 7/2006 | Khalil |
| 2006/0277711 A1 | 12/2006 | Hong |
| 2007/0271724 A1 | 11/2007 | Hakan et al. |
| 2008/0040883 A1 | 2/2008 | Beskow et al. |
| 2008/0178416 A1 | 7/2008 | Conrad |
| 2008/0190080 A1 | 8/2008 | Oh et al. |
| 2008/0196745 A1 | 8/2008 | Conrad |
| 2008/0256744 A1 | 10/2008 | Rowntreer et al. |
| 2009/0019663 A1 | 1/2009 | Rowntree |
| 2009/0282639 A1 | 11/2009 | Dyson et al. |
| 2009/0305862 A1 | 12/2009 | Yoo |
| 2009/0307864 A1 | 12/2009 | Dyson |
| 2010/0229322 A1 | 9/2010 | Conrad |
| 2010/0229324 A1 | 9/2010 | Conrad |
| 2011/0219570 A1 | 9/2011 | Conrad |
| 2011/0289719 A1 | 12/2011 | Han et al. |
| 2011/0308038 A1 | 12/2011 | Rowntree |
| 2012/0079671 A1 | 4/2012 | Stickney et al. |
| 2012/0304417 A1 | 12/2012 | Riley |
| 2013/0091654 A1 | 4/2013 | Smith |
| 2013/0091656 A1 | 4/2013 | Smith |
| 2013/0091657 A1 | 4/2013 | Smith |
| 2013/0091658 A1 | 4/2013 | Smith |
| 2013/0091810 A1 | 4/2013 | Smith |
| 2013/0091812 A1 | 4/2013 | Smith |
| 2013/0091814 A1 | 4/2013 | Smith |
| 2013/0160232 A1 | 6/2013 | Peace |
| 2014/0237768 A1 | 8/2014 | Conrad |
| 2014/0237956 A1 | 8/2014 | Conrad |
| 2015/0135474 A1 | 5/2015 | Gidwell |
| 2015/0230677 A1 | 8/2015 | Andrikanish |
| 2015/0297050 A1 | 10/2015 | Marsh et al. |
| 2015/0359394 A1 | 12/2015 | Peace |
| 2016/0113460 A1 | 4/2016 | Williams et al. |
| 2016/0128531 A1 | 5/2016 | Conrad |
| 2016/0174785 A1 * | 6/2016 | Conrad .................... A47L 5/225 15/329 |
| 2016/0174786 A1 * | 6/2016 | Conrad .................... A47L 5/22 15/329 |
| 2016/0367094 A1 | 12/2016 | Conrad |
| 2017/0112343 A1 | 4/2017 | Innes et al. |
| 2017/0172362 A1 | 6/2017 | Reimer et al. |
| 2017/0188763 A1 | 7/2017 | Hu |

FOREIGN PATENT DOCUMENTS

| | | |
|---|---|---|
| AU | 2008200579 B2 | 10/2011 |
| AU | 2008201597 B2 | 10/2011 |
| AU | 2011211368 B2 | 9/2012 |
| CA | 2620703 A1 | 8/2008 |
| CA | 2628573 A1 | 10/2008 |
| CA | 2731525 A1 | 10/2008 |
| CA | 2658014 A1 | 9/2010 |
| CA | 2730437 A1 | 9/2011 |
| CA | 2593950 C | 1/2013 |
| CA | 2628573 C | 8/2013 |
| CA | 2620703 C | 9/2013 |
| CA | 2731525 C | 1/2014 |
| CN | 1626025 A | 6/2005 |
| CN | 1895148 A | 1/2007 |
| CN | 1911151 A | 2/2007 |
| CN | 101061932 A | 10/2007 |
| CN | 101095604 A | 1/2008 |
| CN | 101448447 A | 6/2009 |
| CN | 101489453 A | 7/2009 |
| CN | 101489455 A | 7/2009 |
| CN | 101489457 A | 7/2009 |
| CN | 101489461 A | 7/2009 |
| CN | 101657133 A | 2/2010 |
| CN | 101822506 A | 9/2010 |
| CN | 201683850 U | 12/2010 |
| CN | 101243959 B | 6/2011 |
| CN | 102188208 A | 9/2011 |
| CN | 102256523 A | 11/2011 |
| CN | 202173358 U | 3/2012 |
| CN | 101288572 B | 7/2012 |
| CN | 202739907 U | 2/2013 |
| CN | 103169420 A | 6/2013 |
| CN | 203724037 U | 7/2014 |
| CN | 101897558 B | 9/2014 |
| CN | 204363891 U | 6/2015 |
| CN | 104822301 A | 8/2015 |
| CN | 105816104 A | 8/2016 |
| CN | 205671986 U | 11/2016 |
| DE | 60116336 T2 | 8/2006 |
| DE | 112007003039 T5 | 10/2009 |
| DE | 112007003052 T5 | 1/2010 |
| DE | 112010001135 T5 | 8/2012 |
| DE | 102012211246 A1 | 1/2014 |
| EP | 1955631 A1 | 8/2008 |
| EP | 1955630 A3 | 10/2009 |
| EP | 2012641 B1 | 8/2010 |
| EP | 2223644 A2 | 9/2010 |
| EP | 1955631 B1 | 11/2010 |
| EP | 2223644 A3 | 3/2013 |
| EP | 2581013 A1 | 4/2013 |
| EP | 2220986 B1 | 3/2014 |
| EP | 2223644 B1 | 3/2014 |
| GB | 1436403 A | 5/1976 |
| GB | 2035787 B | 10/1982 |
| GB | 2440111 A | 1/2008 |
| JP | 2002085297 A | 3/2002 |
| JP | 2005040246 A | 2/2005 |
| JP | 2006102034 A | 4/2006 |
| JP | 2006272019 A | 10/2006 |
| JP | 2008206613 A | 9/2008 |
| JP | 4352065 B2 | 10/2009 |
| JP | 2009261501 A | 11/2009 |
| JP | 2013086228 A | 5/2013 |
| NZ | 565800 A | 5/2009 |
| NZ | 567297 A | 7/2009 |
| WO | 2004069021 A1 | 8/2004 |
| WO | 2005084511 A1 | 9/2005 |
| WO | 2006076363 A2 | 7/2006 |
| WO | 2008009883 A1 | 1/2008 |
| WO | 2008009888 A1 | 1/2008 |
| WO | 2008009890 A1 | 1/2008 |
| WO | 2008035032 A3 | 6/2008 |
| WO | 2008070973 A1 | 6/2008 |

(56) References Cited

FOREIGN PATENT DOCUMENTS

| | | |
|---|---|---|
| WO | 2010102396 A1 | 9/2010 |
| WO | 2010147247 A1 | 12/2010 |
| WO | 2014131105 A1 | 9/2014 |
| WO | 2015129387 A1 | 9/2015 |
| WO | 2017046557 A1 | 3/2017 |
| WO | 2017046559 A1 | 3/2017 |
| WO | 2017046560 A1 | 3/2017 |

OTHER PUBLICATIONS

English machine translation of DE112007003052, as published on Jan. 14, 2010.
English machine translation of DE102012211246, as published on Jan. 2, 2014.
English machine translation of WO2010147247, as published on Dec. 23, 2010.
English machine translation of JP2006272019, as published on Oct. 12, 2006.
English machine translation of JP2005040246, as published on Feb. 17, 2005.
English machine translation of CN203724037, as published on Jul. 23, 2014.
English machine translation of CN202173358, as published on Mar. 28, 2012.
English machine translation of CN201683850, as published on Dec. 29, 2010.
English machine translation of CN103169420, as published on Jun. 26, 2013.
English machine translation of CN102256523, as published on Nov. 23, 2011.
English machine translation of CN102188208, as published on Sep. 21, 1012.
English machine translation of CN101822506, as published on Sep. 8, 2010.
English machine translation of CN101657133, as published on Feb. 24, 2010.
English machine translation of CN101489461, as published on Jul. 22, 2009.
English machine translation of CN101489457, as published on Jul. 22, 2009.
English machine translation of CN101489455, as published on Jul. 22, 2009.
English machine translation of CN101489453, as published on Jul. 22, 2009.
English machine translation of CN101448447, as published on Jun. 3, 2009.
English machine translation of CN101095604, as published on Jan. 2, 2008.
English machine translation of DE60116336, as published on Aug. 31, 2008.
English machine translation of JP4352065, as published on Oct. 28, 2009.
English machine translation of CN1911151, as published on Feb. 14, 2007.
English machine translation of CN1895148, as published on Jan. 17, 2007.
English machine translation of CN1626025, as published on Jun. 15, 2005.
English machine translation of DE112007003039, as published on Oct. 29, 2009.
English machine translation of JP2009261501, as published on Nov. 12, 2009.
TotalPatent: English machine translation of JP2013086228, published on May 13, 2013.
TotalPatent: English machine translation of JP2008206613; published on Sep. 11, 2008.
TotalPatent: English machine translation of JP2006102034, published on Apr. 20, 2006.
TotalPatent: English machine translation of JP2002085297; published on Mar. 26, 2002.
TotalPatent: English machine translation of CN205671986; published on Nov. 9, 2016.
TotalPatent: English machine translation of CN204363891, published on Jun. 3, 2015.
TotalPatent: English machine translation of CN202739907, Published on Feb. 20, 2017.
International Search Report and Written Opinion, received in connection to PCT/CA2017/050014, dated Apr. 5, 2017.
International Search Report and Written Opinion, received in connection to PCT/CA2017/050436, dated Jul. 21, 2017.
TotalPatent: English machine translation of CN105816104A, published on Aug. 3, 2016.

* cited by examiner

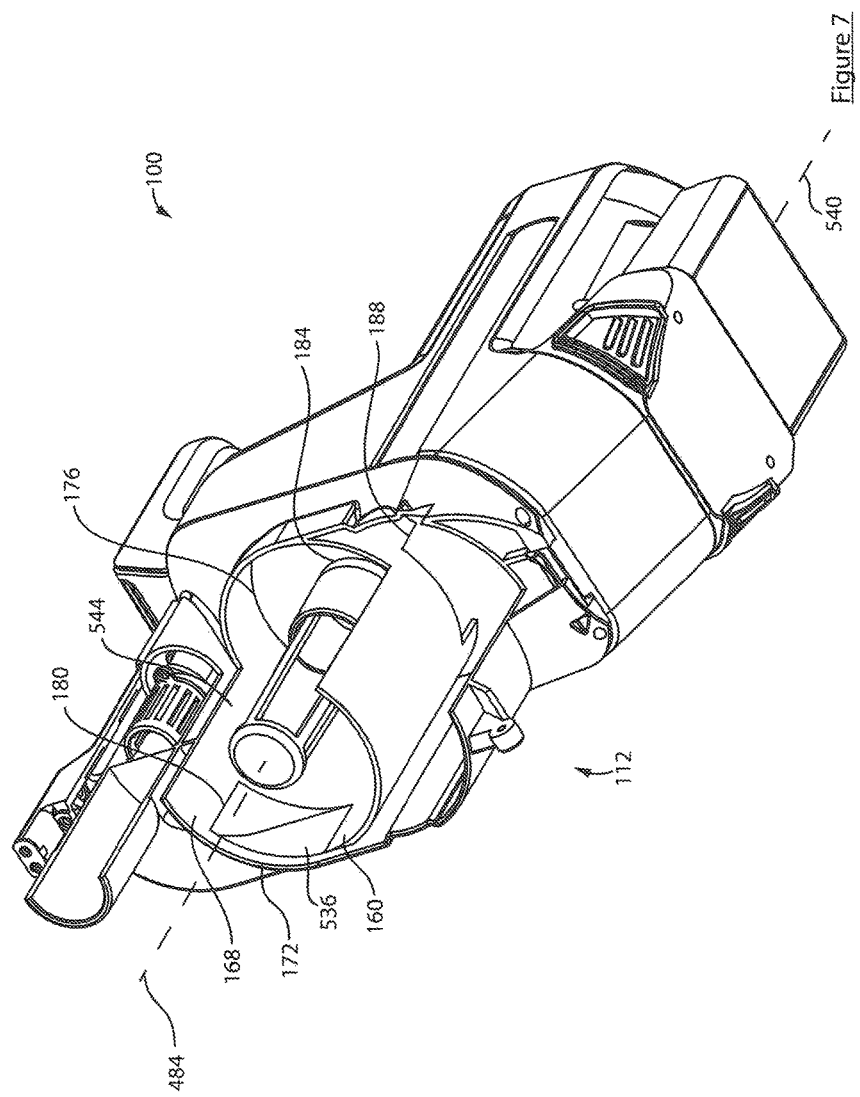

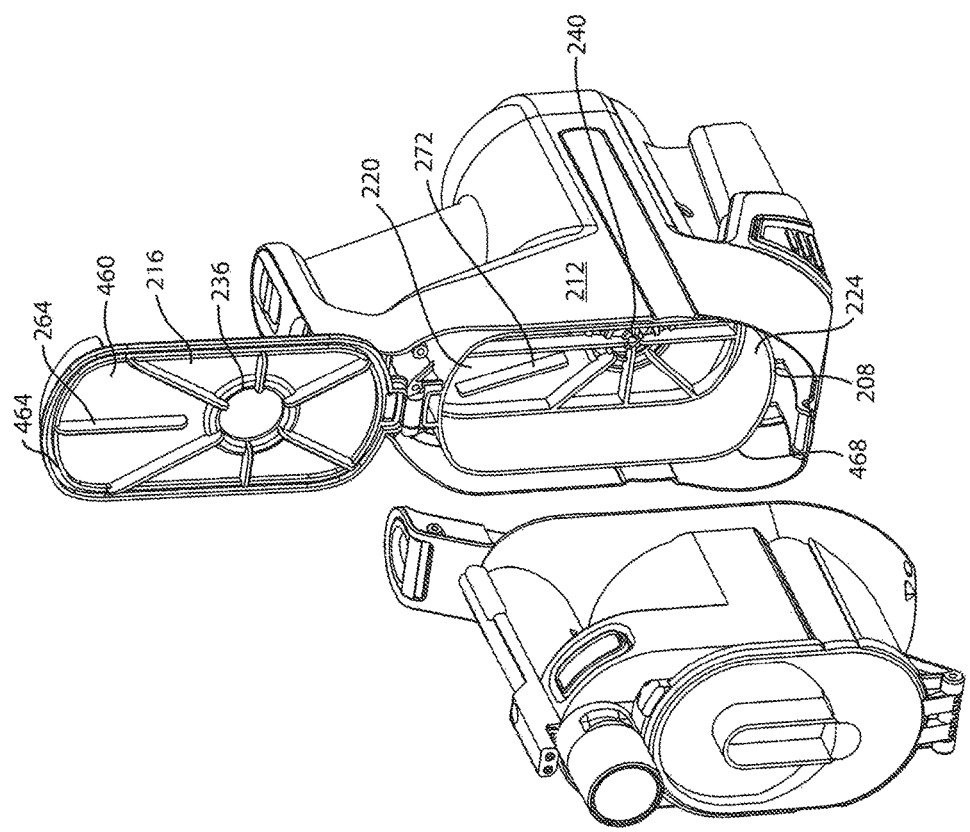

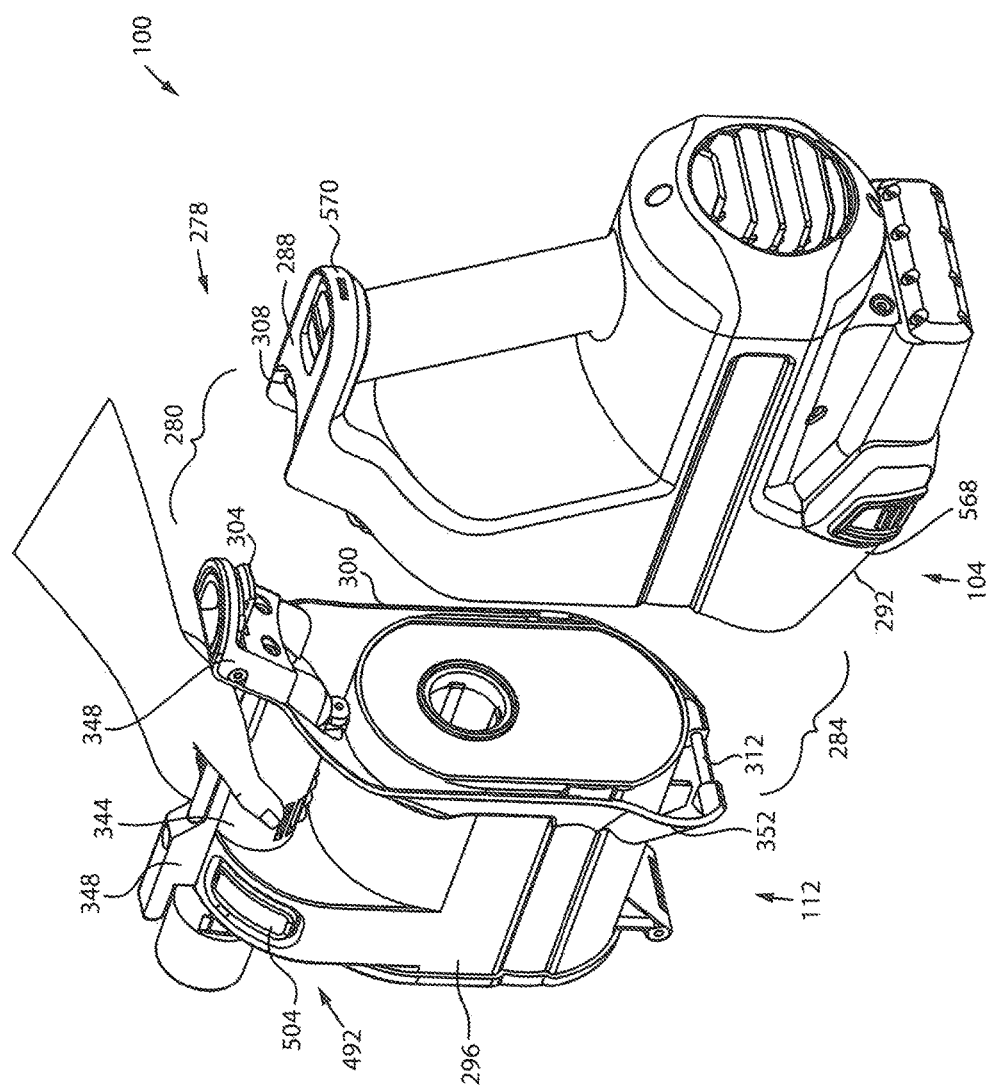

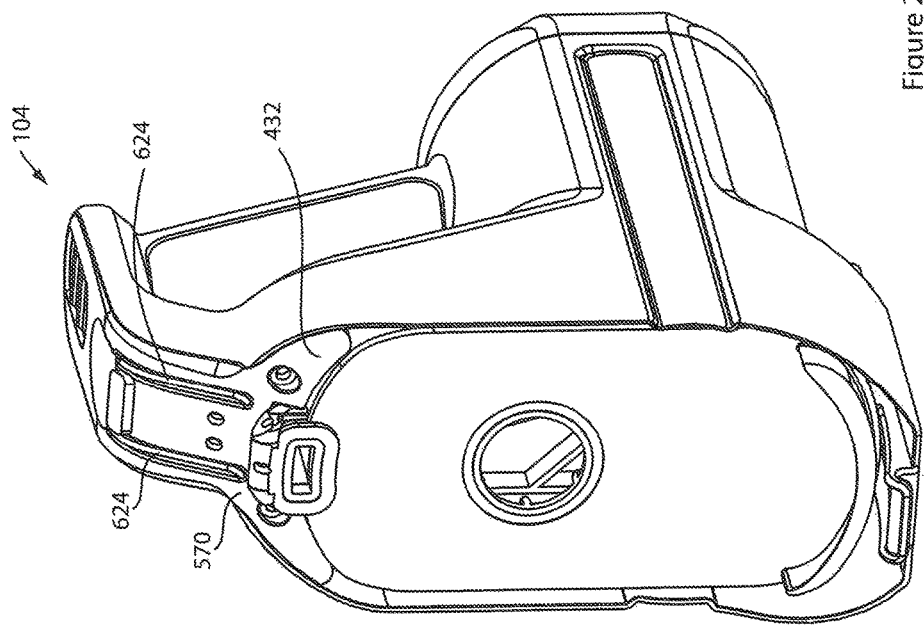
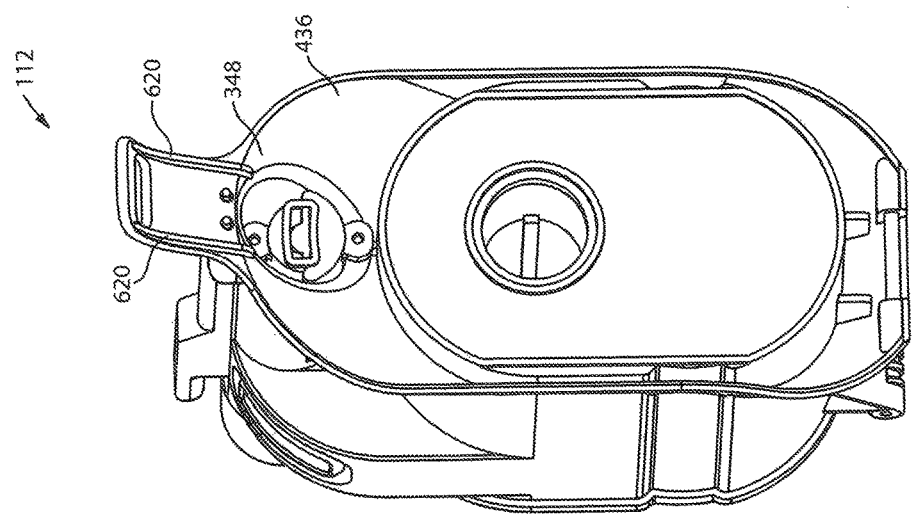
Figure 26

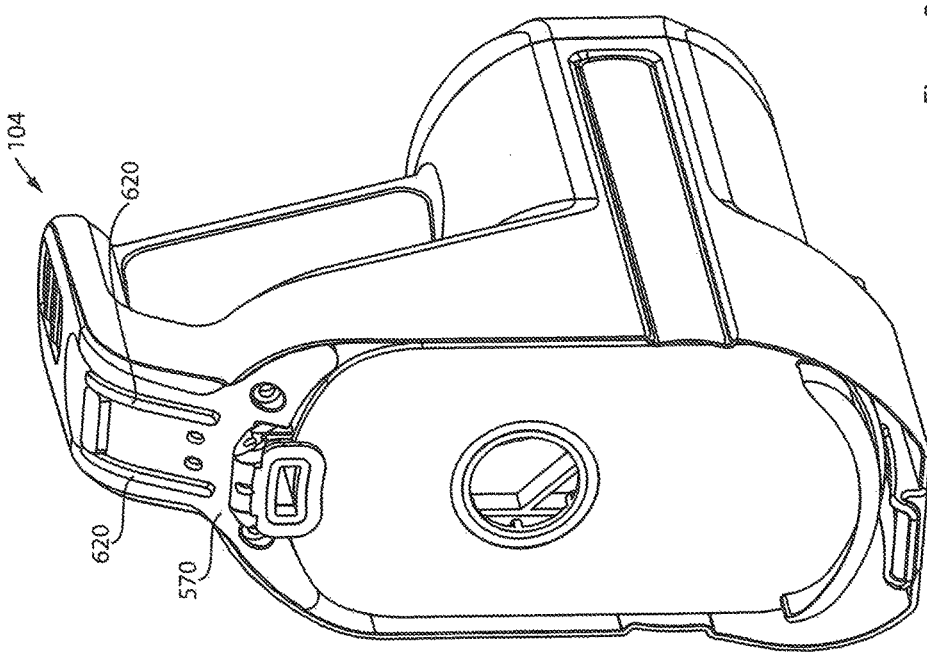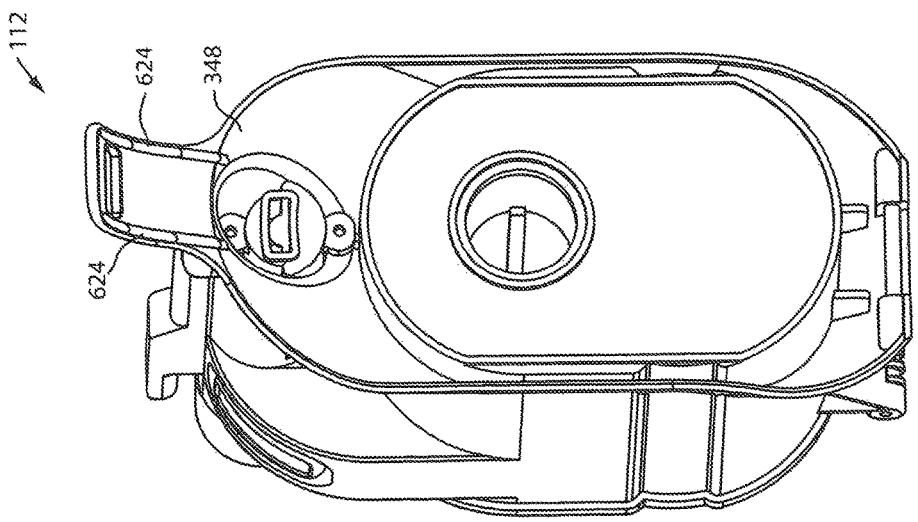
Figure 28

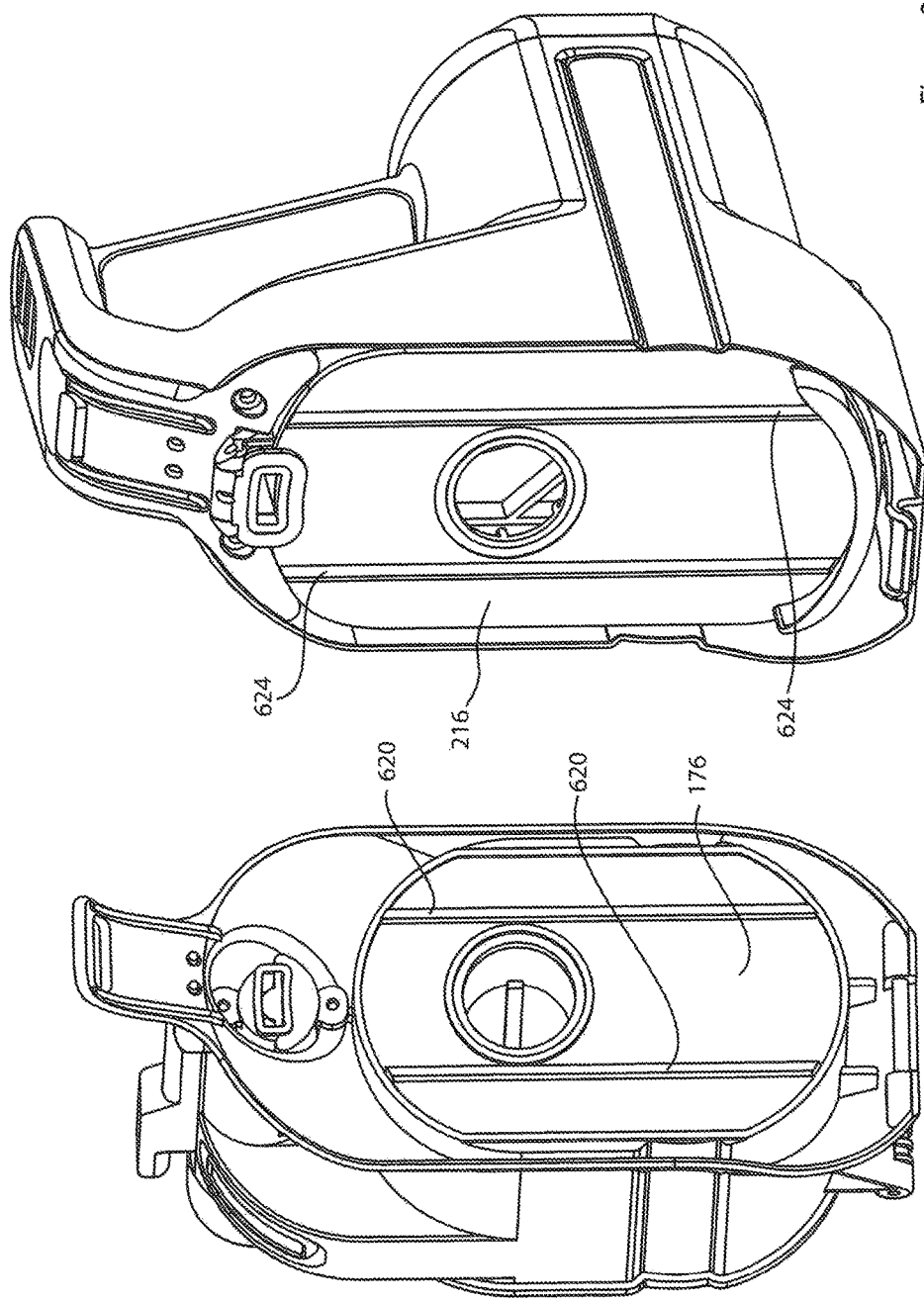

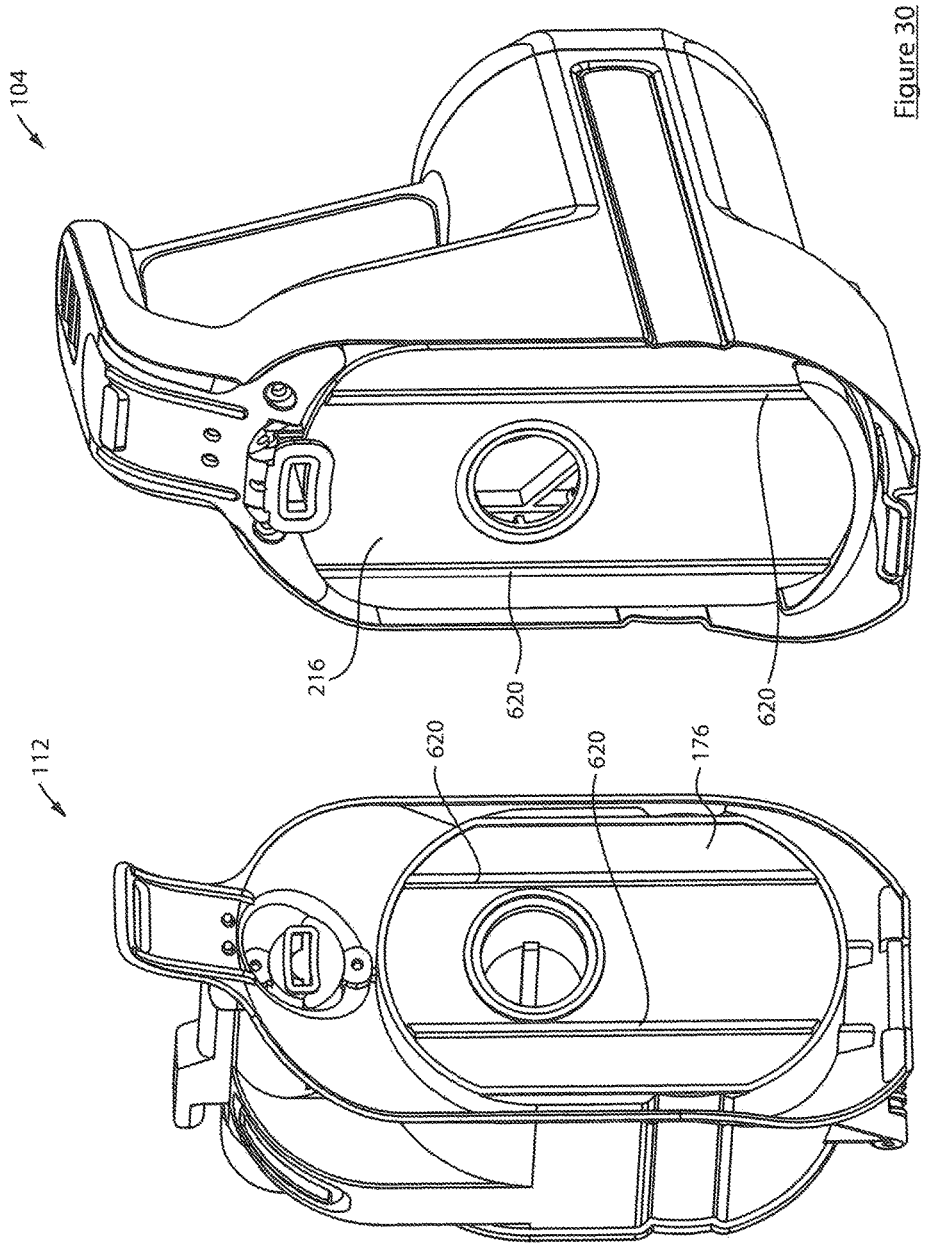

SURFACE CLEANING APPARATUS

FIELD

The specification relates to surface cleaning apparatus. In a preferred embodiment, the surface cleaning apparatus comprises a portable surface cleaning apparatus, such as a hand vacuum cleaner or a pod.

INTRODUCTION

The following is not an admission that anything discussed below is part of the prior art or part of the common general knowledge of a person skilled in the art.

Various types of surface cleaning apparatus are known. Surface cleaning apparatus include vacuum cleaners. Currently, a vacuum cleaner typically uses at least one cyclonic cleaning stage. More recently, cyclonic hand vacuum cleaners have been developed. See for example, U.S. Pat. No. 7,931,716 and US 2010/0229328. Each of these discloses a hand vacuum cleaner which includes a cyclonic cleaning stage. U.S. Pat. No. 7,931,716 discloses a cyclonic cleaning stage utilizing two cyclonic cleaning stages wherein both cyclonic stages have cyclone axis of rotation that extends vertically. US 2010/0229328 discloses a cyclonic hand vacuum cleaner wherein the cyclone axis of rotation extends horizontally and is co-axial with the suction motor. In addition, hand carriable cyclonic vacuum cleaners are also known (see U.S. Pat. Nos. 8,146,201 and 8,549,703).

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with one aspect of this disclosure, a hand vacuum cleaner has a uniflow cyclone with a front cyclone air inlet and a rear air cyclone outlet. Accordingly, the cyclone axis extends rearwardly from the front end of the cyclone. The cyclone air inlet may be in an upper portion of the cyclone and may be in an upper portion of the sidewall (e.g., most and preferably essentially all of the inlet opening may be in the sidewall of the cyclone above the axis of rotation of the cyclone). The dirt collection area may be a dirt collection chamber that is external to the cyclone chamber and may be provided below the cyclone chamber. The dirt outlet of the cyclone chamber may be provided in a lower portion of the sidewall of the cyclone near or at the rear end of the cyclone.

In accordance with this aspect, there is provided a hand vacuum cleaner having a front end having a dirty air inlet, a rear end, a clean air outlet, an upper end and a bottom, the hand vacuum cleaner comprising:
  (a) a main body comprising an upper end having a dirty air inlet, a lower end, a front end and a rear end, the main body housing a suction motor and fan assembly, the suction motor and fan assembly having a suction motor axis of rotation; and,
  (b) a cyclone unit comprising a cyclone having a cyclone axis of rotation, a front end having a cyclone air inlet and a longitudinally spaced apart rear end having a cyclone air outlet, wherein the cyclone air inlet is in an upper portion of the cyclone;
  wherein when the hand vacuum cleaner is oriented with the cyclone underneath the upper end, the cyclone axis of rotation is generally horizontal.

In some embodiments, when the hand vacuum cleaner is positioned with the bottom on a horizontal surface, the cyclone axis of rotation may be generally horizontal.

In some embodiments, when the hand vacuum cleaner is oriented with the cyclone underneath the upper end, the suction motor axis of rotation may be generally horizontal.

In some embodiments, when the hand vacuum cleaner is oriented with the cyclone underneath the upper end, the suction motor axis of rotation may be positioned below the cyclone axis of rotation.

In some embodiments, the cyclone has a sidewall having an upper portion and a lower portion and a dirt outlet may be provided in the lower portion and is in communication with a dirt collection chamber that is exterior to the cyclone. Optionally, the cyclone air inlet may be provided in the upper portion of the sidewall of the cyclone.

In some embodiments, the cyclone axis of rotation may be generally parallel to the suction motor axis of rotation.

In some embodiments, the main body may be provided with a handle.

In some embodiments, the hand vacuum cleaner further comprises a handle having a hand grip portion that may extend upwardly and forwardly when the hand vacuum cleaner is oriented with the cyclone underneath the upper end.

In some embodiments, the lower end of the main body may comprise the bottom.

In some embodiments, the cyclone unit may be provided on the front end of the main body. Alternately, or in addition, the cyclone unit may be removably mounted to the main body.

In some embodiments, the dirty air inlet may be provided on a front end of the cyclone unit.

In some embodiments, the dirty air inlet may comprise an inlet passage that extends longitudinally between an inlet end and an outlet end and has a longitudinal passage axis, the outlet end of the inlet passage communicates with the cyclone air inlet and the inlet passage axis may be positioned between an upper and a lower end of a handle of the hand vacuum cleaner.

In some embodiments, the handle may comprise a hand grip portion that extends upwardly and forwardly when the hand vacuum cleaner is oriented with the cyclone underneath the upper end. In some of these embodiments, the suction motor axis of rotation may be positioned below the cyclone axis of rotation when the hand vacuum cleaner is oriented with the cyclone underneath the upper end.

In some embodiments, the inlet passage may have a longitudinal passage axis that is linear and all of the longitudinal passage may be positioned above the cyclone axis of rotation when the hand vacuum cleaner is oriented with the cyclone underneath the upper end.

In accordance with this aspect, there is also provided a surface cleaning apparatus comprising the hand vacuum cleaner discussed herein, a surface cleaning head and a rigid air flow conduit extending between the surface cleaning head and the hand vacuum cleaner wherein an outlet end of the rigid air flow conduit is removable connectable in air flow communication with the inlet passage.

In accordance with this aspect, there is also provided a hand vacuum cleaner having a front end, a rear end, a clean air outlet, an upper end and a bottom, the hand vacuum cleaner comprising:

(a) a main body comprising an upper end, a lower end, a front end and a rear end, the main body housing a suction motor and fan assembly, the suction motor and fan assembly having a suction motor axis of rotation; and, (b) an air treatment member having a front end having an air treatment member air inlet and a longitudinally rearwardly spaced apart rear end having an air treatment member air outlet, wherein the air treatment member air inlet is in a longitudinally extending sidewall of the air treatment member; and, (c) a dirty air inlet comprising an inlet passage that extends longitudinally between an inlet end and an outlet end and has a longitudinal passage axis, the outlet end of the inlet passage communicates with the air treatment member air inlet.

In some embodiments, air travels through the air treatment member air outlet in a flow direction and the flow direction may be generally parallel to the suction motor axis of rotation.

In accordance with another aspect of this disclosure, a hand vacuum cleaner has an air treatment member with an air flow conduit or passage wherein the conduit is also a handle of the air treatment member.

In accordance with this aspect, there is provided a hand vacuum cleaner having a front end having a dirty air inlet, a rear end, a clean air outlet, an upper end and a bottom, the hand vacuum cleaner comprising:

(a) a main body comprising an upper end, a lower end, a front end, a rear end and a driving handle, the main body housing a suction motor and fan assembly, the suction motor and fan assembly having a suction motor axis of rotation;

(b) an air treatment member comprising an air treatment member handle, a dirt collection region having an openable door and an openable door lock comprising a door release actuator wherein the door is moveable to an open position when the door release actuator is actuated; and, (c) an air inlet comprises an inlet passage that extends longitudinally between an inlet end and an outlet end and has a longitudinal passage axis and the inlet passage comprises the air treatment member handle.

In some embodiments, the driving handle may comprise a portion spaced from the main body whereby a finger receiving area is provided between the driving handle and the main body.

In some embodiments, the driving handle may be provided at the rear end of the main body.

In some embodiments, the air treatment member handle may comprise a portion spaced from the air treatment member whereby a finger receiving area is provided between the air treatment member handle and the air treatment member.

The In some embodiments, the air treatment member handle may be provided above the air treatment member.

In some embodiments, the openable door may be provided at the front end of the hand vacuum cleaner.

In some embodiments, the openable door may have a lower end that is moveably mounted to the air treatment member and an upper end that may be engaged by the door lock.

In some embodiments, the door release actuator may be positioned proximate the air treatment member handle.

In some embodiments, the inlet passage may extend generally rearwardly.

In some embodiments, the door release actuator may be positioned at a forward end of the inlet passage.

In accordance with this aspect, there is also provided a hand vacuum cleaner having a front end having a dirty air inlet, a rear end, a clean air outlet, an upper end and a bottom, the hand vacuum cleaner comprising:

(a) a main body comprising an upper end, a lower end, a front end, a rear end and a driving handle, the main body housing a suction motor and fan assembly, the suction motor and fan assembly having a suction motor axis of rotation; and, (b) a cyclone unit comprising a cyclone having a cyclone axis of rotation, a cyclone unit handle, a dirt collection region having an openable door and an openable door lock comprising a door release actuator wherein the door is moveable to an open position when the actuator is actuated;

wherein when a user's hand is holding the cyclone unit by the cyclone unit handle, the door release actuator is operable by the same hand.

In some embodiments, the driving handle may comprise a portion spaced from the main body whereby a finger receiving area is provided between the driving handle and the main body.

In some embodiments, the driving handle may be provided at the rear end of the main body.

In some embodiments, the cyclone unit handle may comprise a portion spaced from the cyclone unit whereby a finger receiving area is provided between the cyclone unit handle and the cyclone unit.

In some embodiments, the cyclone unit handle may be provided above the cyclone unit.

In some embodiments, the openable door may be provided at the front end of the hand vacuum cleaner.

In some embodiments, the air inlet may comprise an inlet passage that extends longitudinally between an inlet end and an outlet end and the inlet passage comprises the cyclone unit handle.

In some embodiments, when the hand vacuum cleaner is positioned with the bottom on a horizontal surface, the cyclone axis of rotation may be generally horizontal.

In accordance with another aspect of this disclosure, the air treatment member, e.g., a cyclone unit, may be removably mounted to the rest of the hand vacuum cleaner. The air treatment member may include a dirty air inlet that is connectable to an upper end of a longitudinally extending rigid member (e.g., which may be hollow to enable airflow therethrough) and a surface cleaning head may be provided (preferably removably connected) to a lower end of the longitudinally extending rigid member. When assembled as an upright or stick vacuum cleaner with the hand vacuum cleaner drivingly connected to the surface cleaning head by the longitudinally extending rigid member (e.g., a rigid wand), the handle of the hand vacuum cleaner may be used to steer the surface cleaning head. An advantage of this configuration is that the hand vacuum cleaner may be easily converted to an upright or stick vacuum cleaner.

In such a configuration, lateral stresses (i.e., stresses transverse to the longitudinal forward/rearward axis of the hand vacuum cleaner) may occur as the handle of the hand vacuum cleaner is used to steer the surface cleaning head. In order to assist in stabilizing the joint of the air treatment member and the rest of the hand vacuum cleaner, lateral stability members may be provided at the interface of the air treatment member and the rest of the hand vacuum cleaner. For example, one or more pairs of inter-engagement members may be provided which extend in a direction that extends generally between the lower end and the upper end of the hand vacuum cleaner. These lateral stability members may extend continuously or they may have discontinuities and they may extend linearly or otherwise. As the lateral stresses are exerted in a direction that is at an angle between 0-90°, 25-90°, 45-90° or 70-90° to the lateral stability members, and may be generally perpendicular (90°) thereto, the lateral stability members will strengthen the joint of the air treatment member and the rest of the hand vacuum cleaner. Preferably, at least one pair is provided on either lateral side of a center line extending in the longitudinal forward/rearward direction of the hand vacuum cleaner. The lateral stability members may be any members that have sides that abut to resist the lateral stresses and may comprise a longitudinally extending protrusion or spline and a mating groove or abutting longitudinally extending protrusions or splines.

In accordance with this aspect, there is provided a surface cleaning apparatus comprising:
  (a) a hand vacuum cleaner having a front end having a dirty air inlet, a longitudinally spaced apart rear end, a clean air outlet, an upper end and a bottom, the hand vacuum cleaner comprising:
    (i) a main body comprising an upper end, a lower end, a front end and a rear end, the main body housing a suction motor and fan assembly, the suction motor and fan assembly having a suction motor axis of rotation;
    (ii) an air treatment member removably mounted at the front end of the main body, the air treatment member comprising an upper end, a lower end, a front end and a rear end, the lower end of the air treatment member is rotationally mounted to the lower end of the main body; and,
    (III) an air treatment member release lock comprising a release actuator and first and second engagement members wherein the first engagement member is provided on the upper end of the air treatment member and the second engagement member is provided on the upper end of the main body and the release actuator is provided on one of the air treatment member and the main body,
  (b) a surface cleaning head; and,
  (c) a rigid air flow conduit extending between the surface cleaning head and the hand vacuum cleaner wherein an outlet end of the rigid air flow conduit is removably connectable in air flow communication with the inlet passage.

In some embodiments, the lower end of one of the air treatment member and the main body may be provided with a transversely extending rod and the lower end of the other of the air treatment member and the main body may be provided with a hook removably connectable with the rod.

In some embodiments, the lower end of the air treatment member may be rotationally mounted to the lower end of the main body at a position longitudinally spaced from the first and second engagement members.

In some embodiments, the lower end of the air treatment member may be rotationally mounted to the lower end of the main body at a position longitudinally spaced from a position at which the upper end of the air treatment member abuts the upper end of the main body.

In some embodiments, one of the air treatment member and the main body may be provided with an outwardly extending protrusion and the other of the air treatment member and the main body may be provided with a groove in which the outwardly extending protrusion is received when the air treatment member is secured to the main body.

In some embodiments, the main body may have a driving handle and the dirty air inlet is part of the air treatment member.

In some embodiments, the air treatment member may comprise a cyclone unit and the driving handle may be provided at the rear end of the main body and the dirty air inlet may comprise an inlet passage that extends longitudinally between an inlet end provided at a front end of the cyclone unit and an outlet end, and the inlet end may be adapted to receive an accessory cleaning tool. The accessory cleaning tool may comprise a rigid air flow conduit.

In some embodiments, the air treatment member may comprise a cyclone unit and the driving handle may be provided at the rear end of the main body and the dirty air inlet may comprise an inlet passage that extends longitudinally between an inlet end provided at a front end of the cyclone unit and an outlet end, and the inlet end may be positioned forward of the cyclone unit.

In some embodiments, dirty air inlet may be provided above the air treatment member.

In some embodiments, the air treatment member may comprise a dirt collection region having an openable door and the openable door may be provided at the front end of the air treatment member.

In some embodiments, when the hand vacuum cleaner is oriented with the air treatment member below the upper end, the cyclone axis of rotation may be generally horizontal.

In accordance with this aspect, there is also provided a hand vacuum cleaner having a front end having a dirty air inlet, a longitudinally spaced apart rear end, a clean air outlet, an upper end and a bottom, the hand vacuum cleaner comprising:
  (a) a main body comprising an upper end, a lower end, a front end and a rear end, the main body housing a suction motor and fan assembly, the suction motor and fan assembly having a suction motor axis of rotation;
  (b) a cyclone unit removably mounted at the front end of the main body, the cyclone unit comprising an upper end, a lower end, a front end, a rear end and a cyclone axis of rotation, the lower end of the cyclone unit is rotationally mounted to the lower end of the main body; and,
  (c) a cyclone unit release lock comprising a release actuator and first and second engagement members wherein the first engagement member is provided on the upper end of the cyclone unit and the second engagement member is provided on the upper end of the main body and the release actuator is provided on one of the cyclone unit and the main body.

In some embodiments, the lower end of one of the cyclone unit and the main body may be provided with a transversely extending rod and the lower end of the other of the cyclone unit and the main body may be provided with a hook removably connectable with the rod.

In some embodiments, the lower end of the cyclone unit may be rotationally mounted to the lower end of the main body at a position longitudinally spaced from the first and second engagement members.

In some embodiments, the lower end of the cyclone unit may be rotationally mounted to the lower end of the main body at a position longitudinally spaced from a position at which the upper end of the cyclone unit abuts the upper end of the main body.

In some embodiments, one of the cyclone unit and the main body may be provided with an outwardly extending protrusion and the other of the cyclone unit and the main body is provided with a groove in which the outwardly extending protrusion is received when the cyclone unit is secured to the main body.

In some embodiments, the main body may have a driving handle and the dirty air inlet is part of the cyclone unit.

In some embodiments, the driving handle may be provided at the rear end of the main body and the dirty air inlet may comprise an inlet passage that extends longitudinally between an inlet end provided at a front end of the cyclone unit and an outlet end, and the inlet end may be adapted to receive an accessory cleaning tool. The accessory cleaning tool may comprise a rigid air flow conduit.

In some embodiments, the driving handle may be provided at the rear end of the main body and the dirty air inlet may comprise an inlet passage that extends longitudinally between an inlet end provided at a front end of the cyclone unit and an outlet end, and the inlet end may be positioned forward of the cyclone unit.

In some embodiments, the dirty air inlet may be provided above the cyclone unit.

In some embodiments, the cyclone unit may comprise a dirt collection region having an openable door and the openable door may be provided at the front end of the cyclone unit.

In some embodiments, when the hand vacuum cleaner is oriented with the cyclone below the upper end, the cyclone axis of rotation may be generally horizontal.

In accordance with another aspect of this disclosure an air treatment member includes an air flow passage which functions as a handle of the air treatment member. An advantage of this design is that the air treatment member may be provided with a handle that is not an additional part. The air flow passage may be part of the air flow path from a dirty air inlet to the air treatment member air inlet. Alternately or in addition, the air flow passage may be part of an air flow path for a bleed stream and a bleed valve may be provided in the air flow passage.

In accordance with this aspect of the disclosure, there is provided a hand vacuum cleaner having a front end, a rear end, an upper end and a bottom, the hand vacuum cleaner comprising:
  (a) a main body comprising an upper end, a lower end, a front end, a rear end and a driving handle, the main body housing a suction motor and fan assembly, the suction motor and fan assembly having a suction motor axis of rotation; and,
  (b) an air treatment member, the air treatment member comprising an air treatment member axis and an air treatment member handle wherein the air treatment member handle comprises an air flow passage.

In some embodiments, the air flow passage may comprise an inlet passage of the air treatment member.

In some embodiments, the inlet passage may extend longitudinally between a dirty air inlet end and an outlet end.

In some embodiments, the air treatment member handle may comprise a portion spaced from the air treatment member whereby a finger receiving area is provided between the air treatment member handle and the air treatment member.

In some embodiments, the air treatment member handle may be provided above the air treatment member.

In some embodiments, the passage may extend generally axially in the direction of the air treatment member axis.

In some embodiments, the driving handle may comprise a portion spaced from the main body whereby a finger receiving area is provided between the driving handle and the main body.

In some embodiments, the driving handle may be provided at the rear end of the main body.

In some embodiments, the air treatment member may be removable from the main body and the air treatment member handle may be removable with the air treatment member.

In some embodiments, a bleed valve may be positioned in the air treatment member handle.

In accordance with this aspect, there is also provided a hand vacuum cleaner having a front end, a rear end, an upper end and a bottom, the hand vacuum cleaner comprising:
  (a) a main body comprising an upper end, a lower end, a front end, a rear end and a driving handle, the main body housing a suction motor and fan assembly, the suction motor and fan assembly having a suction motor axis of rotation; and,
  (b) a cyclone unit, the cyclone unit comprising a cyclone having a cyclone axis of rotation, a cyclone unit handle, wherein the cyclone unit handle comprises an air flow passage.

In some embodiments, the cyclone unit handle may comprise an inlet passage of the cyclone unit.

In some embodiments, the inlet passage may extend longitudinally between a dirty air inlet end and an outlet end.

In some embodiments, the cyclone unit handle may comprise a portion spaced from the cyclone unit whereby a finger receiving area is provided between the cyclone unit handle and the cyclone unit.

In some embodiments, the cyclone unit handle may be provided above the cyclone unit.

In some embodiments, the passage may extend generally parallel to the cyclone axis.

In some embodiments, the driving handle may comprise a portion spaced from the main body whereby a finger receiving area is provided between the driving handle and the main body.

In some embodiments, the driving handle may be provided at the rear end of the main body.

In some embodiments, the cyclone unit may be removable from the main body and the cyclone unit handle may be removable with the cyclone unit.

In some embodiments, when the hand vacuum cleaner is oriented with the upper end positioned above the lower end, the cyclone axis of rotation may be generally horizontal.

In some embodiments, a bleed valve may be positioned in the cyclone unit handle.

In accordance with another aspect of this disclosure, a surface cleaning apparatus is electrically connectable with an accessory cleaning tool (e.g., a rigid air flow conduit, a crevice tool, a brush or the like) and a circuit electrically connecting the accessory tool with a source or power provided for the surface cleaning apparatus (e.g., AC power from a wall outlet or an on board energy storage member such as one or more batteries) is moved from a circuit open position to a circuit closed position when the accessory tool is mounted in air flow communication with the surface cleaning apparatus. An advantage of this design is that the terminal ends of the electrical outlet of the surface cleaning apparatus are de-energized when they are exposed. In one embodiment, an electrical conductor element of the accessory cleaning tool drives an electrical conductor element of the surface cleaning apparatus to a circuit closed position when the accessory tool is mounted in air flow communication with the surface cleaning apparatus. Accordingly, one or more of the electrical conductor elements of the surface cleaning apparatus may be biased to a circuit open position and may be moveable (e.g., linearly moveable, by contact with the electrical conductor element of the accessory tool). In alternate embodiments, the driving member provided on the accessory cleaning tool may be a non-conductive (e.g., plastic) engagement member (e.g., finger), that engages a member (e.g., a slideable tab of a housing of the electrical conductor elements of the surface cleaning apparatus) to move the electrical conductor elements of the surface cleaning apparatus to a circuit closed position.

In accordance with this aspect, there is provided a surface cleaning apparatus comprising:
  (a) an air flow passage extending between a dirty air inlet and a clean air outlet;
  (b) a main body housing a suction motor and fan assembly that is positioned in the air flow passage;
  (c) an air treatment member positioned in the air flow passage;
  (d) an electrical outlet electrically connectable with an accessory cleaning tool; and,
  (e) a circuit extending between a source of power and the electrical outlet, the circuit comprising first and second electrical conductor elements, at least the first electrical conductor element is biased to a circuit open position wherein the first electrical conductor element is moved to a circuit closed position when an accessory cleaning tool is connected to the dirty air inlet.

In some embodiments, the first and second electrical conductor elements may engage electrical conductors of the accessory tool whereby the first and second electrical conductor elements are electrically connectable with the accessory cleaning tool and at least the first electrical connector conductor may be biased to a circuit open position.

In some embodiments, the first and second electrical conductor elements may comprise first and second electrical connector conductors, each of the electrical conductor elements may have an accessory tool contact end and a terminal end contact end, at least the first electrical connector conductor may be biased to a circuit open position and at least one of the accessory tool contact ends may be recessed in the electrical outlet when in the circuit open position.

In some embodiments, the circuit may comprise electrical conductive members, each of which extends from the source of power to a terminal end, at least the first electrical conductor element may be moveably mounted from a position in which it contacts one of the terminal ends to a position in which it is spaced from the terminal end.

In some embodiments, each of the electrical conductor elements may be moveably mounted from a position in which each of the electrical conductor elements contacts one of the terminal ends to a position in which the electrical conductor elements contacts are spaced from the terminal ends.

In some embodiments, the circuit may comprise electrical conductive members, each of which may extend from the source of power to a terminal end, the first and second electrical conductor elements may comprise first and second electrical connector conductors, each of the electrical conductor elements may have an accessory tool contact end and a terminal end contact end, at least the first electrical conductor element may be moveably mounted from a position in which it contacts one of the terminal ends to a position in which it is spaced from the terminal end.

In some embodiments, surface cleaning apparatus may further comprise a compression spring positioned between the first electrical conductor element and one of the terminal ends.

In some embodiments, the compression spring may be non-conductive.

The In some embodiments, the source of power may comprise a power cord.

In some embodiments, the circuit further may comprise a main power switch.

In some embodiments, the accessory cleaning tool may comprise a rigid air flow conduit.

In some embodiments, the surface cleaning apparatus may comprise a hand vacuum cleaner and the electrical outlet is provided adjacent the dirty air inlet.

In accordance with this aspect, there is also provided a surface cleaning apparatus comprising
  (a) a suction motor and fan assembly operable on a source of power;
  (b) an electrical outlet housing having first and second electrical conductor elements, each of the electrical conductor elements has a first contact end and a second contact end; and,
  (c) a circuit including the electrical conductor elements and a main power switch operable between a circuit closed position and a circuit open position, at least the first electrical conductor element is moveable between a circuit closed position and a circuit open position and is biased to the circuit open position wherein the first electrical conductor element is moved to a circuit closed position upon mechanical engagement of a part having an air flow conduit with the electrical outlet housing.

In some embodiments, the circuit may comprise electrical conductive members, each of which may extend from the source of power to a terminal end, at least the first electrical conductor element may be moveably mounted from a position in which it contacts one of the terminal ends to a position in which it is spaced from the terminal end.

In some embodiments, each of the electrical conductor elements may be moveably mounted from a position in which each of the electrical conductor elements contacts one of the terminal ends to a position in which the electrical conductor elements contacts are spaced from the terminal ends.

In some embodiments, the surface cleaning apparatus may further comprise a compression spring positioned between the first electrical conductor element and the one of the terminal ends.

In some embodiments, the compression spring may be non-conductive.

In some embodiments, the source of power may comprise a power cord.

In some embodiments, the first electrical conductor element may be longitudinally moveable in the electrical outlet housing In some embodiments, the surface cleaning apparatus may comprise a hand vacuum cleaner and the electrical outlet housing is provided adjacent a dirty air inlet.

In accordance with another aspect of this disclosure, a hand vacuum cleaner is provided with a front openable door of a dirt collection area and the hand vacuum cleaner has a handle that extends upwardly and forwardly when the hand vacuum cleaner is oriented with the upper end above the lower end (e.g., when the hand vacuum cleaner is seated on a horizontal surface). An advantage of this design is that the handle is oriented to permit the user to point the hand vacuum cleaner downwardly to empty the dirt collection area when the door is opened.

In accordance with this aspect, there is provided a hand vacuum cleaner having a front end having a dirty air inlet, a rear end, a clean air outlet, an upper end and a bottom, the hand vacuum cleaner comprising:

(a) a main body comprising an upper end, a lower end, a front end, a rear end and a driving handle, the main body housing a suction motor and fan assembly, the suction motor and fan assembly having a suction motor axis of rotation wherein the driving handle has a hand grip portion that extends upwardly and forwardly when the hand vacuum cleaner is oriented with the upper end above the lower end; and, (b) an air treatment member comprising a dirt collection region having an openable door provided on a front end of the air treatment member and an openable door lock comprising a door release actuator wherein the door is moveable to an open position when the door release actuator is actuated.

In some embodiments, the hand grip portion may be spaced from the main body whereby a finger receiving area is provided between the hand grip portion and the main body.

In some embodiments, at least a portion of the finger receiving area may be positioned linearly rearwardly from the air treatment member.

In some embodiments, the main body may comprise a suction motor housing and the driving handle has an end that may extend from the suction motor housing.

In some embodiments, the main body may comprise a suction motor housing and the driving handle may have an end that extends upwardly and forwardly from the suction motor housing.

In some embodiments, the driving handle may be provided at the rear end of the main body.

In some embodiments, the inlet passage may extend generally rearwardly.

In some embodiments, the inlet passage may be positioned above the openable door.

In some embodiments, the dirty air inlet may comprise an inlet passage that extends longitudinally between an inlet end and an outlet end and has a longitudinal passage axis and the longitudinal passage axis interests the driving handle.

In some embodiments, the air treatment member may have a front end having an air treatment member air inlet and a longitudinally rearwardly spaced apart rear end having an air treatment member air outlet.

In some embodiments, the inlet passage may be positioned above the openable door.

In accordance with this aspect, there is also provided a hand vacuum cleaner having a front end having a dirty air inlet, a rear end, a clean air outlet, an upper end and a bottom, the hand vacuum cleaner comprising:

(a) a main body comprising an upper end, a lower end, a front end, a rear end and a driving handle, the main body housing a suction motor and fan assembly, the suction motor and fan assembly having a suction motor axis of rotation wherein the driving handle has a hand grip portion that extends upwardly and forwardly when the hand vacuum cleaner is oriented with the upper end above the lower end; and, (b) a cyclone unit comprising a cyclone having a cyclone axis of rotation, a dirt collection region having an openable door provided on a front end of the cyclone unit and an openable door lock comprising a door release actuator wherein the door is moveable to an open position when the actuator is actuated.

In some embodiments, the hand grip portion may be spaced from the main body whereby a finger receiving area is provided between the hand grip portion and the main body.

In some embodiments, at least a portion of the finger receiving area may be positioned linearly rearwardly from the cyclone unit.

In some embodiments, the main body may comprise a suction motor housing and the driving handle has an end that extends from the suction motor housing.

In some embodiments, the main body may comprise a suction motor housing and the driving handle has an end that extends upwardly and forwardly from the suction motor housing.

In some embodiments, the driving handle may be provided at the rear end of the main body.

In some embodiments, the inlet passage may extend generally rearwardly.

In some embodiments, the inlet passage may be positioned above the openable door.

In some embodiments, the dirty air inlet may comprise an inlet passage that extends longitudinally between an inlet end and an outlet end and has a longitudinal passage axis and the longitudinal passage axis interests the driving handle.

In some embodiments, the inlet passage may be positioned above the openable door.

In some embodiments, when the hand vacuum cleaner may be oriented with the upper end above the lower end, the cyclone axis of rotation is generally horizontal.

It will be appreciated that the aspects and embodiments may be used in any combination or sub-combination.

DRAWINGS

The drawings included herewith are for illustrating various examples of articles, methods, and apparatuses of the teaching of the present specification and are not intended to limit the scope of what is taught in any way.

FIG. 7 is a front perspective view of the surface cleaning apparatus of FIG. 1, with a cyclone unit partially cutaway;

FIG. 8 is a front perspective view of the surface cleaning apparatus of FIG. 1 with the cyclone unit separated from a main body and a pre-motor filter chamber in an open position;

FIG. 10A is the rear perspective view of FIG. 10 showing the cyclone unit being held by the cyclone unit handle;

FIG. 26 is a perspective view of a surface cleaning apparatus with the cyclone unit separated from the main body, in accordance with another embodiment;

FIG. 28 is a perspective view of a surface cleaning apparatus with the cyclone unit separated from the main body, in accordance with another embodiment;

FIG. 29 is a perspective view of a surface cleaning apparatus with the cyclone unit separated from the main body, in accordance with another embodiment; and, FIG. 30 is a perspective view of a surface cleaning apparatus with the cyclone unit separated from the main body, in accordance with another embodiment.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Figure 1:
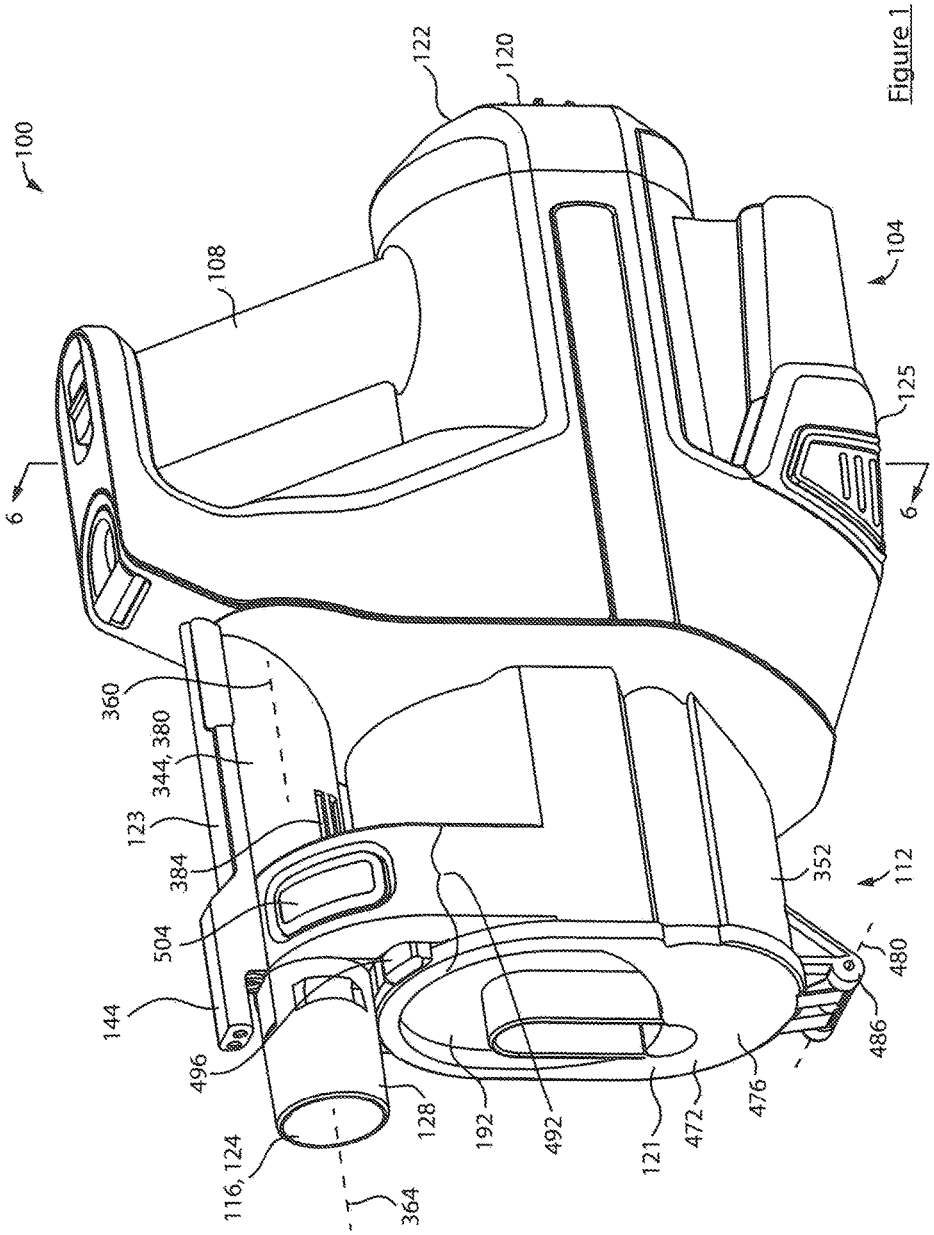
FIG. 1 is a front perspective view of a surface cleaning apparatus in accordance with at least one embodiment.
Figure 2:
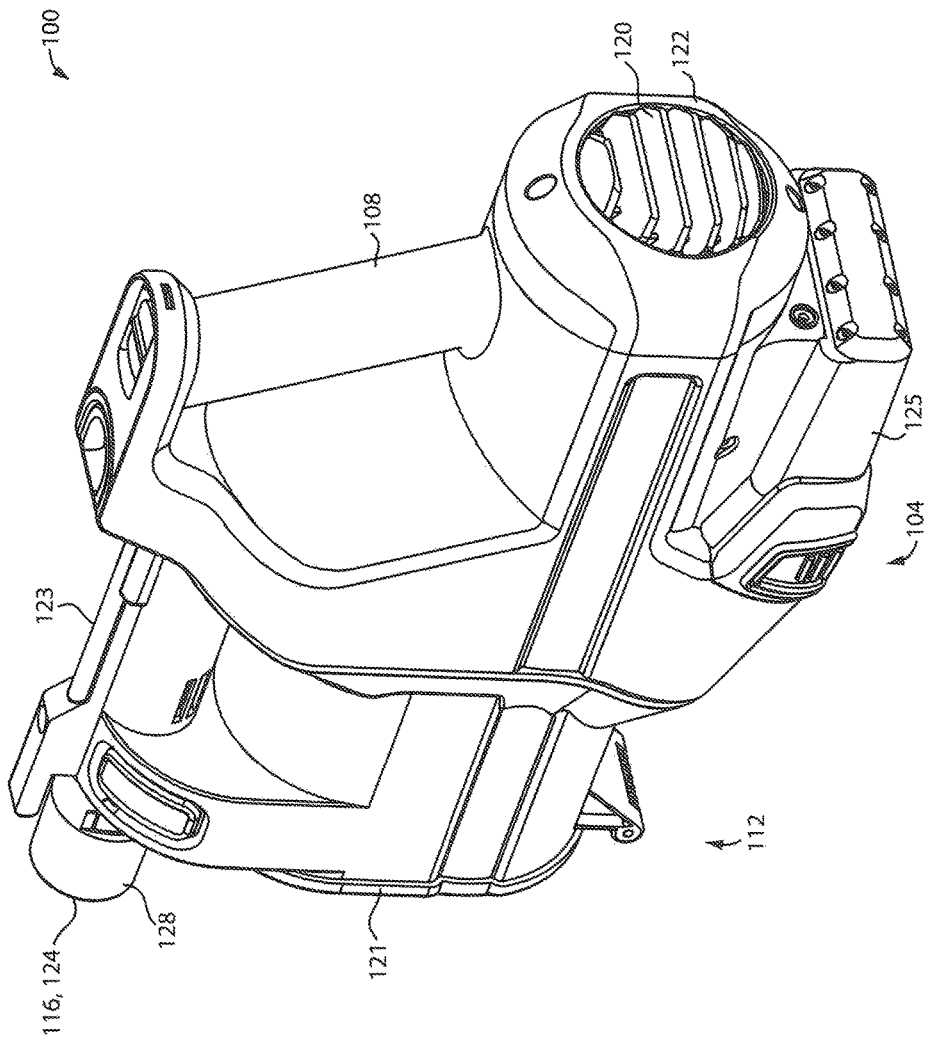
FIG. 2 is a rear perspective view of the surface cleaning apparatus of FIG. 1.
Figure 3:
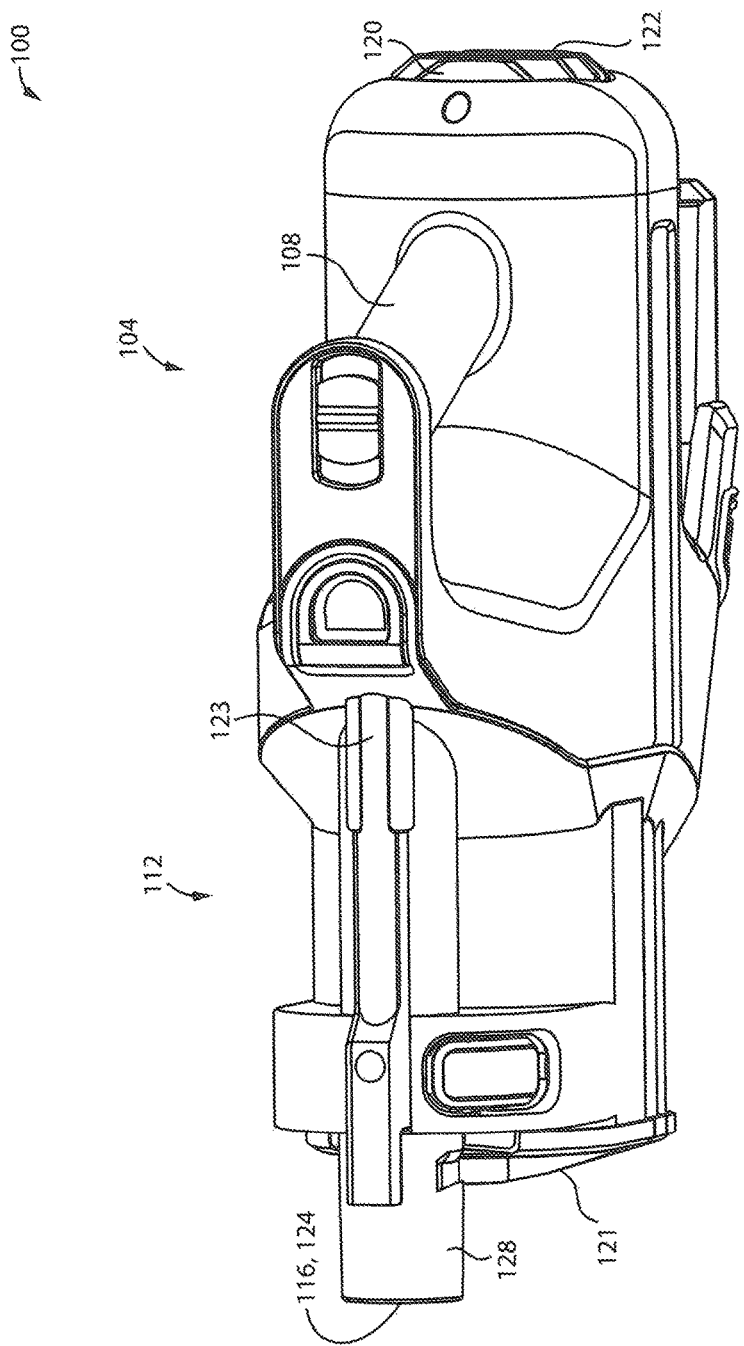
FIG. 3 is a top perspective view of the surface cleaning apparatus of FIG. 1.

Referring to FIG. 1, an embodiment of a surface cleaning apparatus 100 is shown. The following is a general discussion of this embodiment which provides a basis for understanding each of the features which is discussed herein. As discussed in detail subsequently, each of the features may be used in other embodiments.

In the embodiment illustrated, the surface cleaning apparatus 100 is a hand-held vacuum cleaner, which is commonly referred to as a "hand vacuum cleaner" or a "handvac". As used herein and in the claims, a hand-held vacuum cleaner or hand vacuum cleaner or handvac is a vacuum cleaner that can be operated one-handedly to clean a surface while its weight is held by the same one hand. This is contrasted with upright and canister vacuum cleaners, the weight of which is supported by a surface (e.g. floor below) during use. Optionally, surface cleaning apparatus 100 could be removably mountable on a base so as to form, for example, an upright vacuum cleaner, a canister vacuum cleaner, a stick vac, a wet-dry vacuum cleaner and the like. Power can be supplied to the surface cleaning apparatus 100 by an electrical cord (not shown) that can be connected to a standard wall electrical outlet. Alternatively, or in addition, the power source for the surface cleaning apparatus can be an onboard energy storage device, including, for example, one or more batteries.

Figure 4:
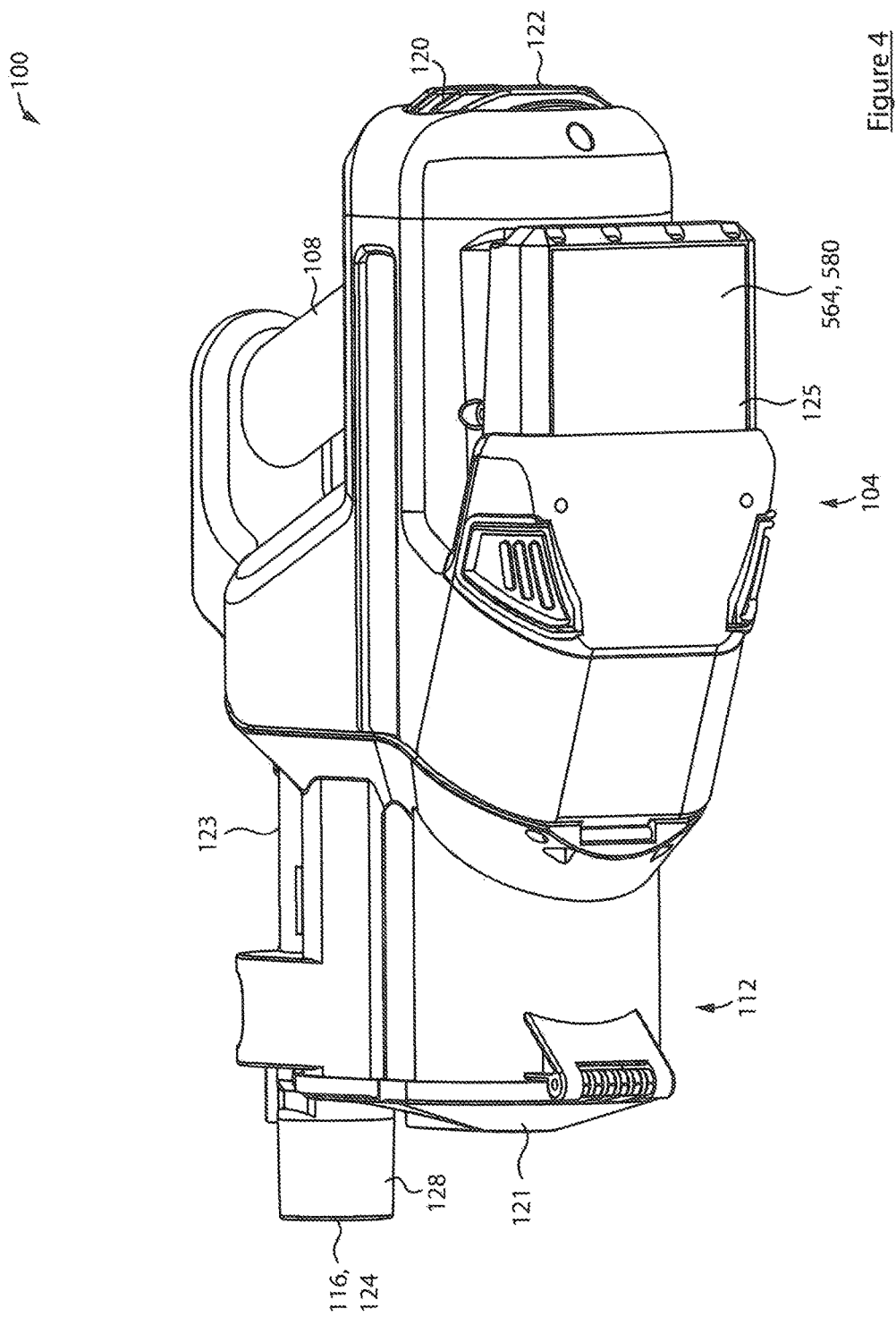
FIG. 4 is a bottom perspective view of the surface cleaning apparatus of FIG. 1.
Figure 5:
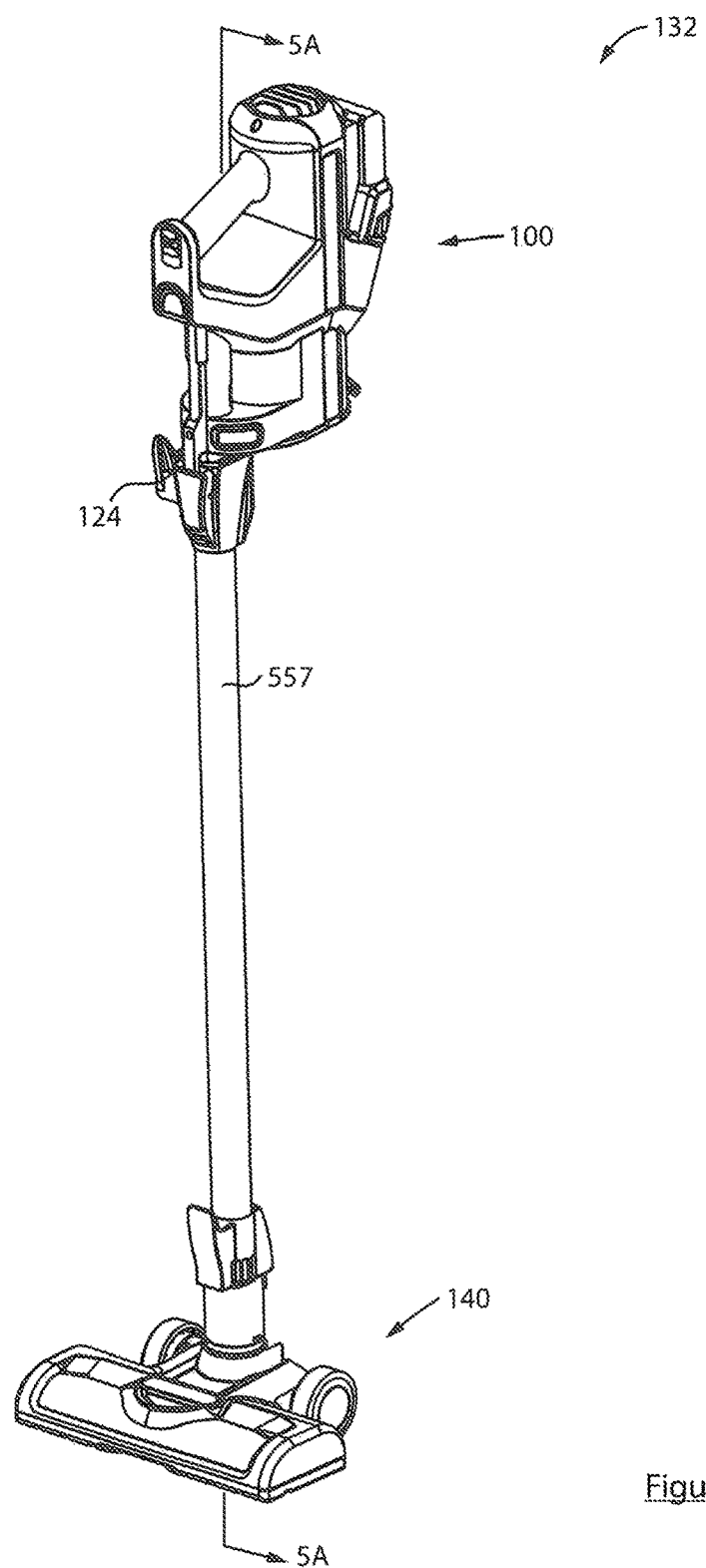
FIG. 5 is a perspective view of the surface cleaning apparatus of FIG. 1 mounted to a wand and surface cleaning head in a stickvac configuration.
Figure 5A:
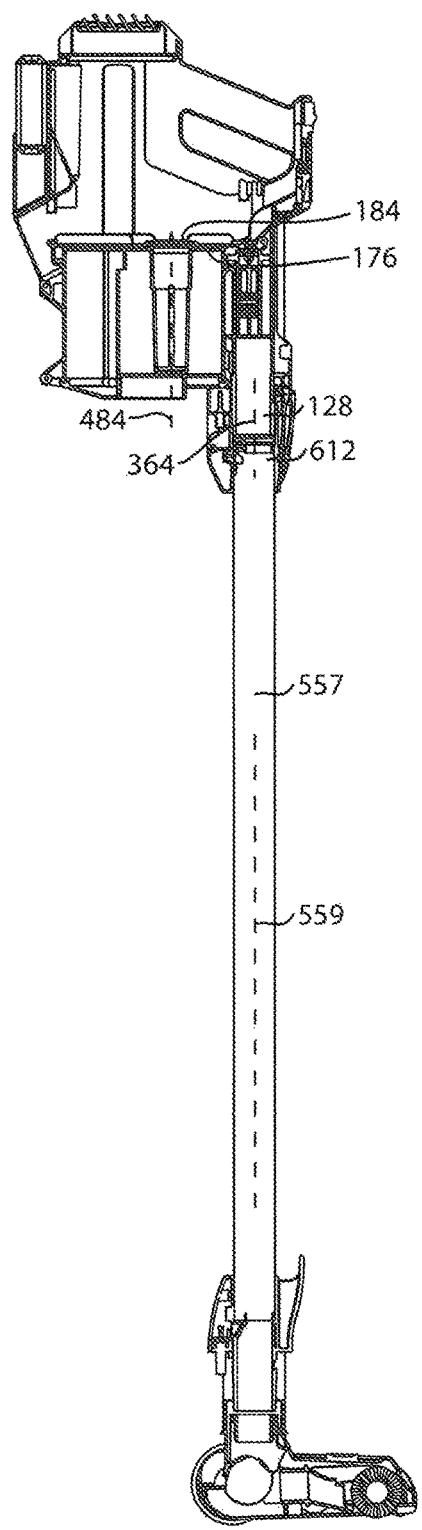
FIG. 5A is a cross-sectional view taken along line 5A-5A in FIG. 5.

As exemplified in FIGS. 1-4, the surface cleaning apparatus 100 may comprise a main body 104 having a handle 108, an air treatment member 112 connected to the main body 104, a dirty air inlet 116, a clean air outlet 120, and an air flow path extending between the inlet 116 and outlet 120. Surface cleaning apparatus 100 includes a front end 121, a rear end 122, an upper end 123, and a bottom 125. In the embodiment shown, the dirty air inlet 116 is at the front end 121. As exemplified, dirty air inlet 116 is the inlet end 124 of an inlet passage 128. Dirty air inlet 116 may be positioned forward of air treatment member 112 as shown. Optionally, the inlet end 124 can be used as a nozzle to directly clean a surface. Alternatively, the inlet end 124 can be connected or directly connected to the downstream end of any suitable accessory tool such as a rigid air flow conduit (e.g. wand, crevice tool, mini brush or the like) for example. For example, FIGS. 5 and 5A show an exemplary surface cleaning apparatus 132 (e.g. a stickvac) including surface cleaning apparatus 100 with connector inlet end 124 directly connected to a wand 136 (e.g., wand outlet end 612 may be removably connectable in air flow communication with inlet connector 128) that is pivotally connected to a surface cleaning head 140. Wand may be securable to connector 128 by any means known in the art such as a locking member or a friction fit. In the illustrated configuration of FIG. 5, the surface cleaning apparatus 100 can be used to clean a floor or other surface in a manner analogous to conventional upright-style vacuum cleaners.

From the dirty air inlet 116, the air flow path may extend through an air treatment member 112. The air treatment member 112 may be any suitable member that can treat the air in a desired manner, including, for example, removing dirt particles and debris from the air. In the illustrated example, the air treatment member is a cyclone unit 112, which may be of any design. Alternatively or in addition, the air treatment member may comprise one or more of a bag, a filter or other air treating means.

Cyclone unit 112 may include one or a plurality of cyclones for separating dirt from the air flow, and one or a plurality of dirt collection regions for receiving dirt separated in the cyclone(s). As exemplified in FIG. 6, cyclone unit 112 includes a cyclone or cyclone chamber 160 and an external dirt collection chamber 164. The cyclone 160 and dirt collection chamber 164 may be of any configuration suitable for separating dirt from an air stream and collecting the separated dirt, respectively. For example, it will be appreciated that in some dirt collection area may be internal of the cyclone chamber, e.g., a dirt collection area may be provided at a longitudinal end of the cyclone chamber. Cyclone 160 may be oriented in any direction. For example, when surface cleaning apparatus 100 is positioned with bottom 125 on a horizontal surface 584, cyclone axis of rotation 484 may be oriented horizontally as exemplified, vertically, or at any angle between horizontal and vertical.

Figure 6:
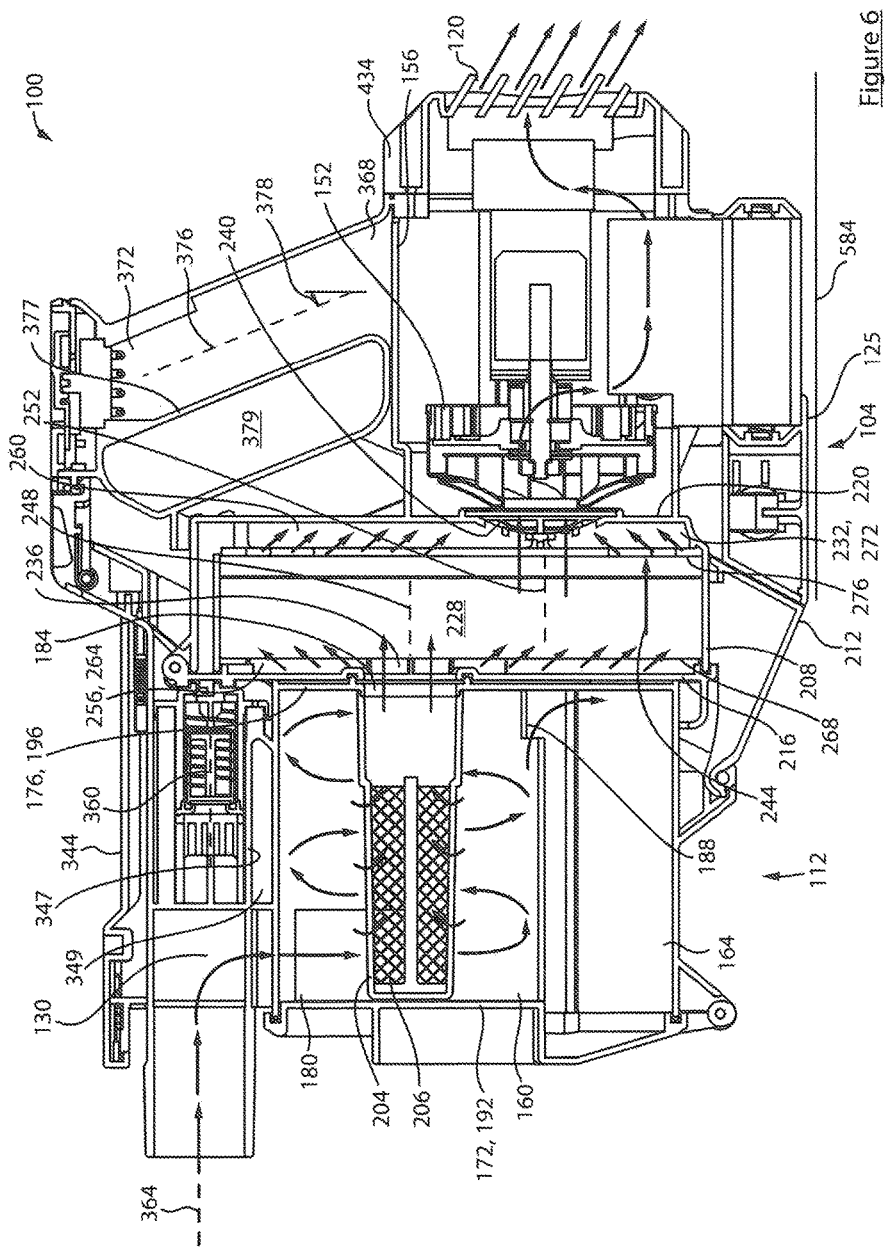
FIG. 6 is a cross-sectional view taken along line 6-6 in FIG. 1, showing an air flow path.

As also exemplified in FIG. 6, a suction motor and fan assembly 152 may be mounted within a motor housing portion 156 of the main body 104. In this configuration, the suction motor and fan assembly 152 is downstream from the cyclone unit 112, and the clean air outlet 120 is downstream from the suction motor and fan assembly 152.

Optionally, one or more pre-motor filters may be placed in the air flow path between the air treatment member and the suction motor and fan assembly. Alternatively, or in addition, one or more post-motor filters may be provided downstream from the suction motor and fan assembly.

As exemplified in FIG. 6, main body 104 is shown including a pre-motor filter housing portion 208 that is positioned in the air flow path downstream of cyclone unit 112. Pre-motor filter housing 208 may be of any construction known in the vacuum cleaner art. As exemplified, filter housing 208 may be bounded by one or more walls, which may be integral with or discrete from the main body exterior walls 212. Turning to FIG. 8, pre-motor filter housing 208 is shown including a filter housing first wall 216 axially opposite a filter housing second wall 220, and a filter housing sidewall 224 that extends in the direction of the cyclone axis of rotation between the first and second walls 216 and 220. It will be appreciated that first wall 216 is optional and second wall 220 may be in the form of ribs to hold the filter in place. In the illustrated example, filter housing sidewall 224 is discrete from main body exterior walls 212, which may provide enhanced sound insulation for air passing through the pre-motor filter housing 208. In alternative embodiments, filter housing sidewall 224 may be defined in whole or in part by main body exterior walls 212 for a more compact design.

Referring back to FIG. 6, one or more filters made of or comprising a porous filter media may be positioned within the pre-motor filter housing 208 to filter particles remaining in the air flow exiting the cyclone air outlet 184, before the air flow passes through the suction motor and fan assembly 152. In the illustrated embodiments, pre-motor filter housing 208 contains an upstream filter 228 and a downstream filter 232. The pre-motor filters 228 and 232 may be of any suitable configuration and formed from any suitable materials. Preferably, the pre-motor filters 228 and 232 are made of porous media such as foam, felt, or filter paper. Preferably a foam pre-motor filter is provided upstream of a felt pre-motor filter.

Pre-motor filter housing 208 may include a filter housing air inlet and a filter housing air outlet of any suitable design and arrangement within the housing 208. In the illustrated embodiment, pre-motor filter housing 208 includes a filter housing air inlet 236 formed in filter housing first wall 216, and a filter housing air outlet 240 formed in filter housing second wall 220.

Still referring to FIG. 6, pre-motor filter housing 208 may promote the air flow to broadly distribute across the pre-motor filters 228 and 232 inside. This allows the collected dust particles to be more evenly distributed throughout pre-motor filters 228 and 232 instead of concentrating in a narrow air flow path. An advantage of this design is that the pre-motor filters 228 and 232 will have a greater effective dirt capacity, which allows the pre-motor filters 228 and 232 to be cleaned or replaced less frequently. To this end, pre-motor filter housing 208 may have any structure suitable for broadly distributing the air flow across pre-motor filters 228 and 232. For example, pre-motor filter housing 208 may provide an upstream header 256, a downstream header 260, or both as shown. Headers 256 and 260 may be provided by spacing the pre-motor filters from the filter housing end walls 216 and 220 respectively. In some embodiments, pre-motor filter housing 208 includes spacing members positioned to hold the pre-motor filters 228 and 232 away from the filter housing end walls 216 and 220. For example, referring to FIGS. 6 and 8, filter housing first wall 216 may include upstanding ribs 264 that hold the upstream side 268 of pre-motor filter 228 spaced apart from filter housing first wall 216 to allow air from filter housing air inlet 236 to flow laterally between pre-motor filter 228 and filter housing first wall 216 before penetrating pre-motor filter 228. The illustrated example also shows filter housing second wall 220 including upstanding ribs 272 that hold the downstream side 276 of pre-motor filter 232 spaced apart from filter housing second wall 220 to allow air exiting pre-motor filter 232 to flow laterally between pre-motor filter 232 and filter housing second wall 220, to filter housing air outlet 240.

Cyclone with a Unidirectional Flow of Air

The following is a description of a cyclone that may be used by itself in any surface cleaning apparatus or in any combination or sub-combination with any other feature or features disclosed including uniflow cyclone, the positioning of the dirt collection chamber, the orientation of the suction motor, the lateral stability members, the air treatment member handle, the position and orientation of a driving handle, pre-motor filter housing door, air treatment member door actuator, counterweight stand and electrical coupling members.

In accordance with this aspect a cyclone comprises a cyclone with a unidirectional flow of air or a "uniflow" cyclone. As discussed in more detail, the uniflow cyclone may be horizontally disposed as opposed to being vertically disposed which is typical in the art. In other words, when held by hand and used to clean a surface, the axis of the cyclone chamber may be closer to horizontal than vertical.

In accordance with this aspect, the cyclone air inlet may be at the front end and the cyclone air outlet may be at the rear end. An advantage of this design is that the cyclone inlet may be used to redirect the air from the inlet passage 124 to the cyclone chamber and the air may exit the cyclone and travel linearly to the pre-motor filter. Accordingly, dirty air may travel from the dirty air inlet to the pre-motor filter without passing through any bends, thereby reducing the backpressure created by flow through the vacuum cleaner.

Alternately or in addition, in accordance with this aspect, the cyclone air inlet may be in an upper portion of the sidewall 168 of the cyclone. An advantage of this design is that is that it inhibits dirt that may remain in cyclone chamber 160 from exiting or blocking the air inlet when the apparatus is moved to various operating angles.

Alternately or in addition, in accordance with this aspect, the dirt collection chamber 164 may be external to the cyclone chamber 160. Further, the dirt outlet 188 of the cyclone chamber 160 may be at a rear end of the cyclone chamber and/or may be in a lower portion of the cyclone chamber, such as in a lower part of sidewall 168 of the cyclone chamber. An advantage of placing the dirt outlet 188 in a lower portion of the rear end of the cyclone chamber 160 is that, when the handvac is in use with inlet 116 pointed downwardly, dirt will enter the dirt collection chamber 164 and fall forwardly due to gravity thereby preventing outlet 188 from becoming blocked until the dirt collection chamber 164 is full.

FIG. 7 exemplifies a cyclone unit including these aspects. As exemplified, cyclone 160 comprises a cyclone sidewall 168 extending axially from a cyclone first end 172 (e.g. front end comprising first end wall 192) to a cyclone second end 176 (e.g. rear end comprising second end wall 196), a cyclone air inlet 180 which enters cyclone 160 at a front portion of sidewall 168, a cyclone air outlet 184 provided in cyclone second end wall 196, and a cyclone dirt outlet 188. Cyclone sidewall 168 includes an upper wall 169 and a lower wall 171. As exemplified in FIG. 6, dirty air may enter cyclone 160 tangentially at cyclone air inlet 180 (which may be provided in the upper wall 169), and swirl (e.g. move cyclonically) through cyclone 160 to separate dirt from the air flow, and then exit cyclone 160 through cyclone air outlet 184. The separated dirt may exit cyclone 160 through cyclone dirt outlet 188 and deposit into dirt collection chamber 164.

As exemplified a vortex finder 204 may extend axially between cyclone first and second ends 172 and 176. Vortex finder 204 may have any configuration known in the art. For example, vortex finder 204 may be connected to cyclone second end wall 196 and extend axially towards cyclone first end 172. Vortex finder 204 may surround cyclone air outlet 184, so that air exiting cyclone 160 travels downstream through vortex finder 204 to cyclone air outlet 184. Vortex finder 204 may include filter media 206 (e.g. mesh) to capture large dirt particles (e.g. hair and coarse dust) that remains in the air flow exiting cyclone 160.

It will be appreciated that if cyclone air inlet 180 is located at an upper end of the cyclone 160, then inlet passage 128 is may be located above the central longitudinal axis of cyclone 160 and preferably is located above cyclone 160. For example, as exemplified in FIGS. 1, 6 and 7, cyclone air inlet 180 may be a tangential air inlet so that air entering the cyclone 160 will tend to rotate as the air travels axially through the cyclone 160, thereby dis-entraining dirt and debris from the air flow, before leaving the cyclone via the air outlet 184. Further, inlet passage 128 extends longitudinally between passage inlet end 124 (i.e., the dirty air inlet 116) and passage outlet end 130 along a longitudinal passage axis 364, and passage outlet end 130 communicates (e.g. is positioned upstream) of cyclone air inlet 180. Passage axis 364 may be linear, and all of the longitudinal passage axis 364 may be positioned above cyclone axis of rotation 484 when surface cleaning apparatus 100 is positioned with bottom 125 on a horizontal surface 584.

Cyclone air inlet 180 may be positioned and constructed in any manner suitable for directing air tangentially into cyclone 160. In the illustrated example of FIG. 22, cyclone air inlet 180 is formed as a curved passage extending from a cyclone air inlet upstream end 532 to a cyclone air inlet downstream end 536. The cyclone air inlet downstream end 536 may be oriented to direct air substantially tangentially to the inner surface of sidewall 168. As exemplified, cyclone air inlet 180 may be positioned above cyclone axis of rotation 484 and suction motor axis of rotation 540. For example, cyclone air inlet 180 may be positioned at an upper end 544 of cyclone 160. This allows gravity to assist with inhibiting dirt inside cyclone 160 from blocking or exiting cyclone air inlet 180. This is because at least a portion of the cyclone 160 will be positioned below the cyclone air inlet 180 when apparatus 100 is held at various operating angles, so that the dirt inside will tend to fall away from cyclone air inlet 180.

Figure 22:
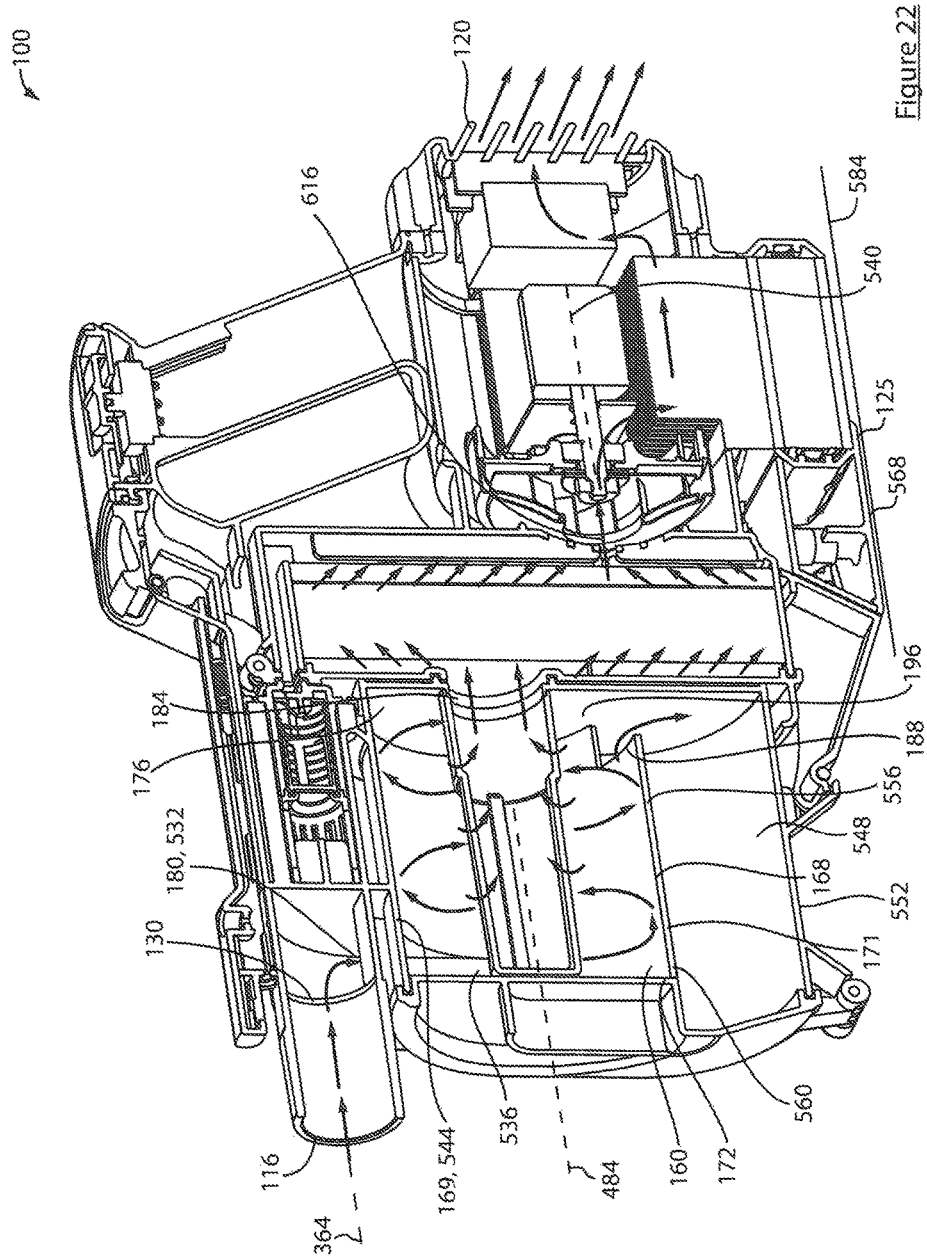
FIG. 22 is a cross-sectional perspective view taken along line 6-6 in FIG. 1.

Still referring to FIG. 22, cyclone air inlet 180 is formed in cyclone sidewall 168 at cyclone first end 172, and cyclone air outlet 184 is formed in cyclone second end wall 196 at cyclone second end 176. As exemplified, air may exit cyclone air outlet 184 in a flow direction 616 that is generally parallel to the suction motor axis of rotation 540.

As exemplified in FIG. 6, main body lower end 568 may comprise bottom 125. In the illustrated example, when bottom 125 is placed on a horizontal surface, cyclone 160 may be oriented horizontally if bottom or base 125 is parallel to the cyclone axis. If will be appreciated that if bottom 125 is oriented at an angle to the horizontal, e.g., so that dirt air inlet 116 points downwardly when bottom 125 is on a horizontal surface, cyclone 160 may be not be oriented horizontally when bottom 125 is on a horizontal surface. It will be appreciated that, as referred to herein, cyclone 160 being horizontal relates to the orientation if bottom 125 is parallel to the cyclone axis of rotation 484.

As exemplified in FIG. 5A, when inlet connector 128 is mounted to a wand 557 (i.e. rigid air flow conduit), the wand axis 559, the inlet connector axis 364, and the cyclone axis of rotation 484 may be parallel. An advantage of this embodiment is that This reduces bends in the air flow for improved air efficiency. It will be appreciated that only some of these axes may be parallel. For example, only the inlet connector axis 364 and the cyclone axis of rotation 484 may be parallel.

Positioning of the Dirt Collection Chamber

The following is a description of a dirt collection chamber that may be used by itself in any surface cleaning apparatus or in any combination or sub-combination with any other feature or features disclosed herein including the uniflow cyclone, the orientation of the suction motor, the lateral stability members, the air treatment member handle, the position and orientation of a driving handle, pre-motor filter housing door, air treatment member door actuator, counterweight stand and electrical coupling members.

In accordance with this aspect of the disclosure, a dirt collection chamber for a cyclone chamber may be provided external to and below the cyclone chamber. An advantage of this design is that a cyclone dirt outlet 188 may be provided in a lower portion of the cyclone chamber (e.g., cyclone dirt outlet 188 is provided in lower wall 171) such that dirt which remains in the cyclone chamber after termination of operation of the vacuum cleaner may fall into the dirt collection chamber when the vacuum cleaner is held with the cyclone extending horizontally and slightly upwardly. A further advantage is that the width of the vacuum cleaner may be narrower as the dirt collection chamber is not located on the lateral sides of the cyclone chamber. Therefore, as exemplified in FIG. 18, the maximum width of a handvac may be determined by the width of the suction motor housing or the width of the cyclone 160.

Figure 18:
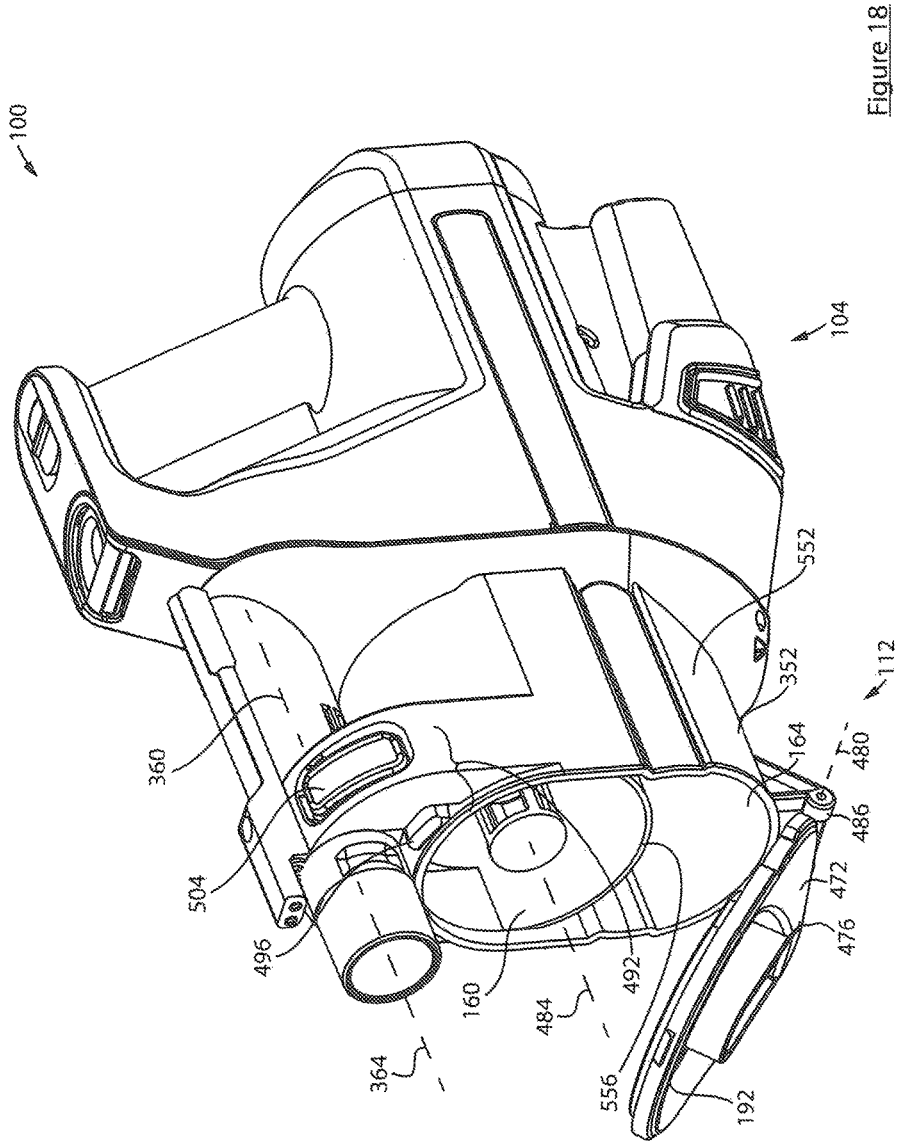
FIG. 18 is a front perspective view of the surface cleaning apparatus of FIG. 1, with a front cyclone unit wall in an open position.

As exemplified in FIG. 18, dirt collection chamber 164 extends around approximately one-half of cyclone 160. As exemplified, partition wall 556 may circumscribe approximately one-half of cyclone 160. In other embodiments, dirt collection chamber 164 may extend around less than or greater than one-half of cyclone 160, and partition wall 556 may similarly circumscribe less than or greater than one-half of cyclone 160. In alternative embodiments, dirt collection chamber 164 may not surround cyclone 160.

It will be appreciated that cyclone sidewall 168 and dirt collection chamber sidewall 548 may have any construction suitable for separating the cyclone 160 from dirt collection chamber 164 and allowing the passage of dis-entrained dirt therebetween. For example, cyclone sidewall 168 and dirt collection chamber sidewall 548 may be discrete walls that are spaced apart and connected by a dirt outlet passage. As exemplified in FIG. 18, dirt collection chamber sidewall 548 is formed at least in part by portions of cyclone sidewall 168 and portions of cyclone unit exterior wall 552. Similarly, cyclone sidewall 168 as shown is formed at least in part by portions of dirt collection chamber sidewall 548 and cyclone unit exterior wall 552. Accordingly, the wall portion 556 in common between cyclone 160 and dirt collection chamber 164 may operate as a dividing wall. Sharing a common dividing wall may help reduce the overall size of the cyclone unit 112, for a more compact design.

Returning to FIG. 22, cyclone 160 may include any dirt outlet 188 suitable for directing dis-entrained dirt from cyclone 160 to dirt collection chamber 164. For example, dirt outlet 188 may be formed in or connected to one or more (or all) of cyclone sidewall 168 and cyclone end walls 192 and 196. In the illustrated embodiment, dirt outlet 188 is formed in cyclone sidewall 168. Dirt outlet 188 may have any shape and size suitable for allowing dirt particles to pass into dirt collection chamber 164. In the illustrated embodiment, dirt outlet 188 is formed as a rectangular aperture in wall portion 556. In alternative embodiment, dirt outlet 188 may be circular, triangular, or another regular or irregularly shaped aperture. As exemplified, cyclone dirt outlet 188 may be bounded in part by cyclone second end wall 196.

It will be appreciated that cyclone dirt outlet 188 may be positioned anywhere at or between cyclone first and second ends 172 and 176. In the illustrated embodiment, cyclone 160 is a uniflow cyclone and accordingly cyclone dirt outlet 188 is positioned at cyclone second end 176 proximate cyclone air outlet 184. This allows the dirt and air to travel towards the same end of the cyclone 160 before parting ways—the air exiting through air outlet 184 and the dirt exiting through dirt outlet 188.

In use, the air stream inside cyclone 160 swirls towards cyclone air outlet 184 at cyclone second end 176, which dis-entrains dirt particles against cyclone sidewall 168. Under the influence of the rearward air stream, the dirt particles travel towards cyclone second end 176 and exit through cyclone dirt outlet 188 to dirt collection chamber 164.

Referring to FIG. 18, dirt collection chamber 164 may have any size and shape suitable to accommodate dirt separated by cyclone 160 during one or more uses. A larger dirt collection chamber 164 can store more dirt to allow apparatus 100 to run longer before emptying dirt collection chamber 164, but will add bulk and weight to the apparatus 100. A smaller dirt collection chamber 164 is smaller and lighter, but must be emptied more frequently.

Orientation of the Suction Motor

The following is a description of the orientation of a suction motor that may be used by itself in any surface cleaning apparatus or in any combination or sub-combination with any other feature or features disclosed herein including the uniflow cyclone, the positioning of the dirt collection chamber, the lateral stability members, the air treatment member handle, the position and orientation of a driving handle, pre-motor filter housing door, air treatment member door actuator, counterweight stand and electrical coupling members.

As exemplified in FIG. 22, in accordance with this aspect, the axis of rotation of the suction motor may be generally parallel to the cyclone axis of rotation and/or the inlet conduit axis. An advantage of this design is that the air may travel generally rearwardly from the cyclone air outlet to the suction motor air inlet, thereby reducing the backpressure through this portion of the vacuum cleaner due to a reduction in the number of bends in the air flow path.

As exemplified in FIG. 22, when surface cleaning apparatus 100 is positioned with bottom 125 on a horizontal surface 584, the suction motor axis of rotation 540 may be generally horizontal. For example, cyclone sidewall 168 may extend generally horizontally between longitudinally spaced apart cyclone end walls 172 and 176, when surface cleaning apparatus 100 is positioned with bottom 125 on a horizontal surface 584. As exemplified, suction motor axis of rotation 540 may be generally parallel with cyclone axis of rotation 484. This allows for fewer bends in the air flow between dirty air inlet 116 and clean air outlet 120, which can result in reduced backpressure, all other elements remaining the same.

As exemplified, the suction motor axis of rotation 540 may be positioned below cyclone axis of rotation 484. This may provide surface cleaning apparatus 100 with a relatively lower center of gravity for greater stability when surface cleaning apparatus 100 is positioned with bottom 125 on a horizontal surface 584. In such a case, the pre-motor filter air inlet and outlet 236 and 240 may be axially offset as shown. In the illustrated example, filter housing air inlet axis 248 is located above and spaced apart from filter housing air outlet axis 252. An advantage of this design is that one or both of the headers may be used to change to elevation at which the air travels rearwardly with without using a conduit with bends. For example, air may travel generally rearwardly (linearly) into the pre-motor filter housing and air may travel generally rearwardly (linearly) out of the pre-motor filter housing, but at a lower elevation.

In alternate embodiments, filter housing air inlet and outlet axes 248 and 252 may not be spaced apart (e.g. they may be collinear).

In alternate embodiments, it will be appreciated that suction motor and fan assembly 152 may be positioned in main body 104 with its axis of rotation 540 oriented in any direction.

Lateral Stability Members

The following is a description of the lateral stability members that may be used by itself in any surface cleaning apparatus or in any combination or sub-combination with any other feature or features disclosed herein including the uniflow cyclone, the positioning of the dirt collection chamber, the orientation of the suction motor, the air treatment member handle, the position and orientation of a driving handle, pre-motor filter housing door, air treatment member door actuator, counterweight stand and electrical coupling members.

Optionally, the air treatment member may be separable from the main body, such as for emptying, cleaning, or replacing the air treatment member or other internal components of the apparatus, such as the pre-motor filters.

In accordance with this aspect the air treatment member 112 is removable mountable to the main body 104 and is provided with lateral stability members. For example, the air treatment member 112 may abut against a front face of the main body 104 (see for example FIG. 1). Optionally, one of the air treatment member 112 and the main body may be receivable in the other. Accordingly, when unlocked, the air treatment member 112 may be removed from the main body 104 by moving it forwardly. During use, a transverse force may be applied to the air treatment member 112. As exemplified, inlet 116 is provided on the removable air treatment member 112. Therefore, when used as part of a stickvac and handle 108 is driving connected to a surface cleaning head (see for example FIG. 5), a force may be provided transverse to wand axis 559. If sufficient pressure is applied, then the air treatment member may break off of the main body or the air tight seal between the air treatment member and the main body may be broken allowing air to bypass the surface cleaning head. The provision of the lateral stability members reinforces the joint of the air treatment member and the main body to resist such transverse forces.

The lateral stability members are provided internal of the handvac and may be provided on opposed facing faces of the air treatment member and the main body. The lateral stability members may comprise generally vertically extending inter-engagement members Cyclone unit 112 may be securable to main body 104 in any manner that allows the cyclone unit 112 to be selectively separated and reconnected to main body 104. For example, cyclone unit 112 and main body 104 may collectively include any releasable engagement members (e.g. latches, snaps, magnets, straps, etc.) suitable for releasably joining the cyclone unit 112 and main body 104. Further, cyclone unit 112 and main body 104 may collectively include any actuators that allow selective manual release (i.e. by hand) of the releasable engagement member(s). The releasable engagement member(s) and the actuator(s) may be mechanical, electrical, and/or electro-mechanical in nature.

Figure 9:
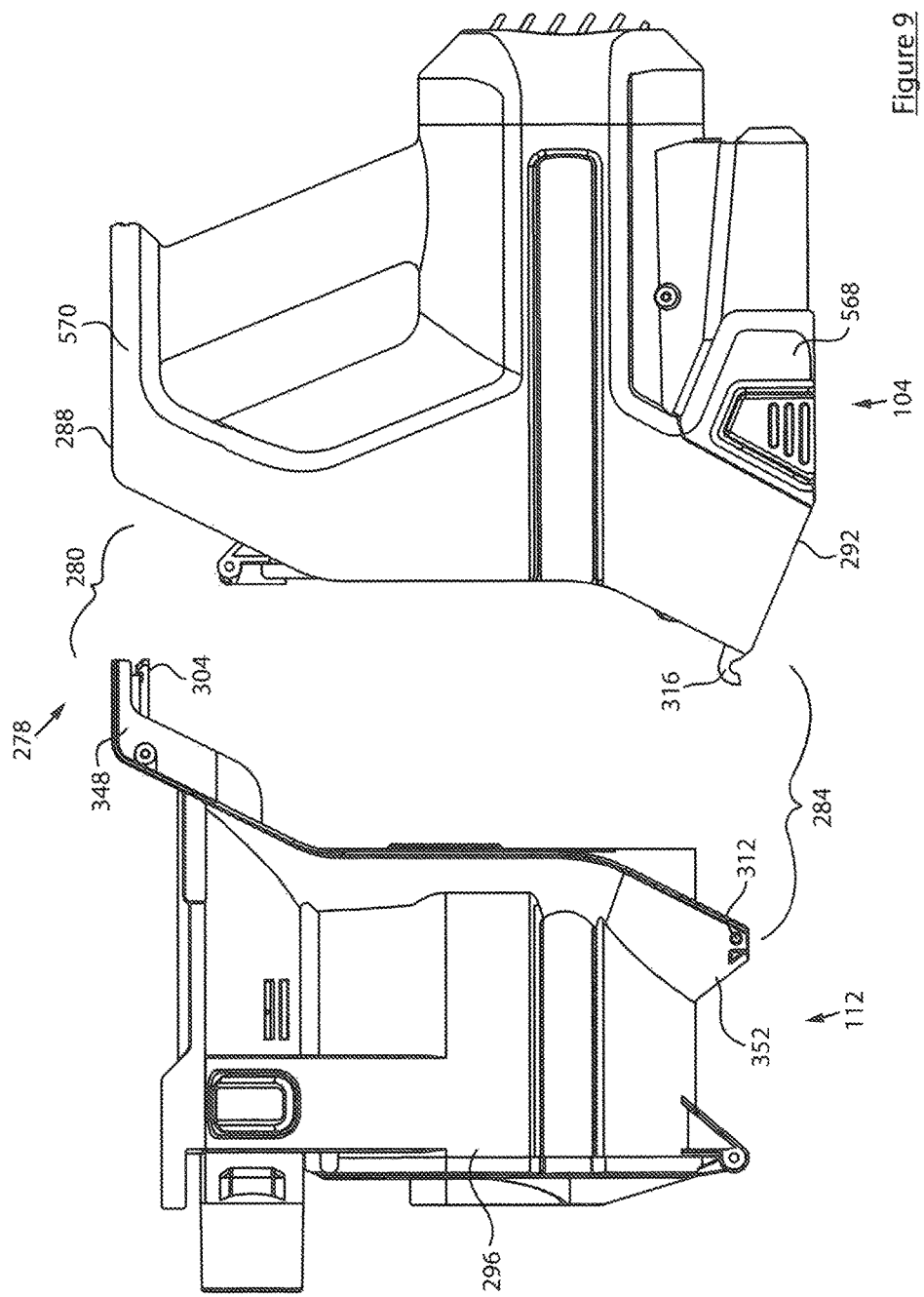
FIG. 9 is a side elevation view of the surface cleaning apparatus of FIG. 1 with the cyclone unit separated from the main body.
Figure 10:
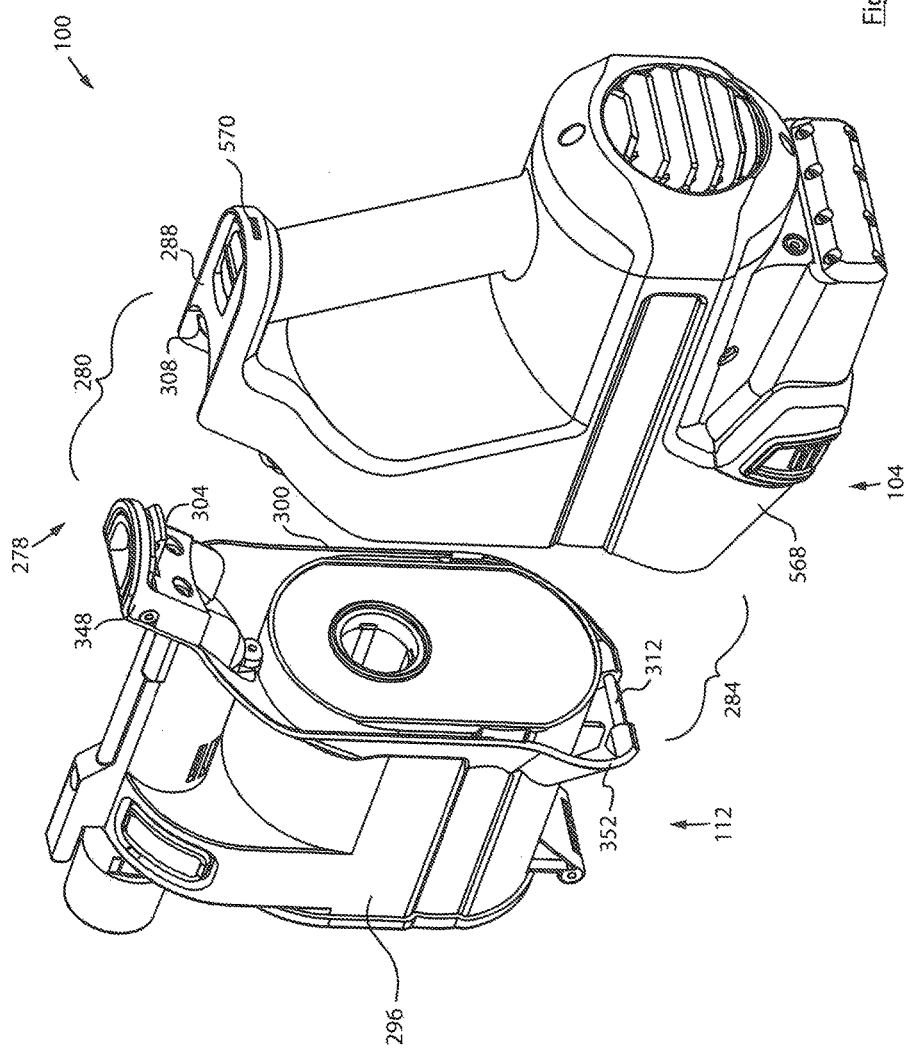
FIG. 10 is a rear perspective view of the surface cleaning apparatus of FIG. 1 with the cyclone unit separated from the main body.
Figure 11:
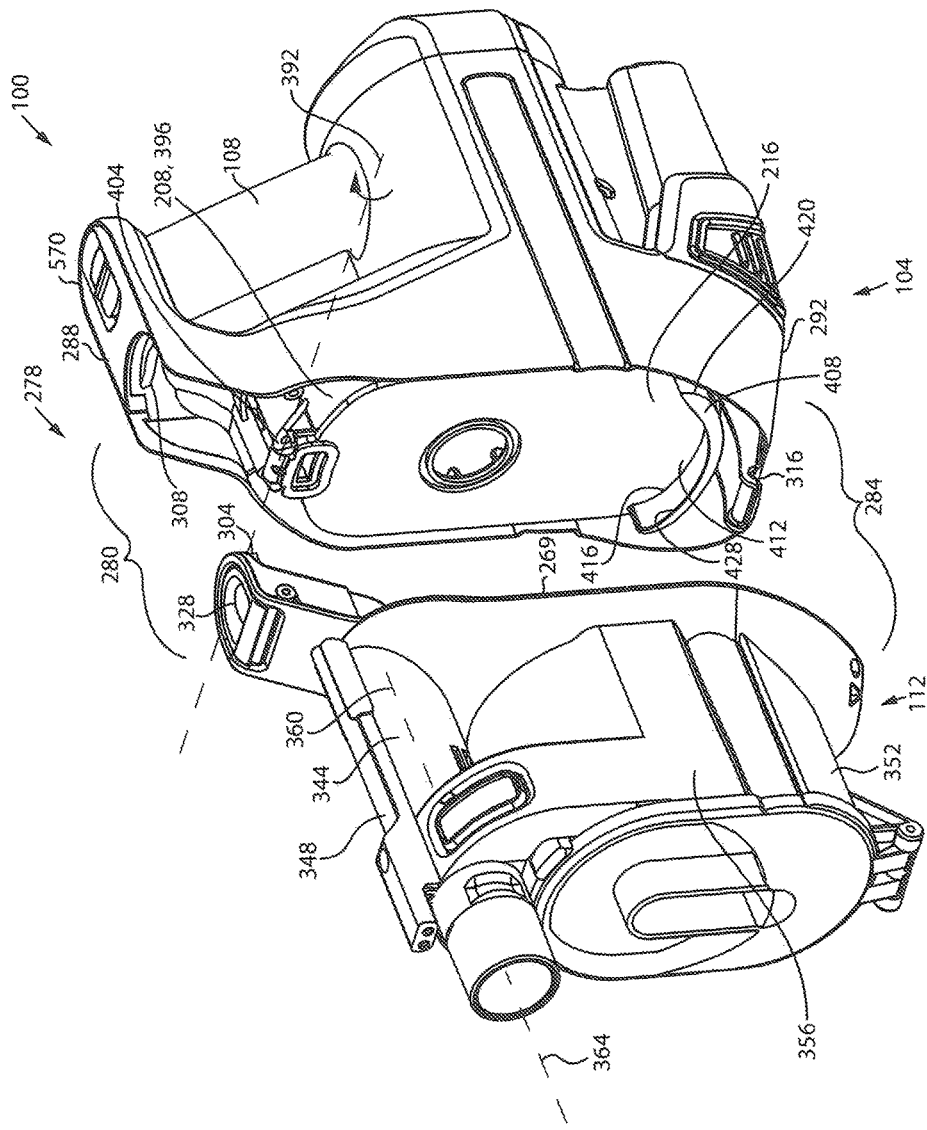
FIG. 11 is a front perspective view of the surface cleaning apparatus of FIG. 1 with the cyclone unit separated from the main body.

As exemplified in FIGS. 9-11, main body 104 and cyclone unit 112 are separably connected by a cyclone unit release lock 278. As exemplified, cyclone unit release lock 278 includes a pair 280 of engagement members 304 and 308, and a release actuator 328. The release actuator 328 may be manually user operable (e.g. by hand) for selectably unlocking cyclone unit release lock 278 to allow main body 104 and cyclone unit 112 to separate.

In the illustrated example, cyclone unit 112 is also rotationally mounted to main body 104. For example, cyclone unit 112 may be rotationally mounted to main body 104 at a position longitudinally spaced apart from cyclone unit release lock 278. This allows cyclone unit 112 to rotationally separate from main body 104 when cyclone unit release lock 278 is unlocked (e.g. by operation of release actuator 328). In some embodiments, cyclone unit 112 may be rotationally mounted to main body 104 by a detachable pair 284 of engagement members 312 and 316. This allows for the option of fully detaching cyclone unit 112 from main body 104, such as to carry cyclone unit 112 to a garbage bin for emptying or cleaning for example. In alternative embodiments, second pair 284 of engagement members 312 and 316 may provide a permanent rotational connection that is not detachable. It will be appreciated that an alternate connection mechanism may be provided to secure the lower end of the air treatment member 112 and the main body 104 together when cyclone unit release lock 278 is engaged.

Cyclone unit release lock 278 and engagement member pair 284 may be positioned at any location on apparatus 100 suitable for securely joining the main body 104 and cyclone unit 112. For example cyclone unit release lock 278 and engagement member pair 284 may be positioned at opposite ends of apparatus 100, such as longitudinally spaced at apparatus upper end 288 and lower end 292 as shown. In the illustrated example, first cyclone unit engagement member 304 is positioned on cyclone unit upper end 348 and first main body engagement member is positioned on main body upper end 570. In alternate embodiments, the lock positions may be reversed.

Cyclone unit release lock 278 and engagement member pair 284 may take any form suitable for separably joining main body 104 and cyclone unit 112. For example, one or both engagement member pairs 280 and 284 may include a first engagement member removably receivable in a second engagement member. As exemplified, first engagement member pair 280 includes a first cyclone unit engagement member 304 and a first main body engagement member 308, and second engagement member pair 284 includes a second cyclone unit engagement member 312 and a second main body engagement member 316.

Figure 12:
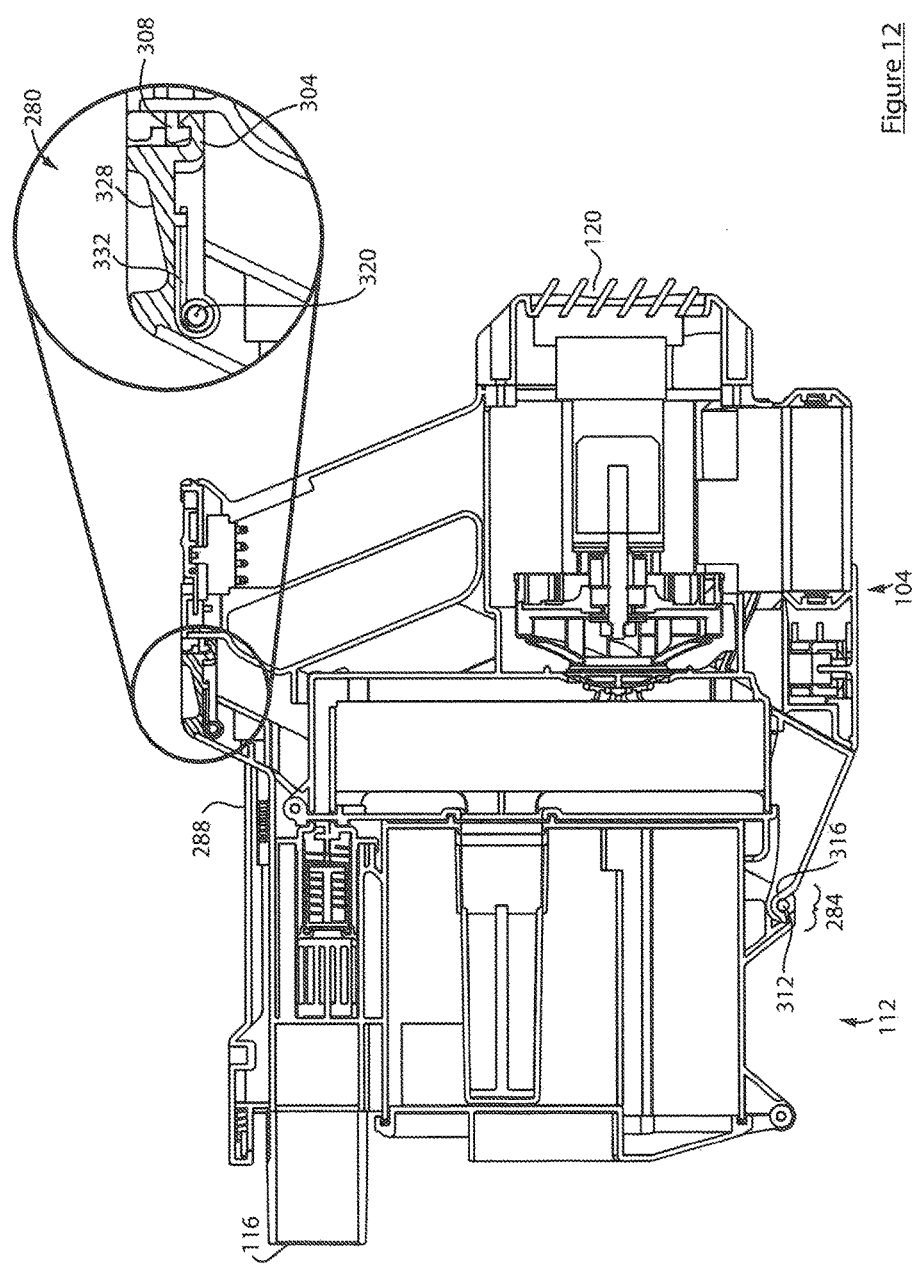
FIG. 12 is a cross-sectional view taken along line 6-6 in FIG. 1, with an enlargement of a first connector pair in a locked position.

Referring to FIG. 12, first cyclone unit engagement member 304 and first main body engagement member 308 are shown formed as hooks which are sized and positioned to interlock when the cyclone unit 112 and main body 104 are brought together. Second cyclone unit engagement member 312 is shown formed as a transversely extending rod which is received in hook-like second main body engagement member 316 when the cyclone unit 112 and main body 104 are brought together. As exemplified, cyclone unit lower end 352 is rotationally mounted to main body lower end 568 when second engagement member pair 284 is connected. When connected, cyclone unit release lock 278 and engagement member pair 284 hold cyclone unit 112 in fluid communication with main body 104, so that an air flow path is formed from dirty air inlet 116 to clean air outlet 120. A gasket or the like may be provided to form an air tight seal.

Figure 13:
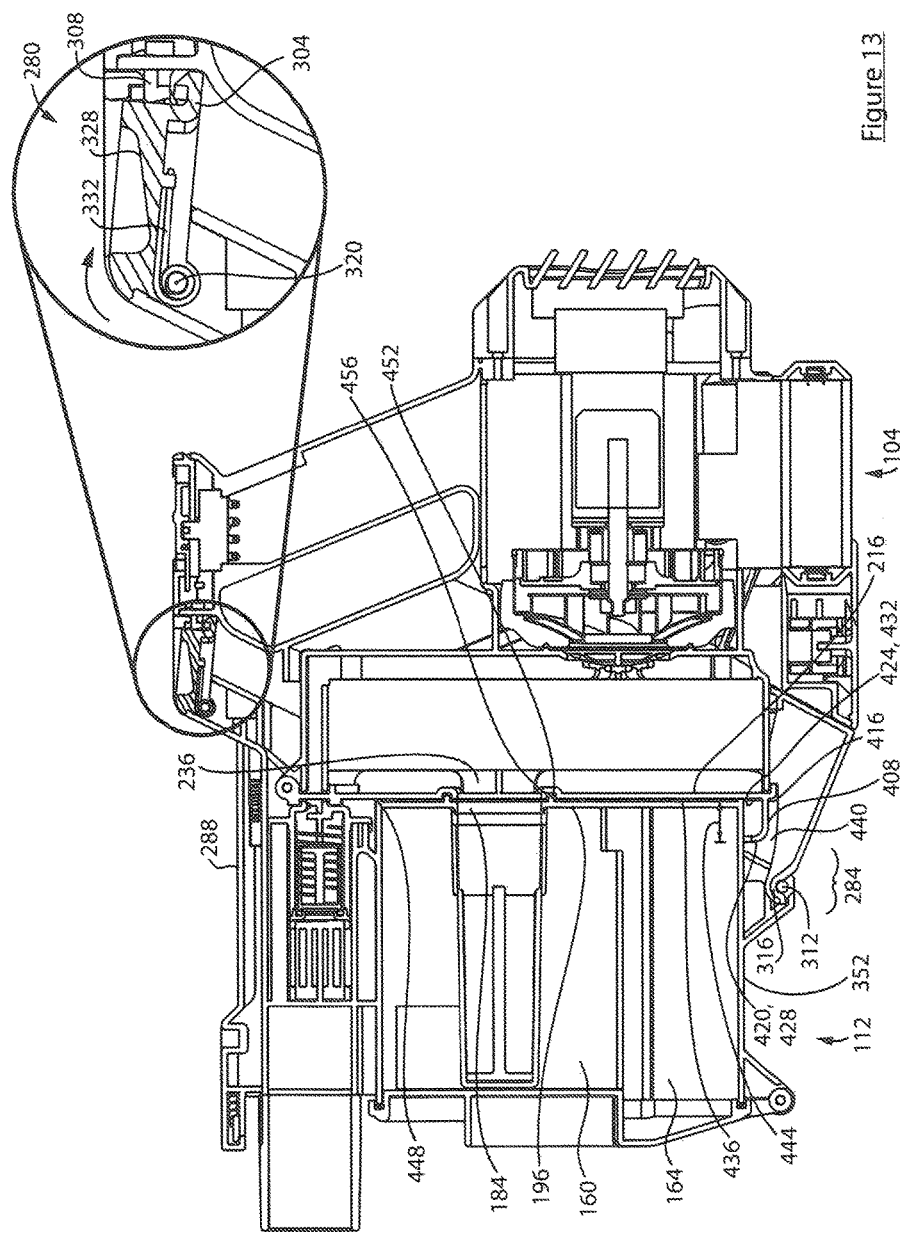
FIG. 13 is the cross-sectional view of FIG. 12, with the first connector pair in an unlocked position.
Figure 14:
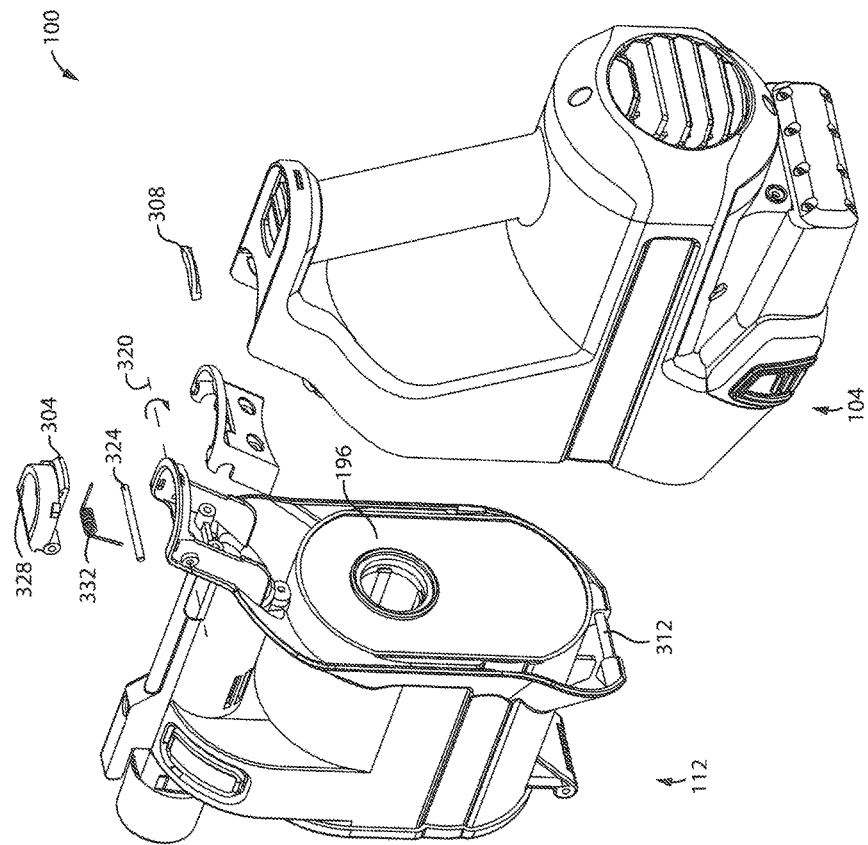
FIG. 14 is the rear perspective view of FIG. 10, with the first connector pair exploded.

As exemplified in FIGS. 12-14, one or more of engagement members 304, 308, 312, and 316 may be movable to facilitate manual disconnection of the cyclone unit 112 from main body 104. For example, one or more of engagement members 304, 308, 312, and 316 may be movable away from the other engagement member of its respective engagement member pair 280 or 284 from a locked position to an unlocked position for disconnecting that engagement member pair 280 or 284. It will be appreciated that an engagement member 304, 308, 312, or 316 may be moveable in any direction. For example, it may be translatable in a linear direction or along a curved path, rotatable about any one or more axes, or combinations thereof.

As shown in FIG. 13, first cyclone unit engagement member 304 is in the open or unlocked position wherein it has been moved away from the closed or locked position shown in FIG. 12 in which it engages first main body engagement member 308, thereby disengaging the first engagement member pair 280. As exemplified, first cyclone unit engagement member 304 is pivotally mounted to a first engagement member axle 324 for rotation about the first engagement member axis 320 that extends laterally and first cyclone unit engagement member 304 extends substantially rearwardly whereby rotation of first cyclone unit engagement member 304 about first engagement member axis 320 moves the first cyclone unit engagement member 304 substantially vertically. In this example, first cyclone unit engagement member 304 is formed as a lower upwardly facing hook, first main body engagement member 308 is formed as an upper downwardly facing hook, and first cyclone unit engagement member 304 is pivotal about first engagement member axis 320 to move first cyclone unit engagement member 304 downwardly away from first main body engagement member 308 from the locked position (FIG. 12) to the unlocked position (FIG. 13), thereby disconnecting the first engagement member pair 280.

Once the first engagement member pair 280 is disconnected, the cyclone unit 112 and main body 104 may be separated at the apparatus upper end 288, and then the cyclone unit 112 may be moved relative to the main body 104 to disconnect the second engagement member pair 284 thereby completing the disconnection of the cyclone unit 112 from the main body 104.

Apparatus 100 may include any actuator 328 suitable for disengaging engagement member 304 and 308 to unlock cyclone unit release lock 278. Actuator 328 may be provided on either of cyclone unit 112 or main body 104. Preferably, the actuator 328 is manually operable (i.e. by hand) to allow selective disconnection of the engagement members 304 and 308. In the illustrated embodiment, first main body engagement member 308 is connected to an actuator 328. Actuator 328 may take any form such as a button as shown, a switch, or a slider for example. Actuator 328 may be connected to first main body engagement member 308 in manner suitable for directing the movement of first main body engagement member 308. In the illustrated example, first main body engagement member 308 is integrally formed with a distal end of actuator 328. In alternative embodiments, actuator 328 may be a discrete component that is rigidly or movably connected to first main body engagement member 308 directly or indirectly by way of one or more intermediary components.

As exemplified, a proximal end of actuator 328 may be pivotally mounted to cyclone unit 112 by first engagement member axle 324 for rotation about first engagement member axis 320. In use, a user may depress actuator 328 to rotate actuator 328 and first cyclone unit engagement member 304 downwardly, thereby disconnecting the first engagement member pair 280.

In some embodiments, first cyclone unit engagement member 304 may be biased to the locked position to mitigate the risk of first engagement member pair 280 becoming unlocked during use of apparatus 100. In the illustrated example, a bias 332 biases first cyclone unit engagement member 304 to the open position. Bias 332 may be formed as a torsional spring, as shown, which is mounted to first engagement member axle 324. A user may depress actuator 328 to move the first cyclone unit engagement member 304 against the bias of spring 332 and disconnect first engagement member pair 280.

Figure 15:
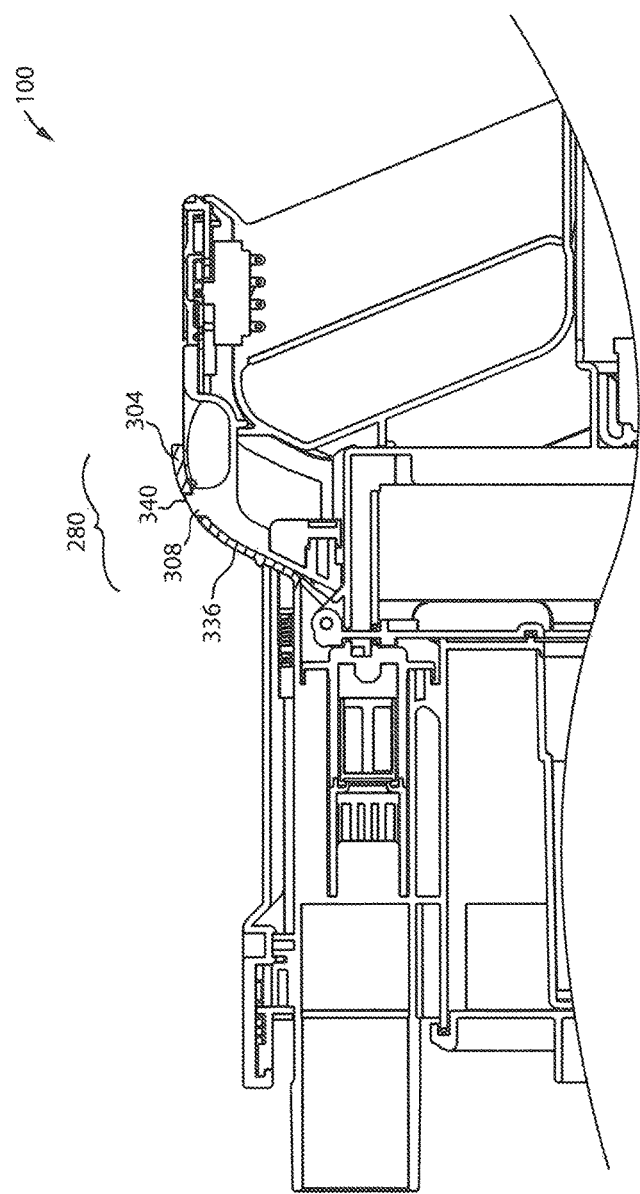
FIG. 15 is a partial cross-sectional view taken along line 6-6 in FIG. 1, showing an alternative first connector pair in a locked position.
Figure 16:
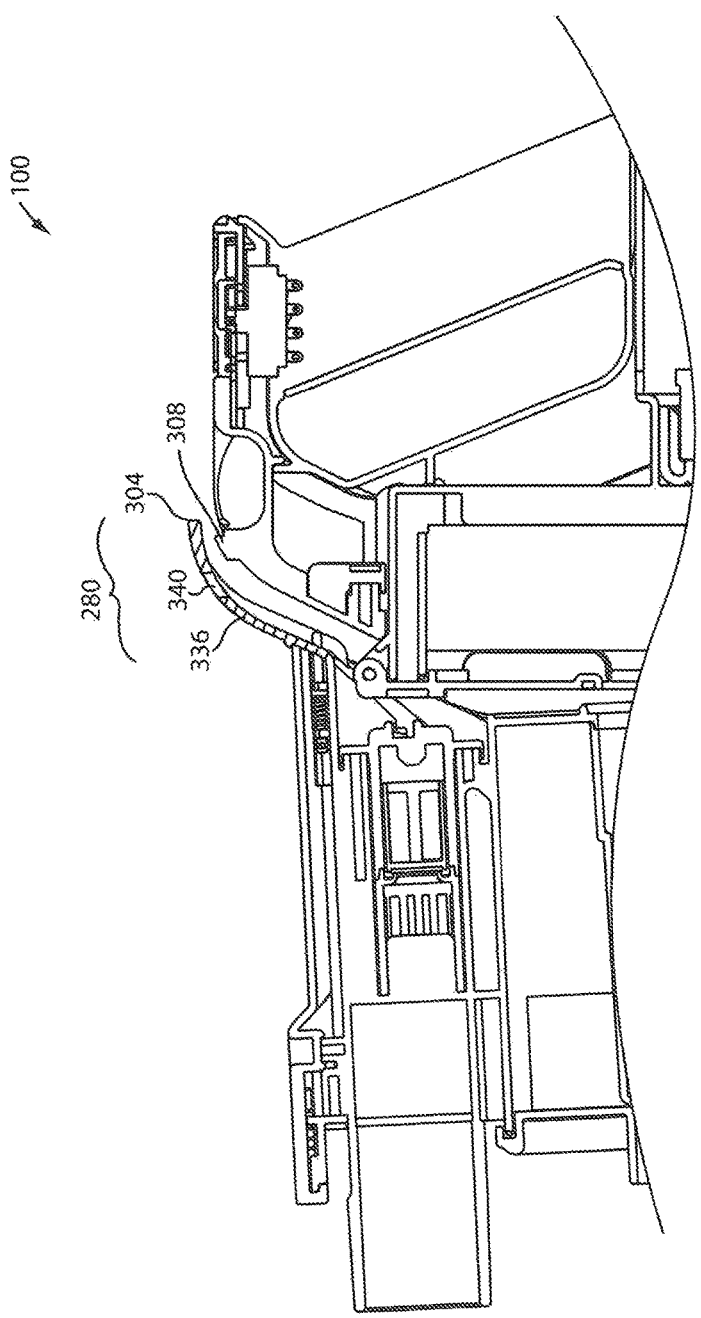
FIG. 16 is the partial cross-sectional view of FIG. 15 showing the alternative first connector pair in an unlocked position.

Reference is now made to FIGS. 15 and 16, which show apparatus 100 including an alternative first engagement member pair 280. As exemplified, first cyclone unit engagement member 304 may include an engagement member arm 336 with an engagement member socket 340, and first main body engagement member 308 may be formed as a peg. In the locked position (FIG. 15), peg 308 may be received in engagement member socket 340 to securely join first engagement member pair 280. In the unlocked position (FIG. 16) peg 308 may be removed from engagement member socket 340 to disconnect first engagement member pair 280. As exemplified, engagement member arm 336 may be resiliently bendable (i.e. as a living hinge) for moving first main body engagement member 308 between the locked and unlocked positions. For example, engagement member arm 336 can resiliently bend upwardly to remove peg 308 from engagement member socket 340 (FIG. 16), and vice versa. Preferably, the resiliency of engagement member arm 336 biases first cyclone unit engagement member 304 towards the locked position.

Exemplary lateral stability members are shown in FIGS. 26-30. As exemplified, air treatment member 112 and main body 104 may collectively include one or more pairs of protrusions and recesses, which mate at the interface between air treatment member 112 and main body 104 when air treatment member 112 is connected to main body 104. This helps provide a more robust separable connection between air treatment member 112 and main body 104 with enhanced strength and rigidity. Air treatment member rear end 436 and main body front end 432 may be provided with mating protrusions 620 that are receivable in recesses 624.

Protrusions 620 and recesses 624 may have any size, shape, and position which allows the protrusions 620 to be received in the recesses 624 when air treatment member 112 and main body 104 are connected. As exemplified, each of protrusions 620 and recesses 624 may be formed as elongate segments which are continuous or have discontinuities. In the illustrated embodiment, each of protrusions 620 and recesses 624 extend longitudinally downwardly.

Figure 27:
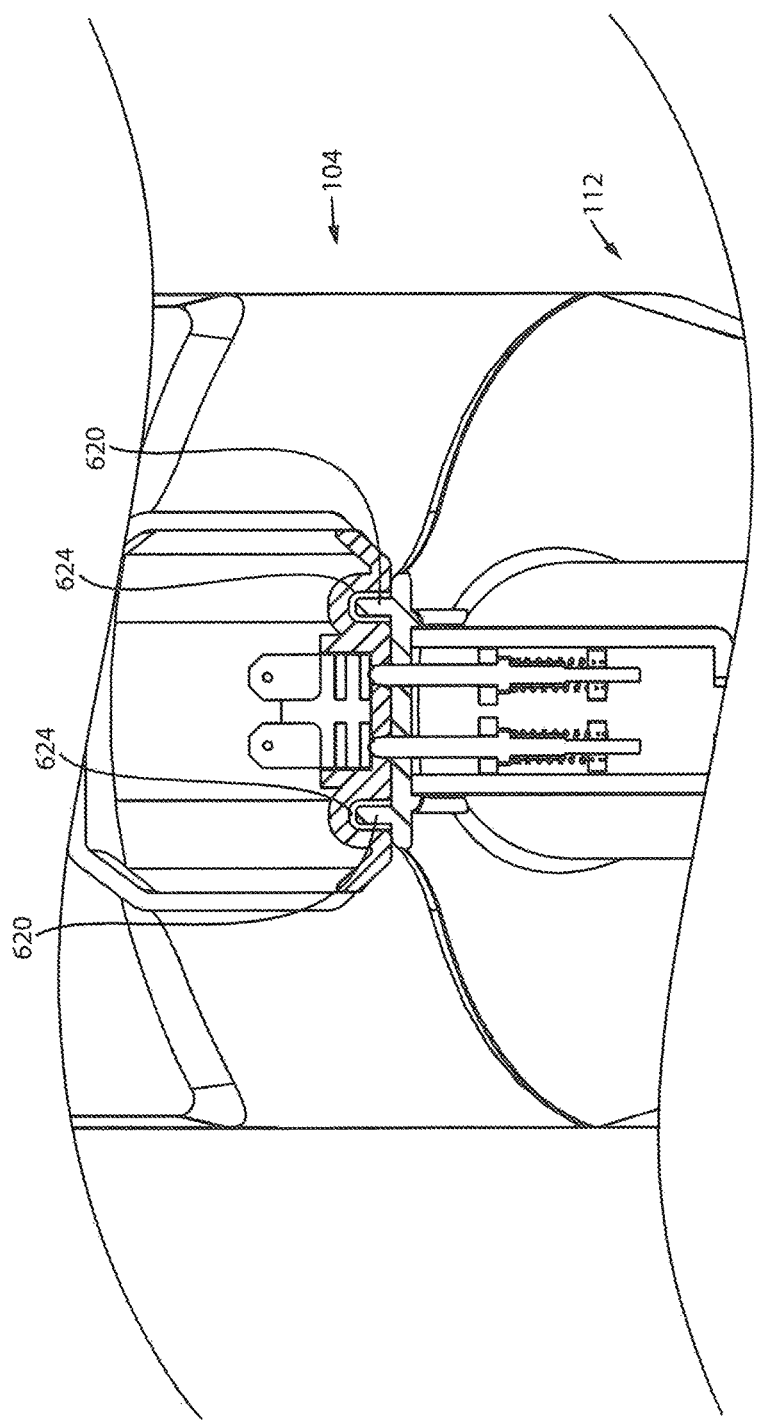
FIG. 27 is a partial cross-sectional view of the surface cleaning apparatus of FIG. 26 with the cyclone unit connected to the main body.

As exemplified in FIGS. 26 and 27, protrusions 620 are formed in cyclone unit upper end 348 (engagement member arm 336) and recesses 624 are formed in surface of main body upper end 570 against which engagement member arm 336 abuts. Protrusions 620 are received in recesses 624 when air treatment member 112 is connected to main body 104.

FIG. 28 shows an alternate embodiment, in which cyclone unit upper end 348 includes recesses 624 and main body upper end 570 includes protrusions 620.

FIG. 29 shows another alternate embodiment including protrusions 620 and recesses 624 extending across cyclone rear end wall 176 and filter housing front wall 216.

FIG. 30 shows another embodiment including protrusions 620 extending across cyclone rear end wall 176 and filter housing front wall 216. When air treatment member 112 is connected to main body 104, protrusions 620 on cyclone rear end wall 176 contact filter housing front wall 216, and protrusions 620 on filter housing front wall 216 contact cyclone rear end wall 176. In this embodiment, protrusion 620 provide rigid beams at the interface between main body 104 and air treatment member 112 which may increase the rigidity and strength of the separable connection.

Air Treatment Member Handle

The following is a description of an air treatment member handle that may be used by itself in any surface cleaning apparatus or in any combination or sub-combination with any other feature or features disclosed herein including the uniflow cyclone, the positioning of the dirt collection chamber, the orientation of the suction motor, the lateral stability members, the position and orientation of a driving handle, pre-motor filter housing door, air treatment member door actuator, counterweight stand and electrical coupling members.

In accordance with this aspect, the air treatment member may include a handle in addition to the main body handle ("driving handle"). This allows a user to hold the main body and the air treatment member simultaneously, with different hands before, during, and after disconnecting the main body from the air treatment member.

In one embodiment, the air treatment member handle may for part of an air flow conduit of the air treatment member. Alternately or in addition, the air treatment member handle may extend along the axial direction of the air treatment member and/or may be on an upper portion thereof and/or may provide a gap for receiving fingers of the user.

As exemplified in FIG. 11, cyclone unit handle 344 is connected to cyclone unit 112 when cyclone unit 112 is disconnected from main body 104, and driving handle 108 is connected to main body 104 when main body 104 is disconnected from cyclone unit 112. Cyclone unit handle 344 may have any suitable size, shape, and position on cyclone unit 112 which allows a user to easily grasp the cyclone unit handle 344 by hand to carry the cyclone unit 112 (see FIG. 10A). In the illustrated embodiment, cyclone unit handle 344 is formed as a substantially cylindrical member, which extends rearwardly along cyclone unit upper portion 348. In other embodiments, cyclone unit handle 344 may have a different regular or irregular cross-sectional shape, and may extend along a different portion of cyclone unit 112, such as along lower portion 352, or a lateral side 356 for example. As exemplified in FIG. 6, cyclone unit handle 344 may include a portion or gap 347 spaced from cyclone unit 112 whereby a finger receiving area 349 is provided between the cyclone unit handle 344 and the cyclone unit 112.

Returning to FIG. 11, preferably apparatus 100 is configured to allow the user to take whatever action disconnects the main body 104 from air treatment member 112 while holding air treatment member handle 344 with one hand and holding driving handle 108 with the other hand. For example, cyclone unit handle 344 or driving handle 108 may be positioned proximate (e.g. within finger-reach of) an actuator that releases the connector(s) which hold air treatment member 112 and main body 104 together. This would allow the user to use a finger to operate the actuator while holding the handle 344 or 108 with the remaining fingers of their hand. In the illustrated embodiment, cyclone unit handle 344 and actuator 328 are both located on the cyclone unit upper portion 348 and in close proximity. This allows a user to hold air treatment member 112 by handle 344 while simultaneously operating actuator 328 with the same hand to disconnect air treatment member 112 from main body 104.

The user may also use the same hand to open a front door of the air treatment member as discussed subsequently in more detail.

Referring to FIG. 6, cyclone unit handle 344 is shown extending along a cyclone unit handle axis 360. In some embodiments, cyclone unit handle axis 360 may be parallel with and may be coaxial with inlet connector axis 364. This may promote a compact shape for apparatus 100 in contrast with handles with an axis that extends above the inlet connector axis 364.

Figure 17:
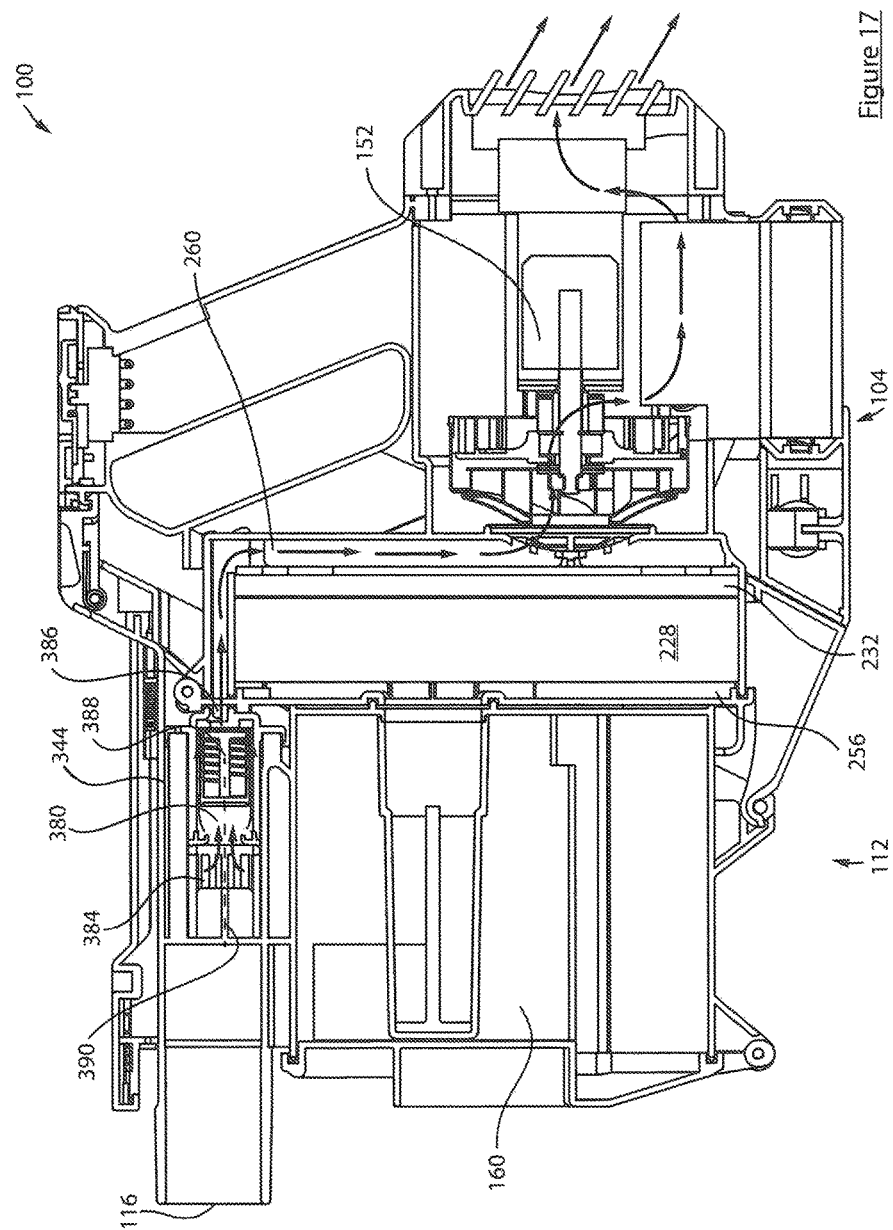
FIG. 17 is a cross-sectional view taken along line 6-6 in FIG. 1, showing an airflow path through a bleed valve.

As exemplified in FIGS. 1 and 17, cyclone unit handle 344 may comprise an air flow passage (e.g. an air flow conduit). This may promote a compact design for apparatus 100 by reducing or eliminating the volume added to apparatus 100 to incorporate cyclone unit handle 344. For example, an existing air flow conduit may be reshaped and/or repositioned to provide handle functionality. As exemplified in FIG. 17, handle 344 is positioned rearward and coaxial with the inlet conduit extending from dirty air inlet 116. It will be appreciated that if the inlet to the air treatment member chamber (e.g., cyclone chamber 160) is rearward of the front of handle 344, then part of handle 344 form part of inlet conduit 124. Alternately, or in addition as exemplified in FIG. 17, handle 344 may provide part or all of a bleed air conduit 380 having a longitudinal passage axis 390. Bleed conduit 380 provides a portion of the air flow path between the bleed air inlet 384 and the suction motor and fan assembly 152 and houses bleed valve 388. The bleed valve 388 may be any suitable valve that known in the art, which typically open automatically in response to low pressure. For example, bleed valve 388 may be a pressure relief valve. Bleed valve 388 may help maintain adequate volumetric air flow through the suction motor and fan assembly 152 during low pressure events to avoid overheating of the suction motor and fan assembly 152. Low pressure may occur where there is a partial or total blockage in the air flow upstream of the suction motor and fan assembly 152 (e.g. a plastic bag is blocking dirty air inlet 116).

It will be appreciated that cyclone unit handle 344 is grasped primarily when apparatus 100 is turned off (e.g. when separating, reconnecting, or transporting cyclone unit 112) so that there is little or no concern of the bleed air inlet 384 being blocked by a user's hands when apparatus 100 is turned on.

FIG. 17 exemplifies an optional air flow path from bleed air inlet 384 to suction motor and fan assembly 152 which bypasses cyclone 160 and pre-motor filters 228 and 232. As exemplified, the air flow path may extend rearwardly through bleed valve conduit 380 to filter housing downstream header 260 bypassing filter housing upstream header 256 and pre-motor filters 228 and 232. In alternate embodiments, the air flow path may extend through pre-motor filters 228 and 232 to filter fine particulates that may be present in the ambient air drawn into bleed air inlet 384. For example, filter housing upstream header 256 may be positioned downstream of bleed valve 388 in the air flow path from bleed air inlet 384.

Position and Orientation of a Driving Handle

The following is a description of a driving handle that may be used by itself in any surface cleaning apparatus or in any combination or sub-combination with any other feature or features disclosed herein including the uniflow cyclone, the positioning of the dirt collection chamber, the orientation of the suction motor, the lateral stability members, the air treatment member handle, the pre-motor filter housing door, the air treatment member door actuator, the counterweight stand and the electrical coupling members.

In accordance with this aspect, the driving handle is which extends upwardly and forwardly. Driving handle 108 may extend upwardly from the suction motor housing (e.g., an upper surface of the main body that houses the suction motor). Driving handle 108 may terminate at Or above an upper end of the handvac 100. Accordingly, the inlet conduit axis 364 and/or the handle axis 360 may intersect the driving handle 108. An advantage of this design is that the weight of the motor is below the hand grip. Further, the driving axis of the handvac when connected to a wand (the wand axis) is at an opposite end of the handle to the suction motor. This provides improved hand weight for a user.

As exemplified in FIG. 6, driving handle 108 may extend from its lower end 368 to its upper end 372 along a driving handle axis 376. When surface cleaning apparatus 100 is positioned with bottom 125 on a horizontal surface 584 and the bottom 125 extends horizontally, driving handle axis 376 may extend generally upwardly and forwardly (e.g. at an angle 378 of less than 45 degrees to vertical) to provide a comfortable natural grip during use.

As exemplified, driving handle axis 376 may be at an angle to cyclone unit handle axis 360. For example, axes 360 and 376 may be angularly offset by 30 degrees or more. This reflects that the driving handle 108 and cyclone unit handle 344 may have different functions. For example, the driving handle 108 may be configured to provide a comfortable grip for the user during use, and the cyclone unit handle 344 may be configured with a compact design.

In the illustrated embodiment, driving handle 108 includes a portion 377 spaced from main body 104 whereby a finger receiving area 379 is provided between the driving handle 108 and the main body 104. As exemplified, driving handle 108 may be positioned at main body rear end 434 and longitudinally spaced apart from cyclone unit handle 344.

Pre-Motor Filter Housing Door

The following is a description of a pre-motor filter door that may be used by itself in any surface cleaning apparatus or in any combination or sub-combination with any other feature or features disclosed herein including the uniflow cyclone, the positioning of the dirt collection chamber, the orientation of the suction motor, the lateral stability members, the air treatment member handle, the position and orientation of a driving handle, the air treatment member door actuator, the counterweight stand and the electrical coupling members.

In accordance with this aspect, a surface cleaning apparatus may have a pre-motor filter chamber which is closed by an openable door that is accessible when the air treatment member is removed from the remainder of the surface cleaning apparatus (as exemplified in FIG. 6). A pre-motor filter may be accessed for cleaning or replacement when the door is opened. The pre-motor filter door may include a handle for user operation. The pre-motor filter chamber may be provided in the removable air treatment member 112 or the main body 104. The door may be held in a closed position by a part of the surface cleaning apparatus that does not include the pre-motor filter chamber. For example, if the pre-motor filter chamber is provided in the air treatment member, then the door may be held closed by a part of the main body when the air treatment member is attached to the main body. Conversely, if the pre-motor filter chamber is provided in the main body as exemplified in FIG. 8, then the door may be held closed by a part of the air treatment member when the air treatment member is attached to the main body. An advantage of this design is that it allows a simpler design for the pre-motor filter door that is free of locking members such as latches. A further advantage is that unintentional user access to the pre-motor filter housing 208 may be prevented while the apparatus 100 is in operation.

Figure 8A:
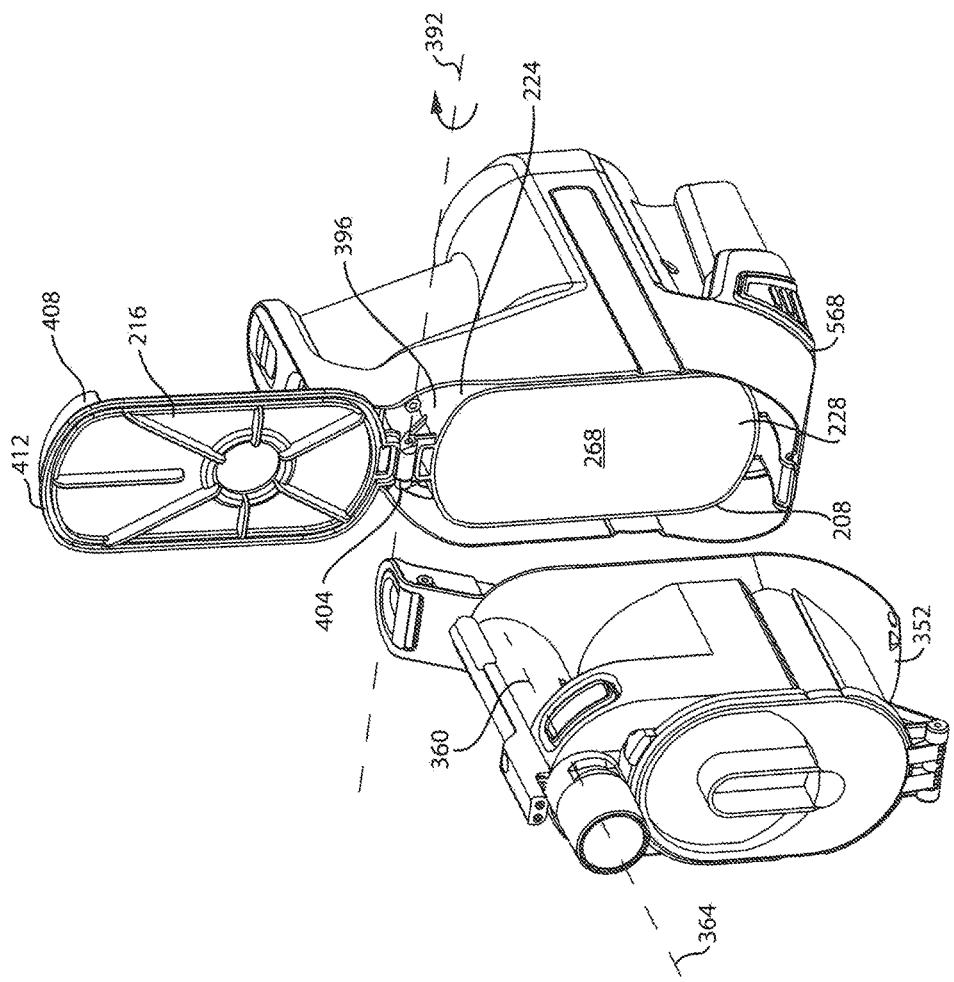
FIG. 8A is the front perspective view of FIG. 8 with a pre-motor filter in the pre-motor filter chamber.

FIGS. 8, 8A and 11 exemplify an embodiment in which pre-motor filter housing 208 is accessible when air treatment member 112 is disconnected from main body 104. For example, one of the filter housing walls 216 and 220 (e.g., filter housing upstream wall 216 as exemplified in FIG. 8) may be exposed when air treatment member 112 is disconnected from main body 104.

The openable filter housing wall may be openable in any manner suitable for providing access to clean or replace the pre-motor filters inside. For example, the openable wall may be moveably mounted or removably mounted. Accordingly, filter housing wall 216 or 220 may be pivotally attached to the pre-motor filter housing 208, slideably attached to the pre-motor filter housing 208, or removable altogether from the pre-motor filter housing 208. In the illustrated embodiment, filter housing upstream wall 216 is pivotally attached to pre-motor filter housing 208.

As exemplified in FIGS. 8A and 11, filter housing upstream wall 216 is rotatable about a filter-housing wall pivot axis 392 between a closed position (FIG. 11), and an open position (FIG. 8A). It will be appreciated that filter housing upstream wall 216 may be rotatable in any manner and direction suitable for moving the filter housing upstream wall 216 generally away from the pre-motor filter housing 208 to provide access to the pre-motor filters 228 and 232 inside. In the illustrated embodiment, filter housing upstream wall 216 is upwardly rotatable about a laterally extending (e.g. horizontal) filter housing wall pivot axis 392 located at an upper end 396 of the pre-motor filter housing 208. As exemplified, the filter housing wall pivot axis 392 is transverse to (e.g. substantially perpendicular to) the inlet connector axis 364, the cyclone unit handle axis 360, and the filter housing air inlet axis 248.

In alternative embodiments, filter housing upstream wall 216 may rotate in a different direction about a different axis. For example, filter housing upstream wall 216 may move laterally outwardly by rotation about a substantially vertical axis positioned proximate a left or right side of the pre-motor filter housing 208.

Still referring to FIGS. 8A and 11, the filter housing upstream wall 216 may have any construction suitable for allowing the filter housing upstream wall 216 to rotate about the filter housing wall pivot axis 392. For example, filter housing upstream wall 216 may be connected to filter housing sidewall 224 by a hinge 404 of any suitable type. In some embodiments, filter housing upstream wall 216 may be resiliently bendable to connect with pre-motor filter housing 208 by a living hinge.

Optionally, filter housing upstream wall 216 may be at least partially transparent (e.g., the wall may be made of a transparent material or it may have a window) to provide visibility of the upstream surface 268 (FIG. 8A) of the pre-motor filter inside. This would allow the user to inspect the pre-motor filter through the filter housing upstream wall 216, without opening the pre-motor filter housing 208, in order to assess whether to clean or replace the pre-motor filter. In alternative embodiments, the filter housing upstream wall 216 may be opaque, and the pre-motor filter may not be visible through the filter housing upstream wall 216.

Still referring to FIGS. 8A and 11, the openable filter housing wall is preferably manually user openable (e.g. by hand). This allows the user to selectively open the openable filter housing wall to access the pre-motor filters inside. In the illustrated example, the filter housing upstream wall 216 includes a filter housing handle 408 that is user operable to move the filter housing upstream wall 216 between the open and closed positions. The filter housing handle 408 may have any construction that allows the user to easily grasp and pull the filter housing handle 408 to open the pre-motor filter housing 208. In the illustrated example, the filter housing handle 408 extends outwardly from an end opposed to the hinged end (in this case lower end 412 of the filter housing upstream wall 216). Referring to FIGS. 11 and 13, the filter housing handle 408 extends from a filter housing handle inboard end 416 to a filter housing handle outboard end 420. As exemplified, the filter housing handle inboard end 416 may be connected to an upstream face 424 of the filter housing upstream wall 216. The filter housing outboard end 420 may include a gripping feature, which may be of any design such a lip 428. In the illustrated example, lip 428 is curls approximately 90 degrees.

As exemplified in FIG. 13, the filter housing handle 408 may extend from filter housing upstream wall 216 outwardly towards cyclone unit 112. In the illustrated example, a front end 432 of main body 104 is connectable to the rear end 436 of cyclone unit 112, and filter housing handle 408 extends forwardly from filter housing upstream wall 216 towards cyclone unit 112. As shown, the filter housing handle outboard end 420 extends into a handle recess 440 of cyclone unit 112 outside of cyclone 160 and dirt collection chamber 164. In this way, the handle may overlap a portion of the cyclone chamber so as to have a longer length in the direction of the cyclone axis. This construction allows the filter housing handle 408 to have a greater dimension 444 between its inboard and outboard ends 416 and 420, while permitting the filter housing upstream wall 216 to contact at least a portion of cyclone second wall 196 to fluidly connect the cyclone air outlet 184 to the filter housing air inlet 236. In the illustrated example, the filter housing handle 408 extends from filter housing upstream wall lower end 412, and cyclone unit handle recess 440 is provided in cyclone unit lower portion 352.

Returning to FIGS. 8A and 11, in some embodiments, pre-motor filter housing 208 may be free of locking members, such as latches or clasps, which are operable to secure the openable wall in the closed position. Accordingly, when the main body 104 and cyclone unit 112 are connected together (see, e.g. FIG. 1) filter housing handle 408 extends forwardly from filter housing upstream wall 216 and abuts a part of air treatment member 112, e.g., rear end wall 196 of the air treatment member.

As exemplified in FIG. 13, the openable door of the pre-motor filter housing 208 may be held in its closed position by interaction with cyclone unit 112, when cyclone unit 112 is connected to main body 104. For example, at least a portion of cyclone unit rear end 436 may contact filter housing upstream wall 216 to hold the filter housing upstream wall 216 in its closed position. In the illustrated example, cyclone second wall 196 is bordered by a peripheral lip 448 which contacts upstream face 424 of filter housing upstream wall 216, and cyclone air outlet 184 is bordered by a peripheral lip 452 that contacts a peripheral recess 456 of filter housing air inlet 236. Peripheral lip 452 and recess 456 may form a substantially air tight connection between cyclone air outlet 184 and filter housing air inlet 236.

In some embodiments, a gasket, such as an O-ring (not shown) may be provided and compressed when the air treatment member is attached to provide an air tight seal between the openable door and the rest of the pre-motor filter chamber.

Air Treatment Member Door Acutator

The following is a description of an air treatment member door actuator that may be used by itself in any surface cleaning apparatus or in any combination or sub-combination with any other feature or features disclosed herein including the uniflow cyclone, the positioning of the dirt collection chamber, the orientation of the suction motor, the lateral stability members, the air treatment member handle, the position and orientation of a driving handle, the pre-motor filter housing door, the counterweight stand and the electrical coupling members.

The air treatment member may include an openable door that provides access to empty or clean the air treatment member (e.g. to empty or clean a dirt collection region of the air treatment member). In accordance with this aspect, the air treatment member door may be openable by an actuator positioned within finger-reach of the air treatment member handle. This allows for one handed operation of the air treatment member door.

Reference is now made to FIGS. 1 and 18. In some embodiments, air treatment member 112 includes an openable wall (e.g., a door) to provide access to clean or empty the air treatment member (e.g., cyclone 160 and dirt collection chamber 164). Any portion of air treatment member 112 suitable for emptying air treatment member 112 may be openable.

In the illustrated example, air treatment member 112 includes an openable front end 472 wherein all of the front end is openable. As exemplified, the air treatment member may be a cyclone unit comprising a cyclone and a dirt collection chamber external to the cyclone and may have a front end 472 the includes cyclone first end wall 192, and dirt collection chamber first end wall 476. It will be appreciated that, in some embodiments, only a portion of the front end 472 may be openable.

The openable door may be openable in any manner suitable for providing access to clean or empty air treatment member 112, e.g., cyclone 160 and dirt collection chamber 164. For example, the door may be pivotally attached to the air treatment member 112 which is exemplified in FIG. 18, slideably attached to the air treatment member 112, and/or removable altogether from the air treatment member 112.

As exemplified, cyclone unit front door 472 is rotatable about a cyclone unit wall pivot axis 480 between a closed position (FIG. 1), and an open position (FIG. 18). It will be appreciated that cyclone unit front door 472 may be rotatable in any manner and direction suitable for moving cyclone unit front door 472 generally away from the cyclone unit 112 to provide access to the cyclone 160 and dirt collection chamber 164 inside. In the illustrated embodiment, cyclone unit front door 472 is downwardly rotatable about a laterally extending (e.g. horizontal) cyclone unit wall pivot axis 480 located at a lower portion 352 of the cyclone unit 112. As exemplified, the cyclone unit wall pivot axis 480 is transverse to (e.g. substantially perpendicular to) the inlet connector axis 364, the cyclone unit handle axis 360, and the cyclone axis of rotation 484.

In alternative embodiments, cyclone unit front door 472 may rotate in a different direction about a different axis. For example, cyclone unit front door 472 may move laterally outwardly by rotation about a substantially vertical axis positioned proximate a left or right side of the cyclone unit 112. In other embodiments, cyclone unit front door 472 may move upwardly by rotation about a substantially horizontal axis positioned proximate cyclone unit lower portion 352.

Still referring to FIGS. 1 and 18, the cyclone unit front door 472 may have any construction suitable for allowing the cyclone unit front door 472 to rotate about the cyclone unit wall pivot axis 480. For example, cyclone unit front door 472 may be connected to cyclone unit 112 by a hinge 486 of any type known in the art. In some embodiments, cyclone unit front door 472 may be resiliently bendable to connect with cyclone unit 112 by a living hinge.

Still referring to FIGS. 1 and 18, the openable cyclone unit wall is locked in the closed position, and manually user openable (e.g. by hand). This allows the openable cyclone unit wall to remain closed while the apparatus 100 is operating, and allows the user to selectively open the openable cyclone unit wall to empty the cyclone 160 and dirt collection chamber 164 inside when the apparatus 100 is turned off. In the illustrated example, cyclone unit 112 includes a door lock 492, which inhibits opening of cyclone unit front door 472 when engaged. Door lock 492 is user operable to disengage door lock 492 to thereby permit cyclone unit front door 472 to move to its open position.

Door lock 492 may be any type of lock suitable for retaining cyclone unit front door 472 in its closed position, and which is user releasable to permit cyclone unit 112 to open. In some embodiments, door lock 492 may have a manually operable actuator for moving the lock between its engaged and disengaged positions. In the illustrated embodiment, door lock 492 includes an engaging member 496 and an actuator 504.

Preferably, actuator is positioned proximate the air treatment member handle 344 so that a user may operate actuator 504 with the same hand that is used to hold handle 504. For example, actuator 504 may be located within close proximity (e.g. finger-reach) of handle 344, e.g., it may be provided on or adjacent handle 344 and may be provided at the end of handle 344 at which the door is located. Accordingly while holding handle 344, the user may use their thumb of the same hand to operate actuator 504, i.e., door release actuator 504 may be operated by the same hand which is holding the cyclone unit 112 for single-handed emptying of cyclone unit 112. In the illustrated embodiment, unit door release actuator 504 is positioned forward of handle 344 on upper portion 348 (e.g. at a forward end of inlet passage 380). In other embodiments, door release actuator 504 may be located on handle 344, or rearwardly of handle 344.

Figure 20:
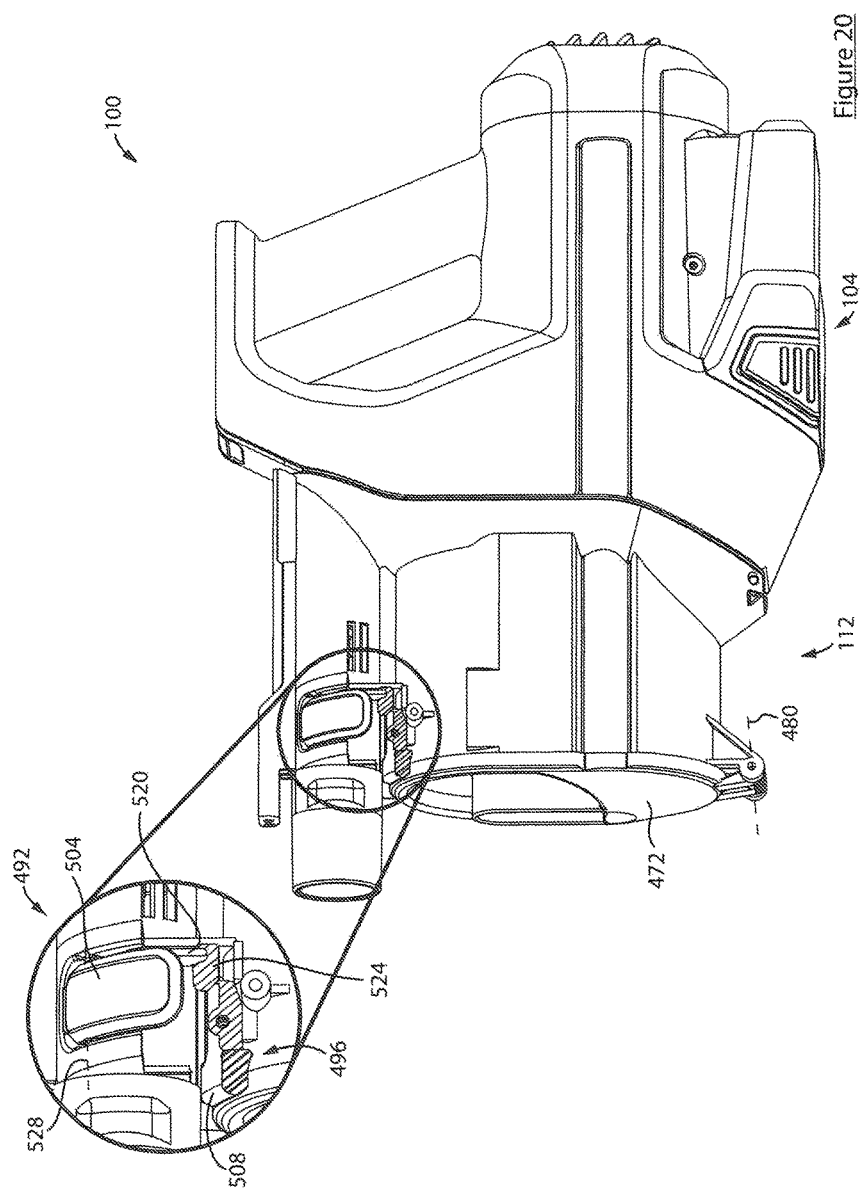
FIG. 20 is the front perspective view of FIG. 1, with an enlarged and partially cutaway cyclone unit lock in an engaged position.
Figure 21:
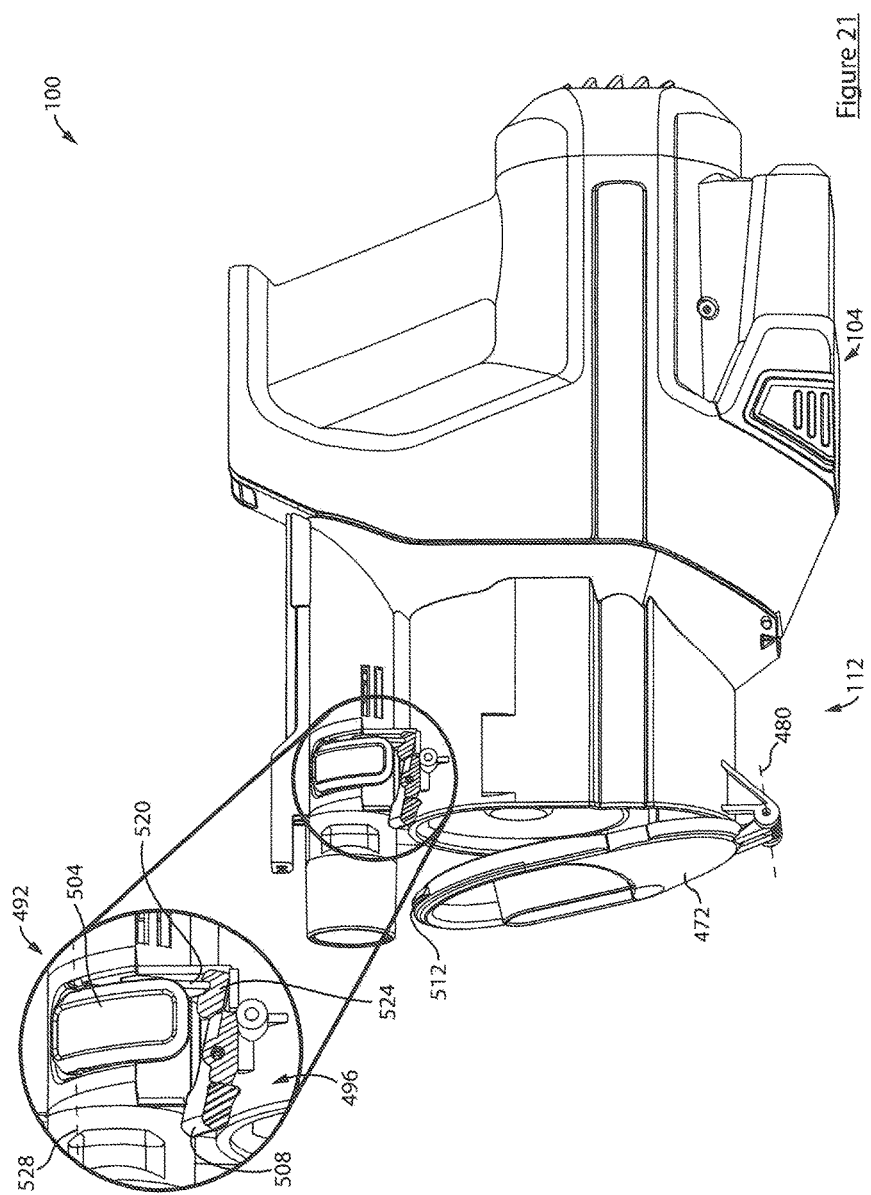
FIG. 21 is the front perspective view of FIG. 20, with the cyclone unit lock in a disengaged position.

As exemplified in FIGS. 20 and 21, the door release actuator 504 is manually user operable (i.e. by hand) to move the engaging member 496 between its engaged position (FIG. 20) and its disengaged position (FIG. 21). As exemplified, in the engaged position (FIG. 20), door release actuator 504 may engage cyclone unit front door 472 to inhibit movement of front door 472 to its open position. This prevents front door 472 from rotating about its cyclone unit wall pivot axis 480 to its open position. In the disengaged position (FIG. 21), door release actuator 504 releases cyclone unit front door 472 to permit front door 472 to move to its open position.

Figure 19:
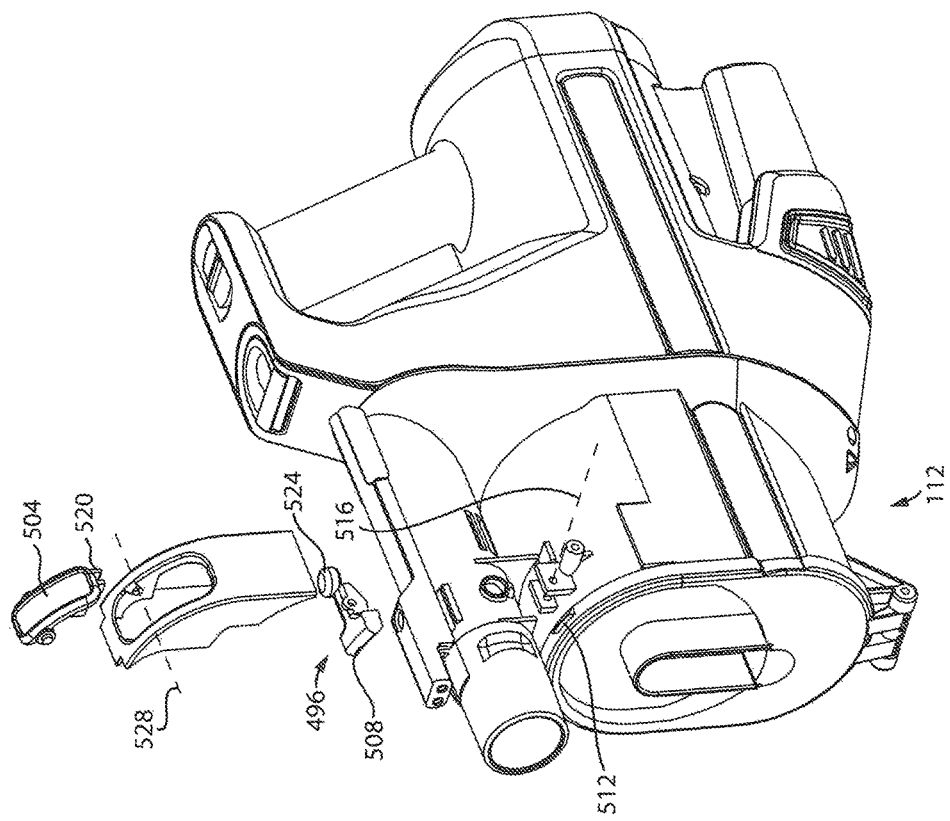
FIG. 19 is the front perspective view of FIG. 1, with an exploded cyclone unit lock and lock actuator.

Referring to FIGS. 19-21, lock engaging member 496 may be of any construction having an engaged position for retaining the openable cyclone unit wall in its closed position, and a disengaged position for releasing the openable cyclone unit to move to its open position. In the illustrated example, lock engaging member 496 is connected to an exterior of air treatment member 112. As exemplified, lock engaging member 496 has a front end 508 which is sized and positioned to releasably hook onto a recess 512 formed in cyclone unit front door 472 to retain the front door 472 in its closed position.

Lock engaging member 496 may be movable in any suitable manner between its engaged and disengaged positions. For example, lock engaging member 496 may be rotatable as shown, translatable, or combinations thereof. In the illustrated embodiment, lock engaging member 496 is pivotally connected to air treatment member 112 for rotation about a lock engaging member axis 516 (FIG. 19) between its engaged and disengaged positions. As exemplified, in the engaged position, lock engaging member 496 may hook onto front wall lock recess 512. Lock engaging member 496 may then be rotated about its axis 516 away from cyclone unit front door 472 to unhook from front wall lock recess 512. Optionally, lock engaging member 496 may be biased to the locked position. For example, a biasing member (e.g. torsional spring, not shown) may bias lock engaging member 496 to rotate toward the closed position.

Still referring to FIGS. 19-21, door lock 492 may have any door release actuator 504 suitable for moving the lock engaging member 496 between its engaged and disengaged positions. In the illustrated example, door release actuator 504 is formed as a button which is operable to rotate lock engaging member 496 to its unlocked position. As exemplified, door release actuator 504 and lock engaging member 496 may both include abutments 520 and 524, respectively, which make contact to move lock engaging member 496 when door release actuator 504 is depressed. In this example, when door release actuator 504 is depressed, abutment 520 moves abutment 524 downwardly which teeters lock engaging member 496 to rotate about its lock engaging member axis 516 to its disengaged position. It will be appreciated that door release actuator 504 may be movable in any suitable manner. For example, door release actuator 504 may be rotatable (e.g. pivotal) as shown, or translatable (e.g. slidable). In the illustrated example, door release actuator 504 is rotatably connected to cyclone unit 112 about a lock actuator axis 528 between its raised position (FIG. 20) and its depressed position (FIG. 21).

Counterweight Stand

The following is a description of a counterweight stand that may be used by itself in any surface cleaning apparatus or in any combination or sub-combination with any other feature or features disclosed herein including the uniflow cyclone, the positioning of the dirt collection chamber, the orientation of the suction motor, the lateral stability members, the air treatment member handle, the position and orientation of a driving handle, the pre-motor filter housing door, the air treatment member door actuator and the electrical coupling members.

In accordance with this aspect, the apparatus may include a counterweight positioned to adjust the apparatus center of gravity for reducing user-torque required to orient the apparatus at common operating angles. The counterweight may be located at a lower end of the main body to provide a stand for supporting the apparatus on a horizontal surface. The counterweight may be formed by a removable member (e.g. energy storage member), or a permanently attached or integrally molded member (e.g. ribs).

Figure 23:
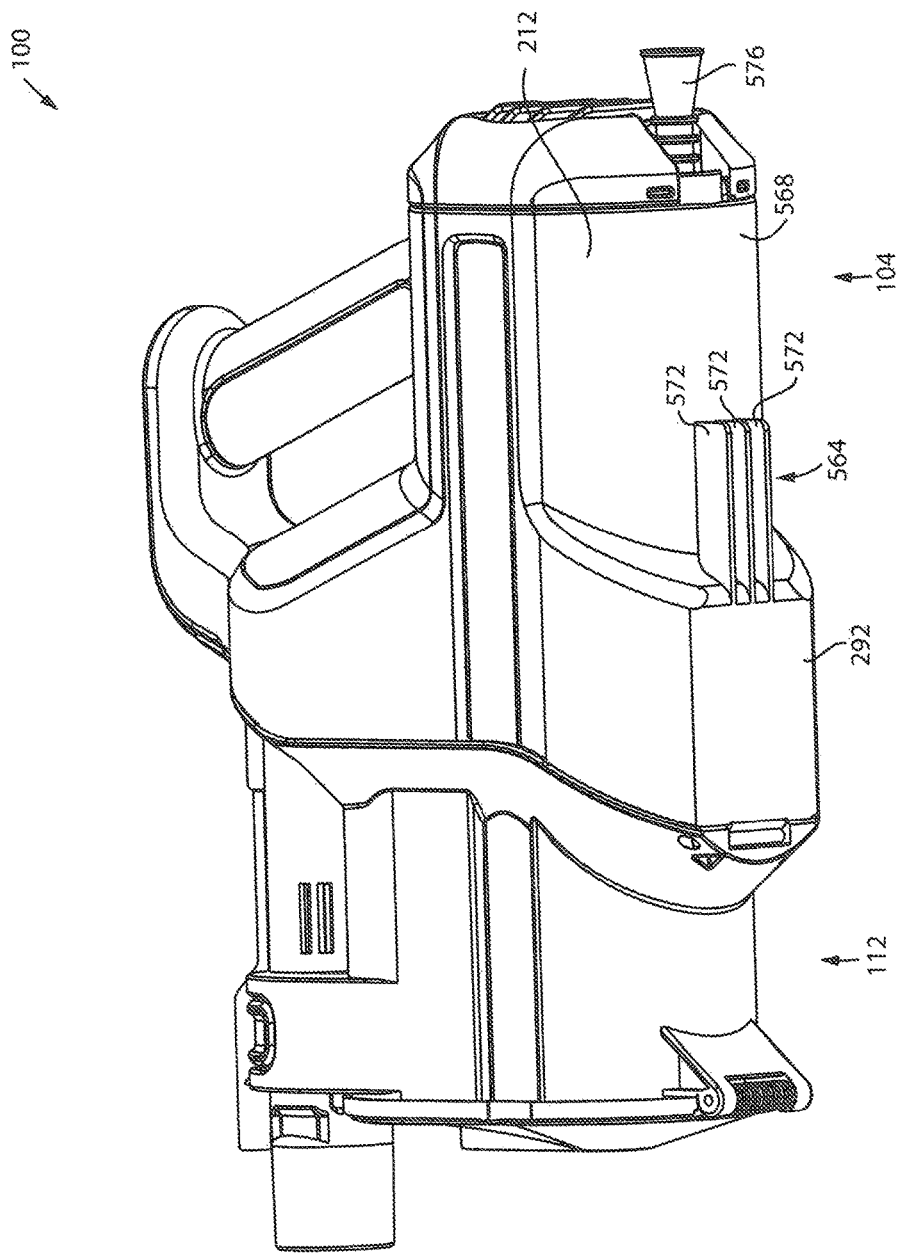
FIG. 23 is a bottom perspective view of a surface cleaning apparatus with a counterweight stand, in accordance with at least one embodiment.

As exemplified in FIG. 23, apparatus 100 includes a counterweight stand 564. The counterweight stand 564 may have any configuration suitable for helping to support apparatus 100 on horizontal surface and for influencing the center of gravity of apparatus 100. As exemplified, counterweight stand 564 may be connected to apparatus lower end 292 for supporting apparatus 100 when apparatus lower end 292 is placed on a horizontal surface (e.g. for storage). In various embodiments, counterweight stand 564 may be connected to main body 104, air treatment member 112, or both. In the illustrated embodiment, counterweight stand 564 is connected to main body lower end 568 to define at least a portion of a lower wall of main body 104 for supporting apparatus 100 on a horizontal surface.

Counterweight stand 564 may be of any size and weight suitable for providing stable support and for influencing the apparatus center of gravity. For example, counterweight stand 564 may be formed of the same material as main body exterior wall 212 (e.g. plastic), and may be formed as a solid member, a hollow member, a porous member, or a plurality of spaced apart members. In the illustrated embodiment, counterweight stand 564 is formed as a plurality of spaced apart counterweight ribs 572 that are integrally formed with the main body exterior wall 212. As exemplified, counterweight ribs 572 may be rearwardly extending and laterally spaced apart. This allows the counterweight ribs 572 to be distributed across a large area to form a base that nay itself or with bottom 125 stably support the apparatus 100 on a horizontal surface. The collective weight of ribs 572, and thus their influence on the apparatus center of gravity, is determined by varying the number, density, spacing, and distribution of the counterweight ribs 572. In alternative embodiments, counterweight stand 564 may be formed by a hollow member, and the weight of the counterweight stand 564 is determined by the fill density inside the block. In some embodiments, counterweight stand 564 may be formed from a different material than main body exterior wall 212, such as a material of greater density to provide greater stability and influence on center of gravity.

Figure 24:
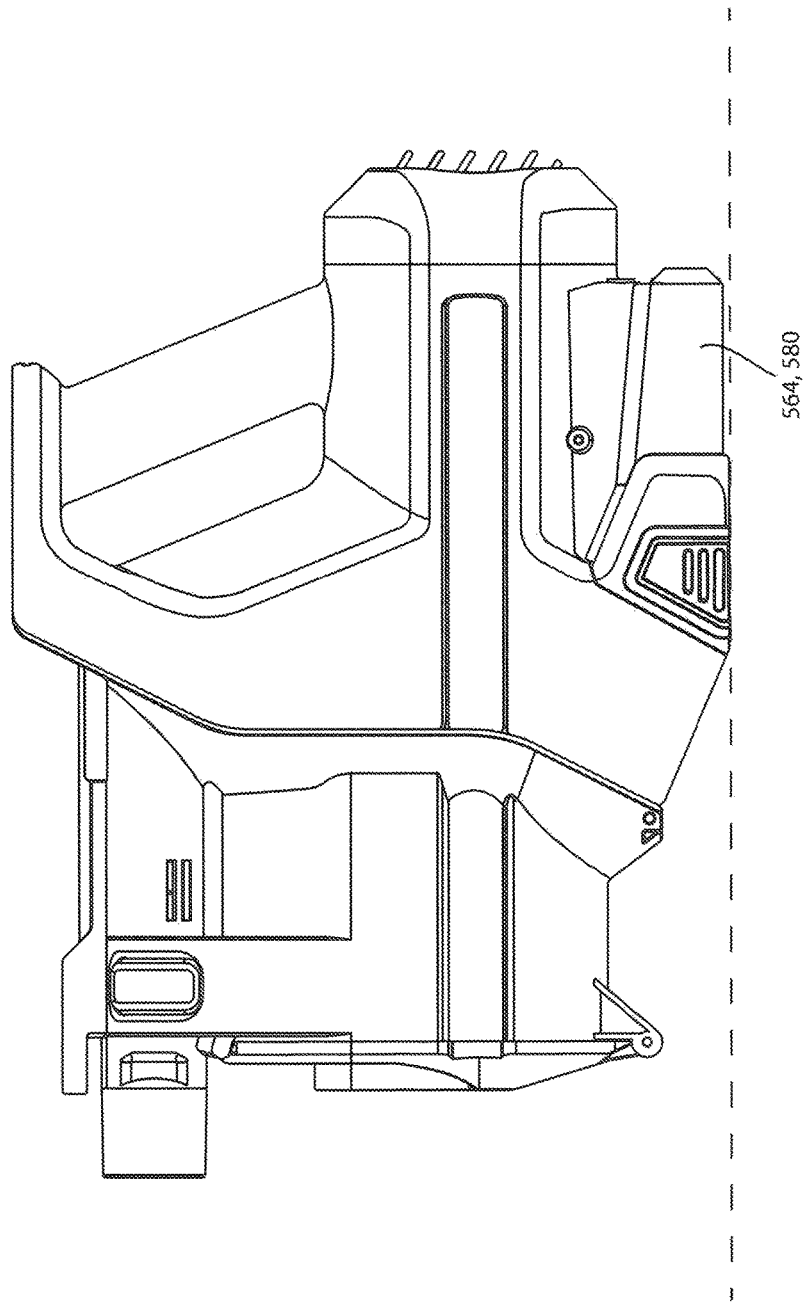
FIG. 24 is a side-elevation view of the surface cleaning apparatus of FIG. 1 supported on a horizontal surface.

Still referring to FIG. 23, the counterweight stand 564 may be integrally formed, permanently connected, or removably connected to apparatus 100. In the illustrated embodiment, counterweight stand 564 is permanently connected to apparatus 100. As exemplified, apparatus 100 may be a corded appliance having a power cord connector 576 for permanently or removably receiving a power cord (not shown) that is connectable to an external power source (e.g. wall outlet). Turning to FIGS. 4 and 24, another embodiment of apparatus 100 is shown including a counterweight stand 564 formed as an energy storage member 580 (e.g. battery). Energy storage member 580 may be permanently or removably connected to apparatus 100, and may have a size and weight suitable for helping to support apparatus 100 on a horizontal surface 584 and influencing the center of gravity of apparatus 100.

Electrical Coupling Members

The following is a description of an electrical coupling members that may be used by itself in any surface cleaning apparatus or in any combination or sub-combination with any other feature or features disclosed herein including the uniflow cyclone, the positioning of the dirt collection chamber, the orientation of the suction motor, the lateral stability members, the air treatment member handle, the position and orientation of a driving handle, the pre-motor filter housing door, the air treatment member door actuator and the counterweight stand.

In accordance with this aspect, the apparatus may include an electrical outlet with electrical conductor element(s) that are movable from a circuit closed position to a circuit open position upon removal of an accessory tool such as a wand, crevice tool, mini brush or the like. The accessory tool which is mounted on the apparatus may have a member which engages a driven member on the apparatus. When engaged, the driven member mechanically moves an element of the circuit to open the circuit so that the electrical conductor elements on the apparatus are not live. This allows the electrical outlet to be safe to touch when the accessory tool is disconnected.

Referring to FIG. 1, connector 128 may be any suitable connector that is operable to connect to, and preferably detachably connect to, a hose, cleaning tool or other accessory tool. Optionally, in addition to providing an air flow connection, connector 128 may also include an electrical connection. Providing an electrical connection may allow accessory tools that are coupled to the connector 128 to be powered by the surface cleaning apparatus 100. For example, the surface cleaning unit 100 can be used to provide both power and suction to a surface cleaning head, or other suitable accessory tool. In the illustrated embodiment, the connector 128 includes an electrical outlet 144 in the form of a female socket member, and a corresponding male connector member may be provided on the hose, cleaning tool or other accessory tool that is connected to the connector inlet end 124. In other embodiments, electrical outlet 144 may include male connectors.

Figure 25:
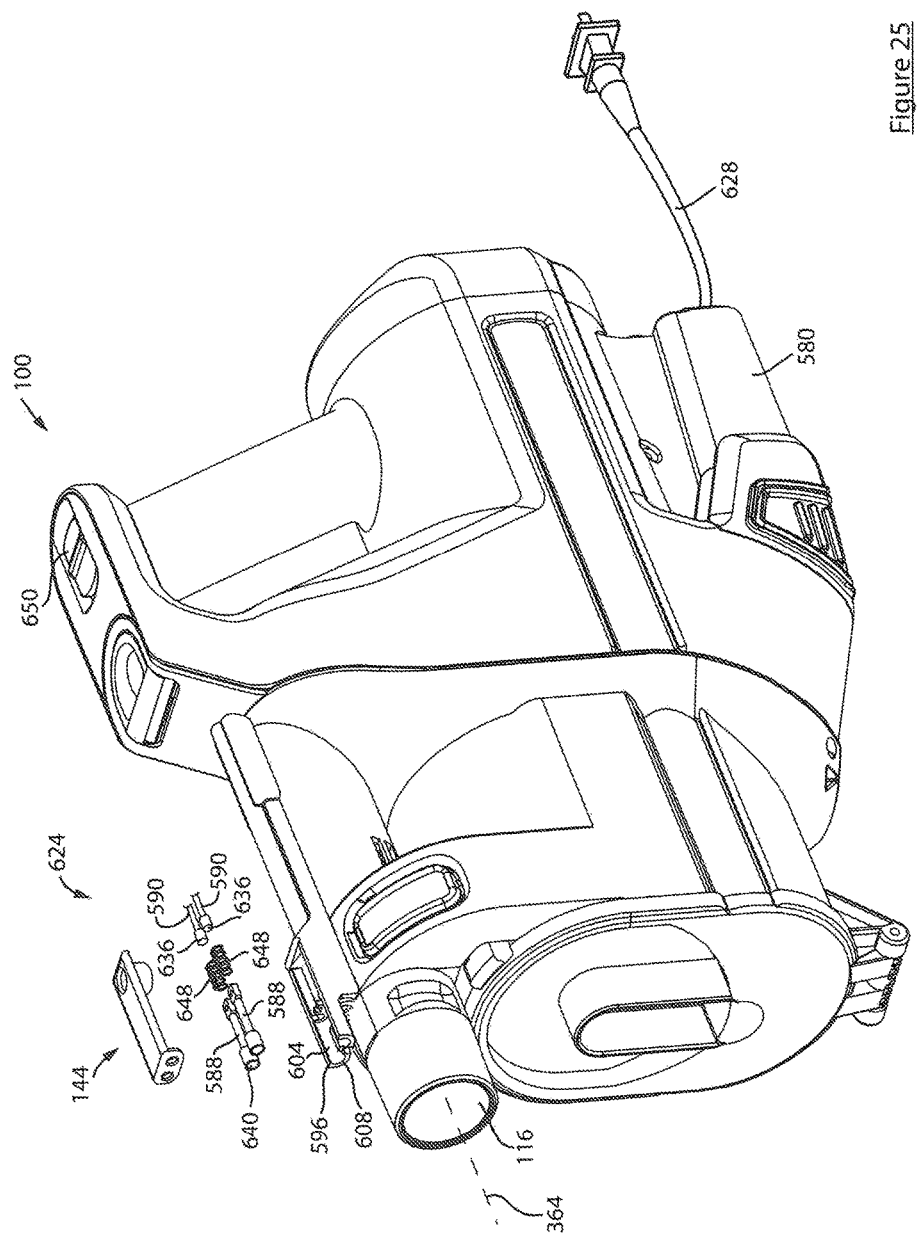
FIG. 25 is the front perspective view of FIG. 20, with an exploded electrical coupling.

As exemplified in FIG. 25, apparatus 100 includes an electrical circuit 624 between a source of power and electrical conductor elements 588. The source of power may be an energy storage member 580 (e.g. battery) or a power cord 628 (connectable to an external power outlet), for example. In accordance with this aspect, electrical conductor elements 588 may be de-energized when not connected with a mating electrical coupling (e.g. of a power accessory). This may prevent user injury from being hurt by inadvertent contact with the electrical conductor elements 588.

The electrical circuit 624 may include two or more electrical conductor elements 588, at least one of which, and preferably two of which, may be movable between a circuit closed position and a circuit open position, and biased to the circuit open position. In the circuit closed position, the electrical conductor element 588 is electrically connected to the source of power. In the circuit open position, the electrical conductor 588 is electrically disconnected from the source of power. Accordingly, at least one of the electrical conductor elements 588 is normally electrically disconnected from the source of power, which may prevent accidental electric shock. In use, the electrical conductor element 588 is moved to the circuit closed position upon attaching an accessory tool to dirty air inlet 116.

In one embodiment, the electrical conductor elements 588 may be moved to the circuit closed position by engagement with the electrical conductor elements of an accessory tool. Accordingly, when the accessory tool is mounted on inlet 116, the electrical conductor elements of the accessory tool may drive electrical conductor elements 588 to the circuit closed position.

As exemplified, electrical conductor elements 588 may be a rigid rod movably mounted in a housing 596 of electrical outlet 144. Each electrical conductor element 588 extends from a first contact end 640 to a second contact end 644. The first contact end 640 may be an accessory tool contact end which makes electrical contact with a mating electrical conductor element of an attached accessory tool. The second contact ends 644 may be a terminal end contact end which makes electrical contact with the terminal ends 636 of electrical conductive members 590 when the electrical conductor elements 588 are in a circuit closed position. Accordingly, when an accessory tool is electrically connected to electrical outlet 144 and electrical conductor elements 588 are in the circuit closed position, the conductor element 588 can conduct electricity from the source of power to the connected accessory tool.

It will be appreciated that electrical conductive members (e.g. wires) 590 extend from the source of power to terminal ends 636. One or both of electrical conductor elements 588 may be movable between a circuit closed position, in which second contact end 644 contacts terminal end 636 of an electrical conductive member 590, and a circuit open position, in which second contact end 644 is spaced apart from the terminal ends 636 of electrical conductive members 590. For example, one or both of electrical conductor elements 588 may be axially slidable in electrical outlet housing between the circuit open and circuit closed positions. In the illustrated example, electrical conductor elements 588 are rearwardly slideable in rearwardly extending housing channels 604 formed in electrical outlet housing 596.

In some embodiments, the first end 640 of one or both of electrical conductor elements 588 may be recessed into the electrical outlet 144 when in the circuit open position. For example, first end 640 may be positioned rearwardly of electrical outlet front end 608.

Electrical conductor element 588 may be biased to the circuit open position in any manner. For example, electrical outlet 144 includes a biasing member 648 that applies a biasing force urging electrical conductor element 588 toward the circuit open position. In the illustrated example, biasing member 648 is a compression spring positioned between the electrical conductor element 588 and the terminal end 636 of electrical conductive member 590 which urges electrical conductor element 588 forwardly. The force of biasing member 648 may be overcome when connecting an accessory tool to dirty air inlet 116 to move the electrical conductor element 588 rearwardly to the circuit closed position. Preferably, biasing member 648 is substantially non-electrically conductive. For example, biasing member 648 may be formed of (or coated with) plastic, rubber, a non-conductive metal or another substantially non-electrically conductive material. This helps to prevent biasing member 648 from short circuiting electrical circuit 624 or electrically connecting electrical conductor element 588 and terminal end 632 when the electrical conductor element 588 is in the closed position.

It will be appreciated that, in an alternate embodiment, electrical conductor elements 588 may be mounted in a moveable (e.g., plastic or other non-conductive material) housing and the housing may have an engagement member that is engaged by, e.g., a protrusion or finger provided on the accessory tool. In this way, the electrical conductor elements of the accessory tool need not be used to drive the circuit 624 to a closed position.

In some embodiments, main power switch 650, which is movable between a circuit closed position and a circuit open position to energize the suction motor, may be part of electrical circuit 624. The power switch may be manually user. In the circuit open position, power switch 650 electrically disconnects electrical terminal end 636 from the power source. In the circuit closed position, power switch 650 electrically connects circuit terminal end 636 with the power source.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A hand vacuum cleaner having a front end, a rear end, an upper end and a bottom, the hand vacuum cleaner comprising:
   (a) a main body comprising an upper end, a lower end, a front end, a rear end and a driving handle, the main body housing a suction motor and fan assembly, the suction motor and fan assembly having a suction motor axis of rotation; and,
   (b) an air treatment member, the air treatment member comprising an air treatment member axis and an air treatment member handle wherein the air treatment member handle comprises an air flow passage, wherein the air treatment member handle has an outward side spaced outwardly from the air treatment member, an inward side positioned between the air treatment member and the outward side of the air treatment member handle and a middle portion positioned between the outward side and the inward side, and the air treatment member handle narrows in a direction transverse to a direction of air flow through the handle from the middle portion towards the inward side.

2. The hand vacuum cleaner of claim 1 wherein the air flow passage comprises an inlet passage of the air treatment member.

3. The hand vacuum cleaner of claim 2 wherein the inlet passage extends longitudinally between a dirty air inlet end and an outlet end.

4. The hand vacuum cleaner of claim 1 wherein the air treatment member handle comprises a portion spaced from the air treatment member whereby a finger receiving area is provided between the air treatment member handle and the air treatment member.

5. The hand vacuum cleaner of claim 1 wherein the air treatment member handle is provided above the air treatment member.

6. The hand vacuum cleaner of claim 1 wherein the passage extends generally axially in the direction of the air treatment member axis.

7. The hand vacuum cleaner of claim 1 wherein the driving handle comprises a portion spaced from the main body whereby a finger receiving area is provided between the driving handle and the main body.

8. The hand vacuum cleaner of claim 1 wherein the driving handle is provided at the rear end of the main body.

9. The hand vacuum cleaner of claim 1 wherein the air treatment member is removable from the main body and the air treatment member handle is removable with the air treatment member.

10. The hand vacuum cleaner of claim 1, wherein a bleed valve is positioned in the air treatment member handle.

11. A hand vacuum cleaner having a front end, a rear end, an upper end and a bottom, the hand vacuum cleaner comprising:
   (a) a main body comprising an upper end, a lower end, a front end, a rear end and a driving handle, the main body housing a suction motor and fan assembly, the suction motor and fan assembly having a suction motor axis of rotation; and,
   (b) a cyclone unit, the cyclone unit comprising a cyclone having a cyclone axis of rotation, a cyclone unit handle, wherein the cyclone unit handle comprises an air flow passage wherein the cyclone unit handle comprises a portion spaced from the cyclone unit whereby a finger receiving area is provided between the cyclone unit handle and the cyclone unit.

12. The hand vacuum cleaner of claim 11 wherein the cyclone unit handle comprises an inlet passage of the cyclone unit.

13. The hand vacuum cleaner of claim 12 wherein the inlet passage extends longitudinally between a dirty air inlet end and an outlet end.

14. The hand vacuum cleaner of claim 11 wherein the cyclone unit handle is provided above the cyclone unit.

15. The hand vacuum cleaner of claim 11 wherein the passage extends generally parallel to the cyclone axis.

16. The hand vacuum cleaner of claim 11 wherein the driving handle comprises a portion spaced from the main body whereby a finger receiving area is provided between the driving handle and the main body.

17. The hand vacuum cleaner of claim 11 wherein the driving handle is provided at the rear end of the main body.

18. The hand vacuum cleaner of claim 11 wherein the cyclone unit is removable from the main body and the cyclone unit handle is removable with the cyclone unit.

19. The hand vacuum cleaner of claim 11 wherein when the hand vacuum cleaner is oriented with the upper end positioned above the lower end, the cyclone axis of rotation is generally horizontal.

20. The hand vacuum cleaner of claim 11, wherein a bleed valve is positioned in the cyclone unit handle.

* * * * *